US012400279B2

(12) United States Patent
Siefken et al.

(10) Patent No.: US 12,400,279 B2
(45) Date of Patent: Aug. 26, 2025

(54) DRIVE THROUGH SYSTEM INCLUDING VISION SYSTEM AND TRANSACTION SYSTEM INTEGRATION

(71) Applicant: Xenial, Inc., Charlotte, NC (US)

(72) Inventors: Christopher Siefken, Charlotte, NC (US); Brian Jackson, Waxhaw, NC (US); Istvan Illes-Toth, Szoknok (HU); James Davidson, Charlotte, NC (US); Patrick O'Brien, Charlotte, NC (US); Christopher Clark, Concord, NC (US); Israel Rivera, Philadelphia, PA (US); Keith Shaibley, Lansdale, PA (US)

(73) Assignee: XENIAL, INC., Charlotte, NC (US)

(*) Notice: Subject to any disclaimer, the term of this patent is extended or adjusted under 35 U.S.C. 154(b) by 0 days.

(21) Appl. No.: 18/607,011

(22) Filed: Mar. 15, 2024

(65) Prior Publication Data

US 2024/0311937 A1    Sep. 19, 2024
US 2025/0148553 A2    May 8, 2025

Related U.S. Application Data

(60) Provisional application No. 63/587,611, filed on Oct. 3, 2023, provisional application No. 63/539,920, filed
(Continued)

(51) Int. Cl.
*G06Q 50/12*    (2012.01)
*G06Q 20/20*    (2012.01)
*G06V 20/52*    (2022.01)

(52) U.S. Cl.
CPC ............. *G06Q 50/12* (2013.01); *G06Q 20/20* (2013.01); *G06V 20/52* (2022.01); *G06V 2201/08* (2022.01)

(58) Field of Classification Search
CPC ........ G06Q 50/12; G06Q 20/20; G06V 20/52; G06V 2201/08
See application file for complete search history.

(56) References Cited

U.S. PATENT DOCUMENTS 5,235,509 A     8/1993  Mueller et al.
5,974,393 A  * 10/1999  McCullough .... G06Q 10/06311
                                                    705/16
(Continued)

FOREIGN PATENT DOCUMENTS

EP    2390775 A2  * 11/2011  ........... G06F 3/0488
JP  2012098841 A  *  5/2012  ............ G06Q 50/12
(Continued)

OTHER PUBLICATIONS

U.S. Appl. No. 63/452,218, filed Mar. 15, 2023, Xenial, Inc.
(Continued)

*Primary Examiner* — Ashford S Hayles
(74) *Attorney, Agent, or Firm* — Foley & Lardner LLP

(57) ABSTRACT

A control system for a drive through includes processing circuitry. The processing circuitry is configured to determine, using image data obtained from multiple cameras, a characteristic of a vehicle in a lane of the drive through. The processing circuitry can operate a point of sale unit to provide an indication of the characteristic of the vehicle. The processing circuitry can, responsive to detection of one or more of a plurality of vehicles using the image data, perform at least one of (i) initiating an alert via the point of sale unit for staff of the drive through, (ii) initiating an action to open an additional lane, or (iii) initiating a kitchen action to prepare one or more food or beverage items.

20 Claims, 32 Drawing Sheets

Related U.S. Application Data on Sep. 22, 2023, provisional application No. 63/452,218, filed on Mar. 15, 2023.

(56) References Cited

U.S. PATENT DOCUMENTS

| | | | |
|---|---|---|---|
| 7,082,314 | B2 | 7/2006 | Farmer et al. |
| 8,271,340 | B2 | 9/2012 | Awiszus |
| 8,774,462 | B2 | 7/2014 | Kozitsky et al. |
| 9,865,056 | B2 | 1/2018 | Bernal et al. |
| 10,082,020 | B2 | 9/2018 | Wisniewski et al. |
| 10,089,983 | B1 | 10/2018 | Gella et al. |
| 10,223,596 | B1* | 3/2019 | Edwards ............ G06Q 30/0633 |
| RE47,380 | E | 5/2019 | Bridgman et al. |
| 10,373,226 | B1* | 8/2019 | Russell ............. G06Q 30/0635 |
| 10,387,945 | B2* | 8/2019 | Burry ................ G06Q 30/0635 |
| 10,453,216 | B1* | 10/2019 | Zelenskiy ............. G06V 20/62 |
| 10,706,846 | B1 | 7/2020 | Barton et al. |
| 10,993,088 | B1 | 4/2021 | O'Gwynn et al. |
| 11,023,955 | B1* | 6/2021 | Carpenter, II ... G10K 11/17823 |
| 11,030,678 | B2 | 6/2021 | Panigrahi et al. |
| 11,068,966 | B2 | 7/2021 | Burry et al. |
| 11,182,864 | B1* | 11/2021 | Fox ................... G06Q 30/0641 |
| 11,244,681 | B1 | 2/2022 | Siefken et al. |
| 11,354,760 | B1* | 6/2022 | Dorch ..................... G10L 15/18 |
| 11,443,260 | B1* | 9/2022 | van Breen ............ G08G 1/095 |
| 11,594,049 | B2 | 2/2023 | Desantola et al. |
| 11,676,592 | B2 | 6/2023 | Sumpter et al. |
| 11,704,753 | B2* | 7/2023 | Dorch ................. G06V 40/172 |
| | | | 705/15 |
| 11,741,529 | B2 | 8/2023 | Siefken et al. |
| 11,798,106 | B2 | 10/2023 | Fox |
| 11,810,550 | B2 | 11/2023 | Shukla et al. |
| 11,862,157 | B2 | 1/2024 | Aggarwal et al. |
| 11,895,675 | B2 | 2/2024 | O'Gwynn et al. |
| 12,182,890 | B2 | 12/2024 | Rosas-Maxemin et al. |
| 12,217,301 | B1* | 2/2025 | Villamar ................ G06Q 50/12 |
| 2001/0002467 | A1* | 5/2001 | Ogo ....................... G06Q 20/20 |
| | | | 705/13 |
| 2002/0016747 | A1* | 2/2002 | Razumov ............. G07F 17/10 |
| | | | 705/26.8 |
| 2002/0156682 | A1* | 10/2002 | DiPietro ............... G06Q 20/20 |
| | | | 705/16 |
| 2003/0018531 | A1 | 1/2003 | Mahaffy et al. |
| 2004/0035643 | A1* | 2/2004 | Dev ....................... G06Q 20/20 |
| | | | 705/16 |
| 2004/0035644 | A1 | 2/2004 | Ford et al. |
| 2004/0210474 | A1* | 10/2004 | Hart ....................... G06Q 30/02 |
| | | | 705/7.42 |
| 2004/0249497 | A1* | 12/2004 | Saigh ..................... E04H 14/00 |
| | | | 700/216 |
| 2004/0260513 | A1* | 12/2004 | Fitzpatrick ............ G06Q 50/12 |
| | | | 702/182 |
| 2005/0200455 | A1 | 9/2005 | Veni, III et al. |
| 2006/0076397 | A1 | 4/2006 | Langos |
| 2007/0007331 | A1* | 1/2007 | Jasper ..................... G07G 1/14 |
| | | | 235/379 |
| 2007/0022016 | A1* | 1/2007 | Steres ................. G06Q 30/0641 |
| | | | 705/27.1 |
| 2007/0174142 | A1* | 7/2007 | Kissel ................. G06Q 30/0601 |
| | | | 705/26.1 |
| 2007/0230791 | A1 | 10/2007 | Chellapilla et al. |
| 2008/0107304 | A1 | 5/2008 | Coulter et al. |
| 2009/0255195 | A1* | 10/2009 | Bridgman ............ E04H 14/00 |
| | | | 52/741.1 |
| 2010/0205640 | A1 | 8/2010 | Steinborn ............. G09F 27/00 |
| | | | 725/74 |
| 2010/0250374 | A1* | 9/2010 | Downes ................. G06Q 50/12 |
| | | | 705/345 |
| 2011/0258058 | A1 | 10/2011 | Carroll et al. |
| 2012/0106781 | A1* | 5/2012 | Kozitsky ............. G06Q 10/087 |
| | | | 382/103 |
| 2012/0109760 | A1* | 5/2012 | Koiso .................... G06Q 50/12 |
| | | | 705/15 |
| 2013/0282420 | A1* | 10/2013 | Paul ....................... G06Q 50/12 |
| | | | 705/7.16 |
| 2014/0279080 | A1* | 9/2014 | O'Gwynn ............. G06Q 50/12 |
| | | | 705/15 |
| 2015/0193755 | A1 | 7/2015 | Sibble |
| 2015/0310459 | A1* | 10/2015 | Bernal ............... G06Q 30/0201 |
| | | | 705/7.29 |
| 2015/0310615 | A1* | 10/2015 | Bulan .................... H04N 23/80 |
| | | | 348/143 |
| 2016/0063459 | A1 | 3/2016 | Li et al. |
| 2016/0155328 | A1* | 6/2016 | Bernal ..................... G08G 1/04 |
| | | | 382/104 |
| 2017/0018041 | A1* | 1/2017 | Fox ..................... G06Q 20/3224 |
| 2017/0323370 | A1* | 11/2017 | Burry ................ G06Q 30/0635 |
| 2017/0323505 | A1* | 11/2017 | Gaddam ................. H04L 63/08 |
| 2018/0012318 | A1* | 1/2018 | Li ......................... H04B 10/116 |
| 2018/0025365 | A1 | 1/2018 | Wilkinson et al. |
| 2018/0025445 | A1* | 1/2018 | Becker ................... G07F 9/009 |
| | | | 705/15 |
| 2018/0082234 | A1* | 3/2018 | Burt ................... G06Q 30/0635 |
| 2018/0122022 | A1 | 5/2018 | Kelly et al. |
| 2018/0189781 | A1 | 7/2018 | McCann et al. |
| 2018/0201227 | A1* | 7/2018 | Gao ....................... B60R 25/305 |
| 2019/0012625 | A1 | 1/2019 | Lawrenson et al. |
| 2019/0108566 | A1* | 4/2019 | Coleman ............ G06Q 30/0633 |
| 2019/0139258 | A1* | 5/2019 | Slattery ................. G06V 20/52 |
| 2019/0171711 | A1 | 6/2019 | Carpenter et al. |
| 2019/0228463 | A1* | 7/2019 | Chan .................. G06Q 30/0641 |
| 2019/0279181 | A1 | 9/2019 | Kelly et al. |
| 2019/0287191 | A1* | 9/2019 | Cummings ............. G01S 17/04 |
| 2020/0005267 | A1 | 1/2020 | Siefken et al. |
| 2020/0034848 | A1 | 1/2020 | Seo et al. |
| 2020/0189847 | A1* | 6/2020 | Washington ......... B65G 1/1376 |
| 2020/0211130 | A1* | 7/2020 | Zanaroli ................ B65G 1/065 |
| 2020/0226667 | A1 | 7/2020 | Kalaimani |
| 2020/0311804 | A1 | 10/2020 | Buckholdt et al. |
| 2020/0410421 | A1* | 12/2020 | Nelson ............. G06Q 10/06312 |
| 2021/0295412 | A1 | 9/2021 | Phillips et al. |
| 2021/0406797 | A1* | 12/2021 | Gui .................... G06Q 30/0633 |
| 2022/0036898 | A1* | 2/2022 | Siefken ................. G06V 20/00 |
| 2022/0165262 | A1 | 5/2022 | Sumpter et al. |
| 2022/0284488 | A1* | 9/2022 | Bamadhaj ............ G06Q 20/202 |
| 2022/0292618 | A1* | 9/2022 | DeSantola ................ G06T 7/11 |
| 2022/0292834 | A1* | 9/2022 | DeSantola ............. G06N 20/00 |
| 2022/0301082 | A1 | 9/2022 | Dorch et al. |
| 2022/0318860 | A1* | 10/2022 | Dorch ..................... G10L 15/28 |
| 2022/0374884 | A1 | 11/2022 | Wai et al. |
| 2022/0382504 | A1* | 12/2022 | Cioarga ................... G06F 3/147 |
| 2023/0169612 | A1* | 6/2023 | Liguori .................. G06N 20/00 |
| | | | 705/15 |
| 2023/0200569 | A1* | 6/2023 | Todoran ................ G06V 20/58 |
| | | | 186/35 |
| 2023/0298350 | A1* | 9/2023 | Heritier .................... G06T 7/70 |
| | | | 382/103 |
| 2023/0316218 | A1* | 10/2023 | Davies ................. A47G 29/141 |
| | | | 705/339 |
| 2023/0316788 | A1 | 10/2023 | Desantola et al. |
| 2023/0343102 | A1* | 10/2023 | Hauke .................... G06Q 10/04 |
| 2024/0119393 | A1* | 4/2024 | Schwenker ........ G06Q 30/0635 |
| 2024/0119398 | A1* | 4/2024 | Schwenker ............ G06Q 50/12 |
| 2024/0144401 | A1* | 5/2024 | Morgan ................. G06Q 50/12 |

FOREIGN PATENT DOCUMENTS

| | | | | |
|---|---|---|---|---|
| KR | 102134392 | B1 * | 7/2020 | |
| KR | 2666989 | B1 * | 5/2024 | ............ A47J 31/521 |
| WO | WO-9950733 | A2 * | 10/1999 | ............ G06Q 20/105 |
| WO | WO-2005041071 | A1 * | 5/2005 | ............ G06K 9/3241 |
| WO | WO-2019028552 | A1 * | 2/2019 | ............ G06F 40/166 |
| WO | WO-2022192705 | A2 * | 9/2022 | ............ G06Q 10/08 |

OTHER PUBLICATIONS

U.S. Appl. No. 63/529,850, filed Jul. 31, 2023, Xenial, Inc.
U.S. Appl. No. 63/539,920, filed Sep. 22, 2023, Xenial, Inc.
U.S. Appl. No. 63/587,611, filed Oct. 3, 2023, Xenial, Inc.
U.S. Appl. No. 18/606,958, filed Mar. 15, 2024, Xenial, Inc.

(56) References Cited

OTHER PUBLICATIONS

U.S. Appl. No. 18/607,065, filed Mar. 15, 2024, Xenial, Inc.
International Search Report and Written Opinion of the International Searching Authority issued in Application No. PCT/US2024/020236, mailed May 10, 2024.
International Search Report and Written Opinion of the International Searching Authority issued in Application No. PCT/US2024/020256, mailed Jun. 14, 2024.
International Search Report and Written Opinion of the International Searching Authority issued in Application No. PCT/US2024/020310, mailed May 2, 2024.
Emery, B. G., Hodges, B., & Tiger, A. (Mar. 2017). Simulating the impact of mobile ordering at Chick-fil-A. Journal of Marketing Development and Competitiveness, 11(1), 51-58. Retrieved from https://www.proquest.com/scholarly-journals/simulating-impact-mobile-ordering-at-chick-fil/docview/1930104172/se-2.
Severson, K. (Nov. 2023). A faster, smoother way to grab a bite fast-food industry embraces shift after pandemic, rolls out drive-thru upgrades. The Baltimore Sun Retrieved from https://www.proquest.com/newspapers/faster-smoother-way-grab-bite-fast-food-industry/docview/2887932639/se-2.

\* cited by examiner

FIG. 12

Connie C.
Terminal 1 - Terminal Name  >  Drive Thru Director Screen

LANES

| LANE 1 | LANE 2 | LANE 3 | LANE 4 |
|---|---|---|---|
| Black Car 2:32s | (+) | Blue SUV 32s | (+) |

— 1202

Carry Out — 12 Orders Total

| | | |
|---|---|---|
| Red Truck Anna L. #ETRa43 | $24.25 05:07 | Serve |
| Blue SUV #ETRa33 | $24.25 05:07 | Serve |
| Purple Car #ETRa23 | $24.25 05:07 | Serve |
| Red Truck #ETRa43 | $24.25 05:07 | Serve |
| Red Truck #ETRa43 | $24.25 05:07 | Serve |

— 1206

WINDOWS

| WINDOW 1 | WINDOW 2 | WINDOW 3 |
|---|---|---|
| Red Truck (3) 1:32s | (+) | (+) |

— 1204

Delivery Service — 12 Orders Total

| | | |
|---|---|---|
| Red Truck Anna L. #ETRa43 | $24.25 05:07 | Serve |
| Blue SUV #ETRa33 | $24.25 05:07 | Serve |
| Purple Car #ETRa23 | $24.25 05:07 | Serve |
| Red Truck #ETRa43 | $24.25 05:07 | Serve |

≡ Connie C.
Terminal 1 - Terminal Name  ∨  Drive Thru Director Screen

LANES

| LANE 1 Green Car 0:00s ① | LANE 2 ⊕ | LANE 3 ⊕ | LANE 4 ⊕ |

Mobile Orders — 12 Orders Total  ⟩  ← 1806

| Miguel H. / Anna L. / #ETRa43 | $24.25 / 05:07 | Serve |
| Samantha M. / Anna L. / #ETRa43 | $24.25 / 05:07 | Serve |
| Joe S. / Anna L. / #ETRa43 | $24.25 / 05:07 | Serve |

WINDOWS ← 1804

| WINDOW 1 ⊕ | WINDOW 2 ⊕ | WINDOW 3 White SUV 0:00s ① |

Delivery Service 1 — 12 Orders Total  ⟩  ← 1808

| Isabella F. / Anna L. / #ETRa43 | $24.25 / 05:07 | Serve |
| Kim C. / Anna L. / #ETRa43 | $24.25 / 05:07 | Serve |
| Thomas L. / Anna L. / #ETRa43 | $24.25 / 05:07 | Serve |
| James H. / Anna L. / #ETRa43 | $24.25 / 05:07 | Serve |
| Jessica R. / Anna L. / #ETRa43 | $24.25 / 05:07 | Serve |
| Billy B. / Anna L. / #ETRa43 | $24.25 / 05:07 | Serve |

Delivery — 12 Orders ← 1810

- Tiffany L. / Anna L. / #ETRa43
- Bronson B. / Anna L. / #ETRa43
- Brandon R. / Anna L. / #ETRa43
- Brittany W. / Anna L. / #ETRa43
- Chris C. / Anna L. / #ETRa43
- Jeffrey L. / Anna L. / #ETRa43

Connie C.
Terminal 1 - Terminal Name
Drive Thru Director Screen 1818

LANES — 1802

| LANE 1 | LANE 2 | LANE 3 | LANE 4 Grey Car 0:00s |

WINDOWS — 1804

| WINDOW 1 | WINDOW 2 Blue Truck 0:00s | WINDOW 3 White SUV 0:00s |

1820 Window 3 Detected Vehicle White SUV

1812 Change

1814 Check In    1816 New Order

2200034    2:23

1 Burger Meal
1 Chicken Sandwich

Summary

Options ∨    Pay    $10.00

Mobile Orders
12 Orders Total

| Miguel H. | $24.25 | |
| Anna L. | 05:07 | |
| #ETRa43 | | |
| Samantha M. | $24.25 | Serve |
| Anna L. | 05:07 | |
| #ETRa43 | | |
| Joe S. | $24.25 | Serve |
| Anna L. | 05:07 | |
| #ETRa43 | | Serve |

— 1806

Delivery
12 Orders

Isabella F.
Anna L.
ETRa43

Kim C.
Anna L.
ETRa43

Thomas L.
Anna L.
ETRa43

James H.
Anna L.
ETRa43

Jessica R.
Anna L.
ETRa43

Billy B.
Anna L.
ETRa43

— 1808

1800

Station 1     Default     🔋 100%

← 1900

← 1902
```
LANE 2  #2200034  DT  1:00 ⊙
UNPAID              WHITE SUV
1  Burger Meal
1  Chicken Sandwich
        Total Items: 2
```

← 1904
```
LANE 3  #3200055  DT  1:00 ⊙
UNPAID              BLUE TRUCK
2  Burgers (Small)
        Total Items: 2
```

← 1906
```
LANE 1  #3200055  DT  1:00 ⊙
UNPAID              GREEN CAR
2  Special Burger Meal
1  Burger Meal
        Total Items: 3
```

← 1908
```
LANE 4  #42000014  DT  1:00 ⊙
UNPAID              GREY CAR
1  Special Burger
        Total Items: 1
```

3 Orders    AVG.Time: 00:48    Expo:

FIG. 32

DRIVE THROUGH SYSTEM INCLUDING VISION SYSTEM AND TRANSACTION SYSTEM INTEGRATION

CROSS-REFERENCE TO RELATED PATENT APPLICATION

This application claims the benefit of and priority to (i) U.S. Provisional Application No. 63/452,218, filed Mar. 15, 2023, (ii) U.S. Provisional Application No. 63/539,920, filed Sep. 22, 2023, and (iii) U.S. Provisional Application No. 63/587,611, filed Oct. 3, 2023, the disclosures of each of which are incorporated by reference herein in their entireties.

FIELD

The present disclosure relates to vision systems. More specifically, the present disclosure relates to vision systems for drive throughs.

BACKGROUND

Drive through systems may have multiple lanes with a combination of display interfaces, microphones, speakers, and vehicle detection capabilities. When a customer arrives at the drive through system, the customer may communicate via a menu board or unit with an order taker to place their order. The customer then pulls around to pay and pick up the customer's order. Cameras may obtain image data of vehicles at the drive through system.

SUMMARY

One implementation of the present disclosure is a drive through system, according to some embodiments. The drive through system can include a transaction system, such as a point of sale unit, configured to be operated to implement a point of sale. The drive through system can also include multiple cameras configured to obtain image data of a lane of the drive through system. The drive through system can also include processing circuitry configured to determine, using the image data, a characteristic of a vehicle at the lane, and operate the point of sale unit to provide an indication of the characteristic of the vehicle. The processing circuitry may also be configured to, responsive to detection of one or more of multiple vehicles using the image data, perform at least one of (i) initiating an alert via the point of sale unit for staff of the drive through system, (ii) initiating an action to open an additional lane, or (iii) initiating a kitchen action to prepare one or more food or beverage items.

The characteristic of the vehicle may include a type of the vehicle selected from multiple predetermined types of vehicles using the image data, and a color of the vehicle. The multiple predetermined types of vehicles can include at least a car, a truck, and an SUV.

The processing circuitry may be further configured to determine, using the image data from one of multiple cameras or the multiple cameras and predetermined zones, a location of the vehicle along a path of the lane. The predetermined zones may be defined for the image data of each of the multiple cameras to account for different orientations and positions of the cameras that results in image data of the predetermined zones spanning different portions of the image data of each of the cameras. The processing circuitry can also be configured to, responsive to the vehicle arriving at an order placement location of the zone, operating the point of sale unit to provide the indication of the characteristic of the vehicle.

The indication of the characteristic of the vehicle can include at least one of a textual indication of the characteristic of the vehicle or a visual representation of the characteristic of the vehicle. The drive through system can also include at least one of a point of sale unit or a display screen (e.g., notifier, alarm) at a pickup window of the drive through system viewable by an employee of the drive through system. The processing circuitry may be configured to operate at least one of the point of sale unit or the display screen at the pickup window to provide order data associated with the vehicle and the characteristic of the vehicle responsive to the vehicle arriving at the pickup window.

The processing circuitry can be configured to track multiple vehicles through the lane the drive through system using the image data obtained from the cameras. The processing circuitry can also be configured to, responsive to a number of the plurality of vehicles, at least one of initiate an alert for staff of the drive through system, initiate an action to open an additional lane, or initiate a kitchen action to prepare a quantity of food items. The processing circuitry can also be configured to operate, based on the image data, a carry-out alert device to notify carry-out staff regarding (i) the characteristic of a vehicle tracked to a carry-out location, (ii) an identification of which carry-out location of a plurality of carry-out locations at which the vehicle is positioned, and (iii) order data for the vehicle at the carry-out location.

Another implementation of the present disclosure is a method, according to some embodiments. The method may include obtaining image data of a lane of a drive through system and determining, using the image data, a visual characteristic of a vehicle at the lane. The method can also include operating a point of sale unit to provide an indication of the visual characteristic of the vehicle. The point of sale unit may be configured to be operated to implement a point of sale. The visual characteristic may include a type of the vehicle selected from multiple predetermined types using the image data, and a color of the vehicle. The method can also include, processing, at the point of sale unit, vehicle information relating to the visual characteristic of the vehicle and order information for an order receive from an occupant of a drive through to provide compiled order information. The method may also include updating multiple display devices of the drive through system to include an indication of the compiled order information during a service journey of the vehicle at the drive through.

The multiple types of vehicles can include at least a car, a truck, and an SUV. The method can also include determining, using the image data and multiple predetermined zones, a location of the vehicle along a path of the lane. The method can also include, responsive to the vehicle arriving at an order placement location of the zone, operating multiple point of sale units and at least one display screen to provide the indication of the characteristic of the vehicle to staff of the drive through system. The multiple point of sale units may be positioned at different employee stations of the drive through system and the display screen may be positioned in a kitchen or at a pickup window of the drive through system.

The indication of the visual characteristic of the vehicle can include at least one of a textual indication of the characteristic of the vehicle or a visual representation of the visual characteristic of the vehicle. The method can further include operating an alert device to provide an indication of the compiled order information responsive to the vehicle arriving at a pickup window. The alert device may be positioned at a pickup window of the drive through system and viewable by an employee of the drive through system.

The method can also include tracking multiple vehicles through the lane the drive through system using the image data obtained from multiple cameras. The method can also include, responsive to a number of the vehicles, at least one of initiating an alert for staff of the drive through system, initiating an action to open an additional lane, or initiating a kitchen action to prepare a quantity of food items. The method can also include operating a carry-out alert device to provide an indication of the compiled order information responsive to the vehicle arriving at a carry-out location. The carry-out alert device can also be configured to provide an indication of which of multiple carry-out locations at which the vehicle is located.

Another implementation of the present disclosure is a control system for a drive through, according to some embodiments. The control system includes processing circuitry, according to some embodiments. The processing circuitry may determine, using image data obtained from multiple cameras, a characteristic of a vehicle in a lane of the drive through. The processing circuitry can operate a point of sale unit to provide an indication of the characteristic of the vehicle. The processing circuitry can, responsive to detection of one or more of a plurality of vehicles using the image data, perform at least one of (i) initiating an alert via the point of sale unit for staff of the drive through, (ii) initiating an action to open an additional lane, or (iii) initiating a kitchen action to prepare one or more food or beverage items.

In some embodiments, the processing circuitry is further configured to, responsive to detecting that a vehicle has arrived at an order fulfillment location, operate a display screen at the order fulfillment location to display an initially obtained image of the vehicle to an order fulfillment staff to facilitate accurate order fulfillment. In some embodiments, the point of sale unit is a first point of sale unit of multiple point of sale units. The processing circuitry is configured to operate the point of sale units to provide the indication of the characteristic of the vehicle, and a location of the vehicle in the drive through on display screens of the point of sale units in unison, according to some embodiments. In some embodiments, the point of sale units are each configured to receive a user input to transition a corresponding one of multiple portable communications devices to communicate on an audio channel according to the user input. In some embodiments, the processing circuitry is further configured to operate a kitchen display screen to provide order information, the characteristic of the vehicle, and a location of the vehicle to kitchen staff of the drive through.

Another implementation of the present disclosure is a point of sale system for a drive through, according to some embodiments. The point of sale system can include a point of sale unit and processing circuitry. The point of sale unit can be configured to be operated to implement a point of sale and obtain order data. The processing circuitry can be configured to determine, using image data obtained from a camera, a characteristic of a vehicle at a lane of the drive through. The processing circuitry may also be configured to operate the point of sale unit to provide an indication of the characteristic of the vehicle.

The characteristic of the vehicle include a type of the vehicle selected from multiple predetermined types of vehicles using the image data, and a color of the vehicle. The multiple predetermined types of vehicles can include at least a car, a truck, and an SUV.

The processing circuitry can further be configured to determine, using the image data and multiple predetermined zones, a location of the vehicle along a path of the lane. The processing circuitry can also be configured to, responsive to the vehicle arriving at an order placement location of the zone, operate the point of sale unit to provide the indication of the characteristic of the vehicle.

The indication of the characteristic of the vehicle can include at least one of a textual indication of the characteristic of the vehicle or a visual representation of the characteristic of the vehicle. The point of sale system can include an alert device at a pickup window of the drive through system viewable by an employee of the drive through system. The processing circuitry may be configured to operate the alert device to provide the order data associated with the vehicle and the characteristic of the vehicle responsive to the vehicle arriving at the pickup window.

The processing circuitry can be configured to track multiple vehicles through the lane the drive through system using the image data obtained from multiple cameras. The processing circuitry can also, responsive to a number of the multiple vehicles, at least one of initiate an alert for staff of the drive through system, initiate an action to open an additional lane, or initiate a kitchen action to prepare a quantity of food items.

This summary is illustrative only and is not intended to be limiting. Various aspects, inventive features, and advantages of the systems described herein are set forth in more detail below.

Various aspects of the present disclosure, such as the graphical user interfaces (GUIs) shown and described, can be implemented in connection with the drive-through systems and interfaces set forth in U.S. Provisional Application No. 63/539,920 filed Sep. 22, 2023, which is incorporated herein by reference in its entirety.

BRIEF DESCRIPTION OF THE DRAWINGS

The disclosure will become more fully understood from the following detailed description, taken in conjunction with the accompanying FIGURES, wherein like reference numerals refer to like elements, in which:

FIG. 12 is a GUI of a point of sale unit that is updated using image data of a vision system, according to some embodiments.

FIGS. 19, 20, 21, 22, 23, 24, 25, 26, 27, 28, 29, 30 and 31 are exemplary GUIs that may be presented on a point of sale unit or a director display screen of a drive through system, according to some embodiments.

FIG. 32 is a GUI that may be presented on a kitchen display screen of a drive through system, according to some embodiments.

DETAILED DESCRIPTION

Before turning to the FIGURES, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a vision system for a drive through system can include cameras that track vehicles through their life cycle of the drive through system. The vision system may implement a machine learning technique in order to automatically identify a type and color of the vehicles in the drive through system. The vision system is integrated with a transaction system, e.g., a system of point of sale units, such that the point of sale units are updated to indicate the type and color of the vehicles. Integrating the vision system with the point of sale units facilitates improved speed and order fulfillment accuracy of the drive through system.

Drive Through System

Figure 1:
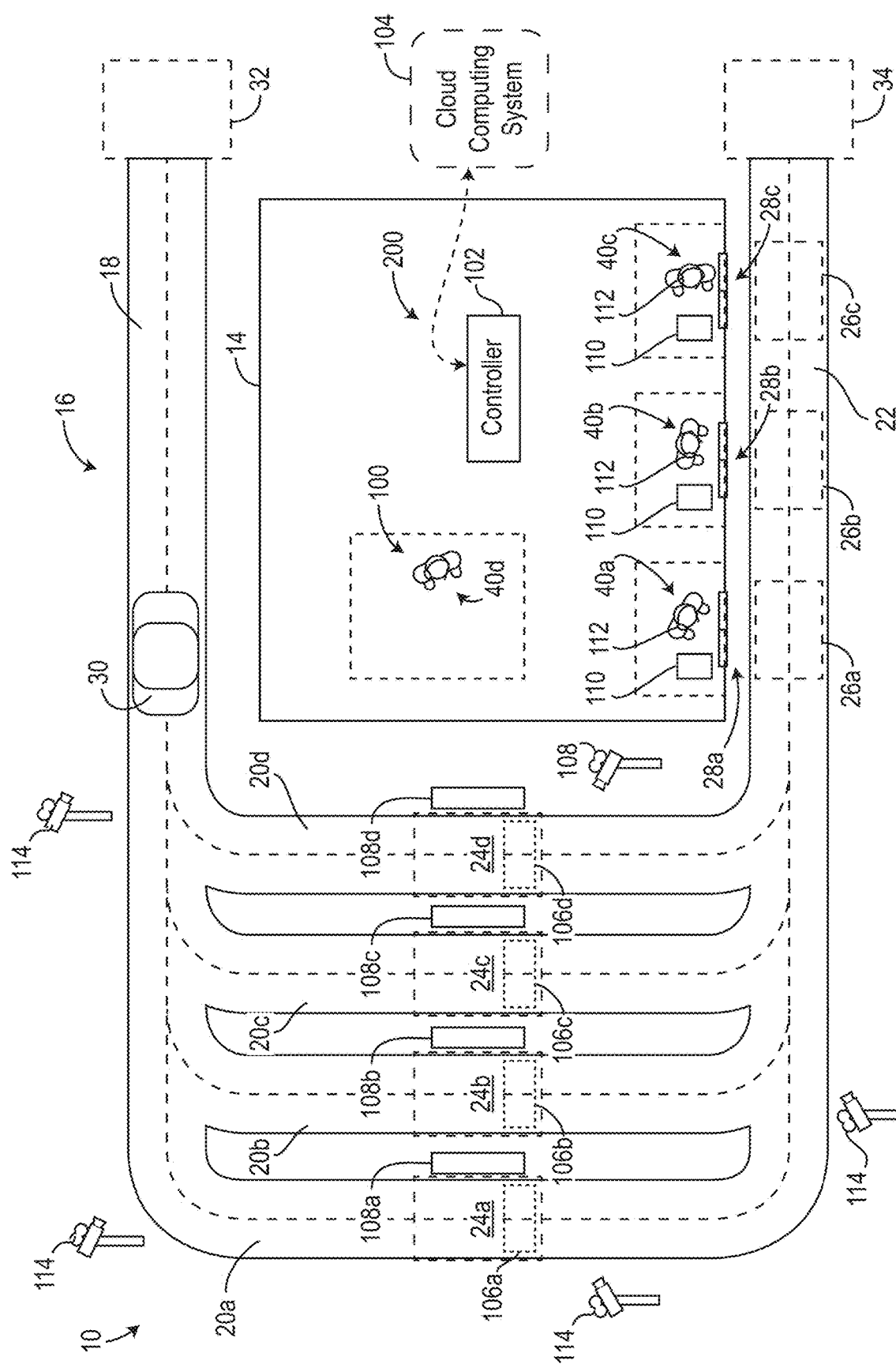
FIG. 1 is a diagram of a drive through system including four lanes and a communications system for communicating with customers of the four lanes, according to some embodiments.
Figure 2:
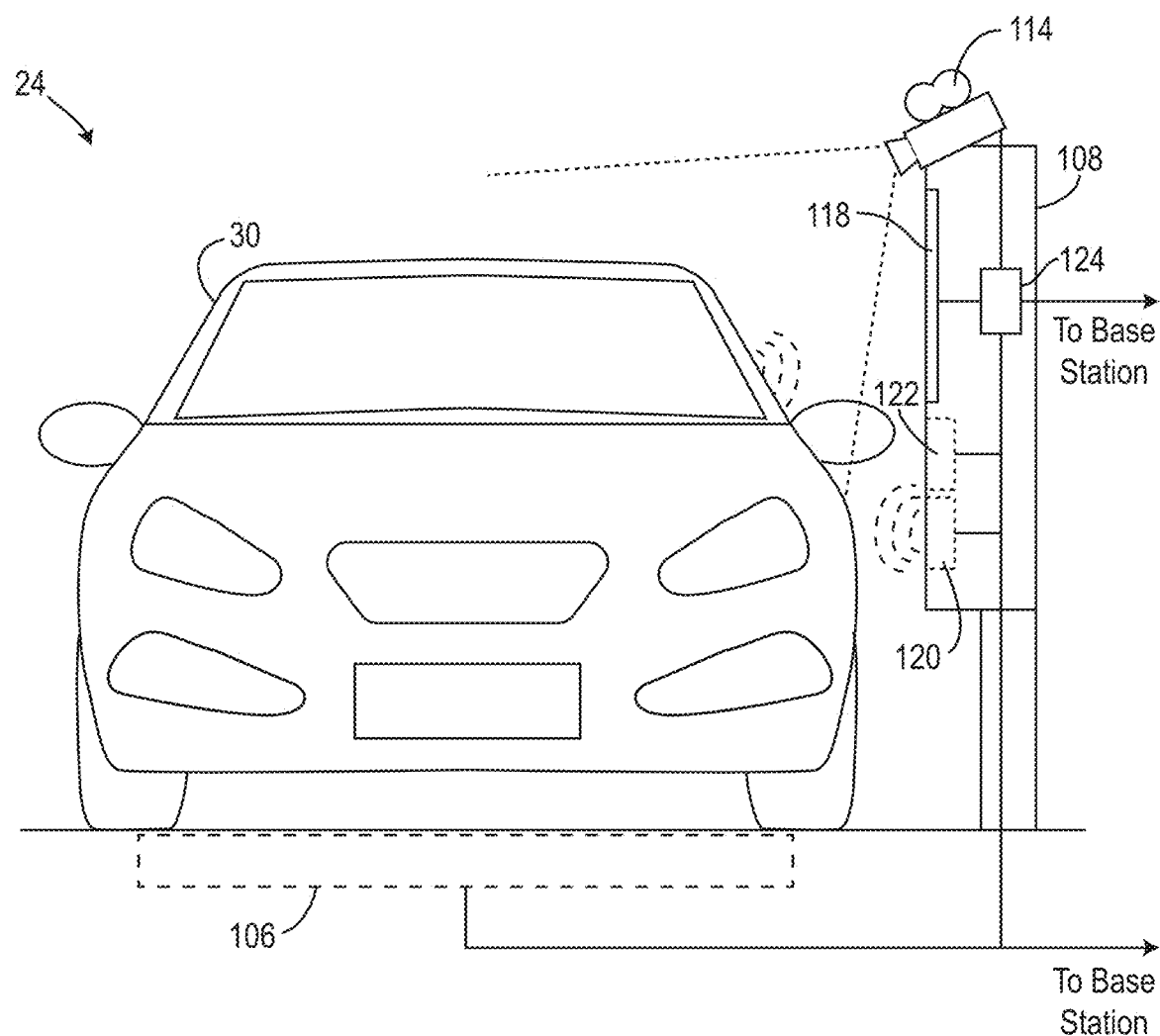
FIG. 2 is a diagram of an order station of the drive through system of FIG. 1 at which a customer may place an order by speaking or causing an audible input to be provided into a microphone of a drive through unit that is in communications with an order taker of a restaurant, according to some embodiments.

Referring particularly to FIGS. 1-2, a drive through system 10 for a store 14 (e.g., a restaurant, a diner, a fast food restaurant, an establishment, etc.) includes a lane system 16 (e.g., a starting lane, one or more ordering lanes where a transaction such as a point of sale (POS) transaction may be conducted or initiated, ordering lanes where customers may communicate with employees of the store 14, etc.), a starting location 32, and an ending location 34. The starting location 32 may be a zone or area at which one or more customers (e.g., customers in vehicles, shown as vehicle 30) enter the lane system 16. The lane system 16 includes an entry lane 18, a first order lane 20a, a second order lane 20b, a third order lane 20c, a fourth order lane 20d, and a pickup lane 22. The pickup lane 22 (e.g., an exit lane) may extend along a side of the store 14 including one or more pickup windows, shown as first window 28a, second window 28b, and third window 28c such that customers (e.g., vehicles 30) may access the different windows 28 to pick up their orders from the store 14. The term "window" should be interpreted broadly to mean a customer-store interface which is not limited to those with a physical screen or barrier.

The starting location 32 and the ending location 34 may define starting and ending points for customers, with the order lanes 20 defining different paths between the starting location 32 and the ending location 34. In some embodiments, each of the order lanes 20 defines a corresponding order zone 24 at which the customer may place an order for pickup at one of the windows 28. In some embodiments, the first lane 20a includes a first order zone 24a, the second lane 20b includes a second order zone 24b, the third lane 20c includes a third order zone 24c, and the fourth lane 20d includes a fourth order zone 24d. Each of the order zones 24 includes a corresponding drive through unit 108 (e.g., a menu board, a kiosk, a field communications unit, an order placement unit at which a customer may place an order, etc.) which facilitates communications between the customer at the order zones 24 and personnel of the store 14, as well a display screen or signage indicating available items for purchase, and order or POS information (e.g., a number of items, corresponding cost, total cost, tax, etc., for an ongoing order). In some embodiments, the first order lane 20a includes a first drive through unit 108a, the second order lane 20b includes a second drive through unit 108b, the third order lane 20c includes a third drive through unit 108c, and the fourth order lane 20d includes a fourth drive through unit 108d. In some embodiments, the order lanes 20 define one or more paths that include a series of discrete geometric forms (e.g., polygonal shapes, curvilinear shapes) mapped to different physical locations along the order lanes 20. The series of geometric forms may match between multiple cameras (e.g., cameras 114) that have different field of views in order to facilitate awareness, identification, and tracking of vehicles along the one or more paths between the starting location 32 and the ending location 34.

The drive through units 108 are interfaces that may be components of a communications system or POS system, shown as communications system 100 of the drive through system 10. In some embodiments, the drive through units 108 are integrated via one or more POS systems. The communications system 100 includes the drive through units 108, a controller 102, one or more imaging devices 114 (e.g., cameras) positioned about the lane system 16, a cloud computing system 104, one or more input devices, shown as order taking stations 110, and one or more wearable communications devices 112. In some embodiments, the one or more order taking stations 110 are disposed in each of a corresponding zone within the store 14 proximate the windows 28. The order taking stations 110 may include a touch screen or user interface configured to both display image data (e.g., a graphical user interface, a menu, selectable options for an order or POS, etc.), and receive user inputs from a corresponding employee of the store 14 to add items to an order or POS.

The wearable communications devices 112 may have the form of headphones, earpieces, etc., and can include both speakers (e.g., acoustic transducers, aural output devices, etc.) and microphones (e.g., aural input devices). In some embodiments, the controller 102 is communicably coupled with each of the order taking stations 110 at the windows 28, the imaging devices 114, and the head wearable communications devices 112. The controller 102 may also be communicably coupled with a cloud computing system 104 and can upload or provide various information regarding points of sale to the cloud computing system 104 for analysis. In some embodiments, the controller 102 is configured to receive, from the cloud computing system 104, software or firmware updates for various devices of the communications system 100. In some embodiments, the wearable communications devices 112 may be portable communications devices including but not limited to headphones, earphones, earbuds, devices configured to clip to a belt or article of clothing, ear pieces, etc., any device having at least one of a speaker or microphone and configured to be worn, held, or otherwise move with an individual to establish an end point for audio communications (e.g., to at least one of produce sound via a speaker, or receive a sound input via a microphone). It should be understood that the components of the communications system 100 (e.g., the drive through units 108, the controller, the one or more imaging devices 114, the cloud computing system 104, the order taking stations 110, and the wearable communications devices 112) may optionally be integrated with each other via a POS (e.g., all such components or a subset of the foregoing components). Integrating the components of the communications system 100 via the POS may facilitate improved efficiency of the drive through, for example.

The communications system 100 provides selective communicability according to multiple channels between any of the personnel (e.g., personnel 40a at the first window 28a, personnel 40b at the second window 28b, and personnel 30c at the third window 28c) and customers at one of the order zones (e.g., the first order zone 24a, the second order zone 24b, the third order zone 24c, and the fourth order zone 24d) via the wearable communications devices 112 and the drive through units 108. In some embodiments, each of the drive through units 108 is configured to communicate according to a corresponding channel (e.g., a first order channel, a second order channel, a third order channel, and a fourth order channel) and the personnel at the windows 28 can selectively establish communicability with the customers at the different order lanes 20 by selectively switching between the channels such that the wearable communications devices 112 are communicatively coupled on a selected one of the channels. In some embodiments, the communications system 100 also facilitates private communication between one or more of the personnel 40 within the store 14 or at other remote locations (e.g., a service center). For example, the personnel may include kitchen personnel 40d that may communicate with any of the personnel 40a, the personnel 40b, or the personnel 40c at the windows 28 via one or more remote channels. In some embodiments, the kitchen personnel 40d may also listen on one or more of the channels on which the customers at the zones 24 can communicate.

Referring particularly to FIG. 2, one of the order zones 24 is shown in greater detail, according to some embodiments. The order zones 24 may include a space or surface of the order lane 20 for the customer, shown as vehicle 30 to pull up and place an order. The order zone 24 may include at least one pressure or force sensor 106. The at least one pressure or force sensor 106 is configured to detect the presence of the vehicle 30 and notify the controller 102 that a customer has arrived to the specific order zone 24 (e.g., pulled up, reversed into, merged into, parked in, etc.). The order zones 24 may also include one or more imaging devices 114 (e.g., cameras, image sensors, sensor arrays) for detecting the presence of the vehicle 30. The drive through units 108 include a display screen 118 configured to display a current order, items in the order, and cost of the order or other aspects of an order property, alone or in any combination. The display screen 118 may be operable by one or more of the personnel 40 who is taking the customer's order. In some embodiments, the order zones 24 may optionally include at least one pressure sensor and/or at least one magnetic ground loop. For example, if the order zones 24 already include a pressure sensor and/or a magnetic ground loop, the controller 102 may communicate with and use feedback from the pressure sensor and/or the magnetic ground loop. In some embodiments, the order zones 24 may lack both a pressure sensor and/or a magnetic ground loop.

The drive through unit 108 may also include a microphone 122 configured to capture audio (e.g., spoken audio) from the customer and transmit data (audio data, audio signals) to the personnel 40 that is taking the customer's order via a corresponding channel of the communications system 100 for the order lane 20 of the order zone 24. In some embodiments, the drive through unit 108 also includes a speaker 120 configured to provide audio data of the voice or spoken words of the personnel 40 obtained by the wearable communication device 112 that is communicating on the channel of the drive through unit 108. In this way, the communications unit 108 may provide a customer end for audio communications and the wearable communications device 112 may provide a personnel end for audio communications between the customer and one of the personnel 40 (e.g., according to an audio or communications channel). In some embodiments, the at least one pressure or force sensor 106, the speaker 120, the microphone 122, the imaging device 114, and the display screen 118 are configured to communicate directly with the controller 102 of the communication system 100. In some embodiments, the pressure or force sensor 106, the speaker 120, the microphone 122, the imaging device 114, and the display screen 118 are configured to communicate with a zone controller 124 that communicates with the controller 102.

Referring again to FIG. 1, the controller 102 and the imaging devices 114 may form a vision system 200. The vision system 200 can be implemented on the controller 102 based on image data received from the imaging devices 114. In some embodiments, the vision system 200 is configured to integrate with one or more POS units of the communications system 100, such as the order taking units 110. The vision system 200 is configured to track vehicles or customers through the drive through system 10 (e.g., along different lanes) and integrate with a POS system. The vision system 200 may trigger notifications to the personnel 40. In some embodiments, the vision system 200 is configured to notify the personnel 40 regarding the presence of a vehicle at one of the drive through units 108. In some embodiments, the vision system 200 is configured to identify which vehicle has arrived at a pickup window and notify associated personnel 40 regarding which order the vehicle at the pickup window should receive. In some embodiments, the vision system 200 is configured to prompt the personnel 40 to open another order taking or drive through lane. In some embodiments, the vision system 200 is configured to notify the kitchen personnel 40d regarding an influx of vehicles 30 to the drive through system 10 to prompt the kitchen personnel 40d to begin preparing food in advance.

Advantageously, the vision system 200 may track vehicles through the drive through system 10 and integrate with POS systems of the drive through system 10. The vision system 200 may facilitate improved order taking, speed of service, and fulfillment accuracy. The vision system 200 integrates directly with the POS units such that graphical user interfaces of the POS units may be updated in real-time based on tracking of vehicles 30 through the drive through system 10 by the vision system 200.

Vision System
Offline Setup

Figure 3:
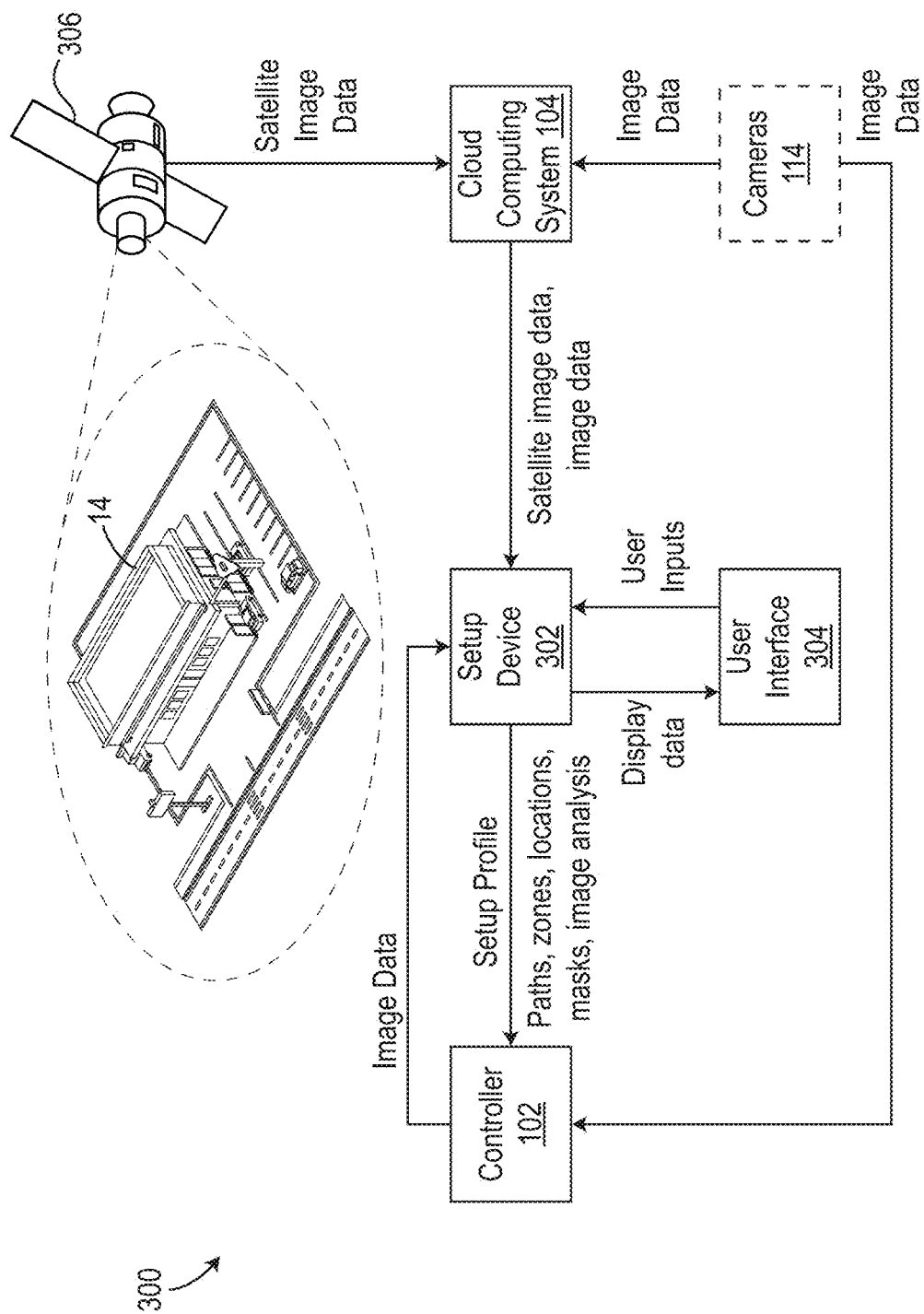
FIG. 3 is a block diagram of a setup system for determining a setup profile of a vision system that is integrated with a point of sale system of a store, according to some embodiments.

Referring to FIG. 3, a setup system 300 for configuring the vision system 200 includes a setup device 302, a user interface 304, the controller 102, the cloud computing system 104, and a satellite 306, according to some embodiments. The setup device 302 is configured to facilitate setting up and configuring the controller 102 to perform image analysis techniques and tracking of vehicles 30 through the drive through system 10. In some embodiments, the setup device 302 is configured to generate a profile or configuration settings for the controller 102. In some embodiments, the setup device 302 is configured to determine the profile or configuration settings for the controller 102 for a specific location or drive through system 10. For example, the setup device 302 may implement one or more set-up functions (e.g., a guide for a user) to determine the profile or configuration settings for the controller 102. The profile or the configuration settings may include paths corresponding to different lanes of traffic of the drive through system 10, and one or more geometric shapes or zones along the paths. The profile or the configuration settings may be location-specific and tailored to the lanes of the specific location of the drive through system 10. In some embodiments, the profile or the configuration settings include one or more preferred operating or alert settings for the store 14 (e.g., for kitchen personnel, for order takers, etc.). In some embodiments, the profile or the configuration settings include integration for the tracking of the vehicles 30 with one or more POS units. It should be understood that any of the functionality of the setup device 302 may be performed locally on the controller 102, or remotely on the cloud computing system 104.

The setup device 302 may obtain satellite image data of the drive through system 10 from the satellite 306. The satellite image data may indicate different lanes of traffic, emergency lanes, parking lots, etc., of a store or restaurant. The setup device 302 is configured to operate the user interface 304 in order to display the satellite image data to a user, according to some embodiments. In some embodiments, the setup device 302 is configured to operate the user interface 304 to prompt the user to provide inputs indicative of one or more paths of the drive through system 10. The paths of the drive through system 10 may correspond to different lanes of traffic for the store 14. The user may provide to the setup device 302, via the user interface 304, one or more points indicating locations along a first path. The user may provide points corresponding to multiple different paths (e.g., a second path, a third path, etc.), corresponding to a number of lanes of traffic or routes. In some embodiments, the setup device 302 is configured to receive the points for each of the one or more paths and perform a curve fitting technique in order to generate the path based on the points. For example, the setup device 302 may implement a variety of curve fitting techniques based on the points, including but not limited to Bezier curves, B-spline curves, Catmull-Rom splines, interpolating Lagrange curves, etc. In some embodiments, the setup device 302 uses the point to generate paths or curves including control points. The control points may correspond to the points provided by the user via the user interface 302 that the setup device 302 uses to generate the curves or paths. In some embodiments, the points provided to the setup device 302 are global positioning system (GPS) coordinates such as latitude and longitude which are used by the setup device 302 to define the curves.

Once the paths or curves for each lane of traffic are determined by the setup device 302, the setup device 302 may operate the user interface 304 to display the paths or curves. The setup device 302 may also receive updates to the curves or paths as user inputs from the user interface 304. The updates to the curves or paths (e.g., the Catmull-Rom splines) may include the addition of or subtraction of control points, the adjustment (e.g., movement) of control points, changing an amount or direction of a tangent of one or more of the control points, etc.

The curves may generally define the lanes of traffic of vehicles 30 through the drive through system 10 and facilitate tracking the vehicles 30 through the drive through system 10 (e.g., from starting location 32 to the ending location 34). In the example drive through system shown in FIG. 1, six different curves may be defined by the user: (i) a first path or curve defined along the entry lane 18, (ii) a second path or curve defined along the first order lane 20a, (iii) a third path or curve defined along the second order lane 20b, (iv) a fourth path or curve defined along the third order lane 20c, (v) a fifth path or curve defined along the fourth order lane 20d, and (vi) a sixth path or curve defined along the pickup lane 22.

In some embodiments, the setup device 302 is configured to determined, based on the paths or curves defined by the user for the drive through system 10, one or more suggested locations for the cameras 114. If the cameras 114 are already installed such that the cameras 114 can obtain image data from a variety of locations of all of the paths or curves, the setup device 302 may proceed to generation and customization of different tracking zones along the paths or curves. In some embodiments, the setup device 302 is configured to select from a variety of different cameras and determine, based on the cameras fields of view, positions and orientations for multiple cameras such that image data of all of the paths or curves can be obtained. In some embodiments, the setup device 302 is configured to provide, via the cloud computing system 104, the satellite image data and the curves or paths superimposed on the satellite image data, to a system administrator of the setup system 300. The system administrator (e.g., a manufacturer of the vision system 200) may provide recommended locations, orientations, and types of cameras for the drive through system 10. The system administrator may further provide, to the setup device 302 via the cloud computing system 104, recommended locations, orientations, and types of cameras for the drive through system 10 based on an on-site or remote inspection, according to some embodiments.

The setup device 302 may be configured to determine multiple zones (e.g., geometric shapes, areas, etc.) along the paths or curves. The setup device 302 may automatically determine the zones along the paths or curves and operate the user interface 304 to display the satellite image data, the paths or curves, the points, and the zones superimposed on the satellite image data. In some embodiments, the user interface 304 is configured to use selections, provided by the user interface 304 as user inputs, and provide different image data from corresponding cameras 114 to the user via the user interface 304 in response to the selections. In some embodiments, the setup device 302 is configured to display the image data to the user interface 304 such that the user may define the zones.

The user interface 304 is configured to receive user inputs to define points in the image data of each of the cameras 114 to define zones along the curves or paths. In some embodiments, the setup device 302 is configured to receive four points for each zone in the image data. The setup device 302 may receive four points for each of the zones, and allow, via operation of the user interface 304, the user to define zones for all of the lanes of traffic that are visible in the image data of one of the cameras 114. After the user has defined the zones for the image data of a first camera 114, the user may select a second camera 114, and proceed to define correspondingly numbered zones for the image data of the second camera 114. This process may be repeated by the user via the user interface 304 and the setup device 302 until all of the zones have been defined for the image data of each of the cameras 114.

The user may be prompted to define the zones and assign corresponding numbers or labels in a uniform manner across the image data from different cameras 114. For example, if a zone A is defined in front of a pickup window, then the zone A should be in front of the pickup window for the image data across different cameras 114. Advantageously, the zones can be used by the controller 102 (e.g., in the profile) in order to track the vehicle 30 through the drive through system 10.

Referring still to FIG. 3, the setup device 302 may receive inputs from the user interface 304 in order to define one or more masks for the image data obtained from the cameras 114. For example, if the first camera 114 includes image data of surrounding areas that vehicles 30 will not be detected in, the user inputs may define a mask for the surrounding areas. In some embodiments, the setup device 302 is configured to provide display data to the user interface 304 such that the user interface 304 displays the image data. The user interface 304 may provide an "eraser tool" to the user, a pen tool, a paintbrush tool, etc., such that the user can provide inputs to define the masks. The setup device 302 may store information of the masks of the image data as a part of the setup profile.

The setup device 302 may also receive user inputs from the user interface 304 defining locations of interest along the paths, curves, or routes. The locations of interest may include an arrival location, a drive through entry location, an order lane entry location, an order location, an order lane exit location, a payment location, an order pickup location, an exit location, etc. In some embodiments, the locations are stored by the setup device 302 and used in order to determine the setup profile. The locations may be point locations or may be tied to corresponding zones. For example, the locations may be labels associated with corresponding zones (e.g., zone 501 is the order pickup zone).

The setup device 302 is configured to provide the setup profile to the controller 102 for use in operating the drive through system 10, according to some embodiments. In some embodiments, the setup profile includes (i) the paths, routes, or curves for the different lanes of traffic (e.g., entry lanes, parking lot lanes or routes, order lanes, pickup lanes, emergency lanes, exit lanes, etc.), (ii) the zones along the lanes of traffic (e.g., a series of geometric shapes that follow the lanes of traffic) for the satellite image data, and the image data from each of the cameras 114, (iii) one or more locations of interest, (iv) and an image analysis technique or set of instructions. In some embodiments, the image analysis technique is provided in the form of a neural network, an artificial intelligence, a machine learning technique or set of instructions, etc. The image analysis technique may be performed by the controller 102 locally such that the controller 102 can use the image data provided by the cameras 114 in order to detect a type and color of vehicle. In some embodiments, performing the image analysis technique locally at the controller 102 of the drive through system 10 facilitates ensuring privacy of the image data.

Figure 4:
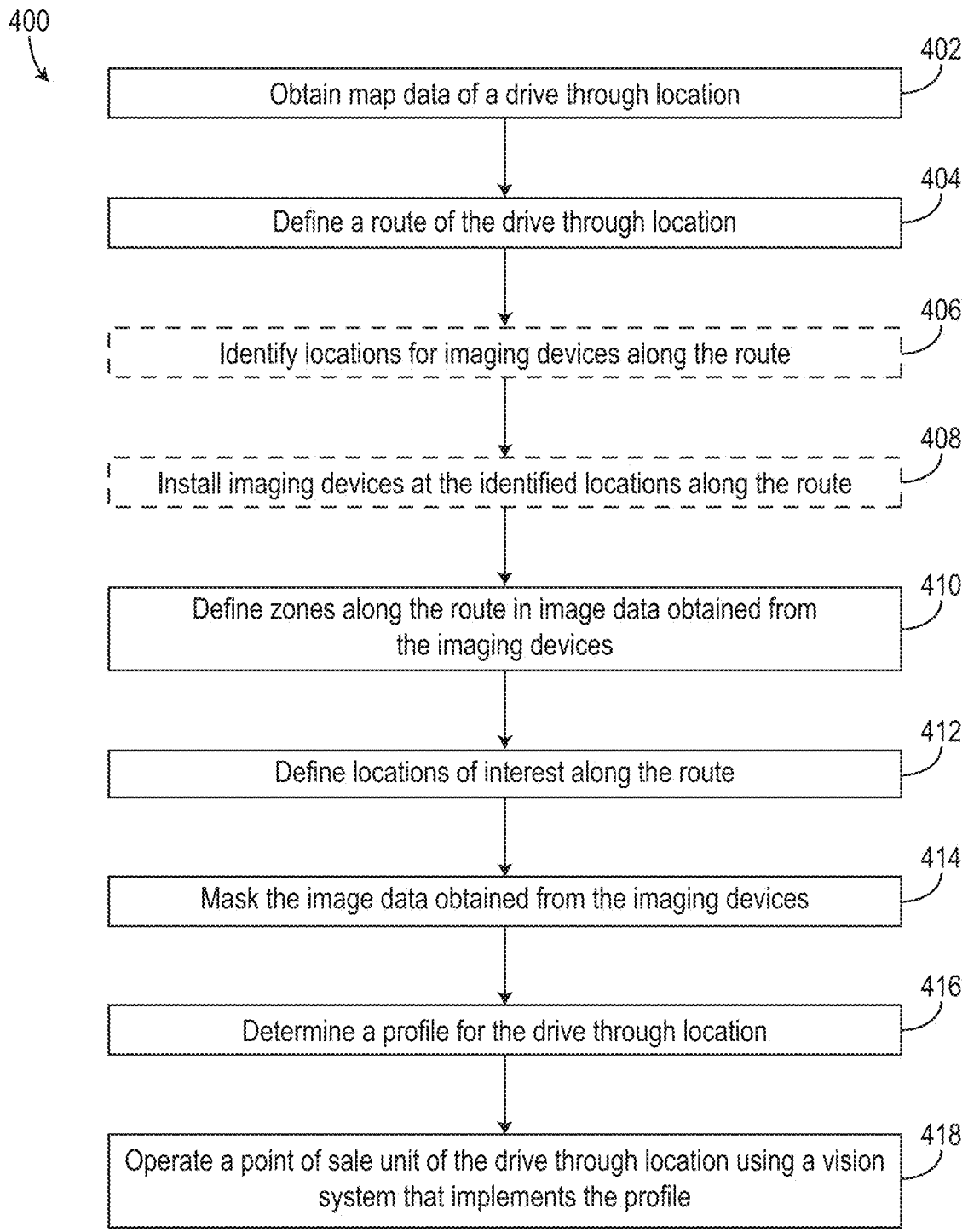
FIG. 4 is a flow diagram of a process for operating point of sale units of a point of sale system using image data of a drive through system, according to some embodiments.

Referring to FIG. 4, a flow diagram of a process 400 for setting up a vision tracking system and implementing the vision tracking system in an integrated manner with a POS unit includes steps 402-418, according to some embodiments. In some embodiments, the process 400 is implemented by the setup system 300 or components thereof, and the controller 102 of the drive through system 10. In some embodiments, the process 400 is implemented in order to set up a profile in a location-specific area or for a specific restaurant location.

The process 400 includes obtaining map data of a drive through location (step 402), according to some embodiments. In some embodiments, the map data of the drive through location is satellite image data. In some embodiments, the map data of the drive through location is obtained by the setup device 302 from the cloud computing system 104 or the satellite 306. The map data may otherwise be obtained from a database, a maps service, a satellite image database, a drone that is flown around the drive through location, etc.

The process 400 includes defining a route of the drive through location (step 404), according to some embodiments. In some embodiments, step 404 includes operating a user interface, display screen, computer screen, tablet, touch screen, etc., in order to display the map data obtained in step 402. Step 404 may also include allowing the user, via a user interface, to provide one or more points that define the route. The points may be geographic (e.g., GPS) coordinates and may define different locations along a lane of traffic. In some embodiments, step 404 is performed by the setup device 302. The setup device 302 may implement a curve-fitting technique (e.g., Catmull-Rom) based on the points defined by the user in order to determine the define the route. In some embodiments, step 404 includes defining multiple routes by allowing the user to input, via a user device, multiple points for each of multiple routes. For example, the different routes may correspond to different lanes of traffic (e.g., multiple order lanes, emergency lanes, parking lot locations or lanes of traffic, pickup lanes, entry lanes, exit lanes, etc.).

The process 400 includes identifying locations for imaging devices along the route (step 406), according to some embodiments. In some embodiments, step 406 is optional. For example, if cameras are already installed at the drive through location, then step 406 may be unnecessary. In some embodiments, step 406 is performed automatically by the setup device 302 based on an identification of the routes, possible mounting locations, as well as camera models, fields of view, etc. In some embodiments, step 406 is performed by a manufacturer or installation service of a vision system for the drive through location. For example, the map data and the route(s) obtained in steps 402-404 may be provided to the manufacturer or installation service. The manufacturer or installation service may provide suggestions regarding the locations, orientations, and models of the imaging devices (e.g., cameras) in order to obtain image data of the entirety of the route from multiple locations.

The process 400 includes installing imaging devices at the identified locations along the route (step 408), according to some embodiments. In some embodiments, step 408 includes installing imaging devices (e.g., cameras) at the locations identified in step 406 about the drive though location. Step 408 may include installing posts or poles and imaging devices at the top of the posts or poles for locations where additional imaging devices are required. In some embodiments, step 408 is optional if the drive through location already has imaging devices installed on the premises. Step 408 may be performed by the manufacturer of the vision system for the drive through location, an installation service, etc.

The process 400 includes defining zones along the route in image data obtained from the imaging devices (step 410), according to some embodiments. In some embodiments, step 410 is performed by the setup device 302 based on inputs from a user (e.g., via the user interface 304). For example, step 410 may include defining multiple zones (e.g., geometric shapes, areas, etc.) along the routes determined in step 404 for each of multiple imaging devices. In some embodiments, step 410 is performed by first prompting the user to define multiple zones or locations along the routes for the map data of the drive through location. In some embodiments, the setup device 302 is configured to automatically map the zones defined by the user (or automatically by defining zones along the routes) in the map data to the image data of the imaging devices. In some embodiments, the setup device 302 is configured to use one or more of a location, orientation, height, field of view, etc., of the imaging devices in order to automatically identify preliminary boundaries (e.g., edges, corners, etc.) for the zones in the image data of the imaging devices. The zones along the route may be definable by the user for the image data of the imaging devices and/or may be adjustable if an initial definition of the zones is provided automatically. The setup device 302 may prompt the user to define the zones in a manner that is consistent across the image data obtained from the imaging devices. For example, if a zone A is defined at a first order location (e.g., an order placement location in front of the drive through unit 108) in image data obtained from a first imaging device, and the image data obtained from a second imaging device includes the first order location from a different perspective, the user may be prompted to define a zone at the first order location in the image data obtained from the second imaging device as zone A. In this way, the zones may be consistently defined in a uniform manner between the image data obtained from multiple imaging devices in order to account for different perspectives or views of a same location along the routes. Step 410 may be performed for any number of routes that are defined in step 404.

The process 400 includes defining locations of interest along the route (step 412), according to some embodiments. In some embodiments, step 412 is performed by the setup device 302 by prompting the user to input, via the user interface 304, one or more locations of interest. The locations of interest may include an entry location, an exit location, a location with a best view of an incoming vehicle for use in image analysis, an entry to a first order lane, an entry to a second order lane, an entry to a third order lane, an entry to a fourth order lane, a first, second, third, or fourth order location, an exit to any order lane, a first window location, a second window location, a pickup order location, etc. In some embodiments, step 412 is performed by labelling one or more of the zones defined in step 410 along the route as any of the locations. In this way, identification of a vehicle in one of the zones may result in identification that the vehicle is at a location of interest (e.g., that a vehicle has pulled up to a first order location). The locations of interest may be used in order to integrate the vision system with a POS unit. The locations of interest may also be used in order to identify performance parameters of the drive through location (e.g., service time, total life cycle time of a vehicle in the drive through location, etc.).

The process 400 includes masking the image data obtained from the imaging devices (step 414), according to some embodiments. In some embodiments, step 414 is performed by the setup device 302 and the user interface 304. For example, the setup device 302 may operate the user interface 304 to provide image data of the imaging device and allowing the user to define one or more zones or areas of the image data within which vehicles are unlikely to be detected. The user interface 304 may provide a pen tool, an eraser tool, a paintbrush tool, etc., for the user to define the zones or areas of the image data as the masks. The masks defined in step 414 generally define regions of the image data obtained from each of the imaging devices that should not be used or considered by the vision system when tracking vehicles through the drive through location. For example, if the image data from the imaging device includes surrounding areas (e.g., sidewalks, background image data, surroundings, etc.) where a vehicle is unlikely to be detected, the mask may remove the corresponding regions of the image data from consideration in image analysis and tracking. In some embodiments, the masks indicate areas of the image data that should be considered by the image analysis and tracking techniques (e.g., an area of interest). The masks can facilitate speed and accuracy of the image analysis and tracking techniques performed on the image data obtained from the imaging device. In some embodiments, the masks define areas or regions that have extraneous image data.

The process 400 includes determining a profile for the drive through location (step 416), according to some embodiments. In some embodiments, the profile is a configuration file or dataset for a controller (e.g., the controller 102) of the drive through location. The profile may include the map data obtained in step 402, the route(s) defined in step 402, the locations and orientations of each of the imaging devices, the zones defined in step 410, the locations of interest defined in step 412, the masks defined in step 414, and an image analysis technique. The profile may be location-specific for the particular drive through location and accounts for the unique camera placement, lanes of traffic shapes, distances, curvatures, the parking lot size, overall store arrangement, order locations, pickup locations, etc., of the specific drive through location for which process 400 is performed. In some embodiments, the profile is a locally-executable file for the controller of the drive through location. The profile may configure the controller of the drive through location to perform one or more image analysis and vehicle tracking techniques as desired. In some embodiments, the profile utilizes one or more of a neural network, a machine learning technique, an artificial intelligence tool, etc., that is provided by the manufacturer of the vision system described herein that can be implemented locally on the controller of the drive through location. If updates to the profile are desired, a drive through location administrator may re-initiate any of steps 402-416 in order to account for updates to lane configuration, construction at the store, closing of order lanes, etc. Step 416 may be performed by the setup device 302 by providing the profile to the controller 102.

The process 400 includes operating a POS unit of the drive through location using a vision system that implements the profile (step 418), according to some embodiments. In some embodiments, step 418 is implemented by the controller 102 of the drive through location. For example, the controller 102 may implement the profile and identify incoming customers' vehicles and track the customers vehicles through the various lanes of traffic (e.g., along the routes). The controller 102 may track the vehicles as the vehicles travel along the routes and pass from one zone to the next along the routes. In response to the vehicle approaching to an order location, the controller 102 may operate a POS unit (e.g., associated with an order taker) to notify the order taker that a customer has arrived at the order location. The POS unit may be operated to prompt the order taker to initiate an order for the customer at the order location, and may include providing information regarding the customer at the order location (e.g., color of vehicle, type of vehicle, etc.). Step 418 may also include operating a display screen or an alert device (e.g., an audiovisual system, an alarm, an LED display, a speaker configured to provide an audible notification) to drive through personnel fulfilling orders to customers that pull up to an order pickup location. For example, step 418 may include operating the display screen to notify personnel regarding the POS data, as well as the type of the vehicle and the color of the vehicle as the vehicle is identified at the order pickup location. Advantageously, notifying the personnel who fulfill orders to the customers regarding the POS data, as well as identifying characteristics of the vehicle associated with the POS data improves order fulfillment accuracy and reduces a likelihood that the wrong order is provided to the customers (e.g., reducing order mix-ups).

Figure 5:
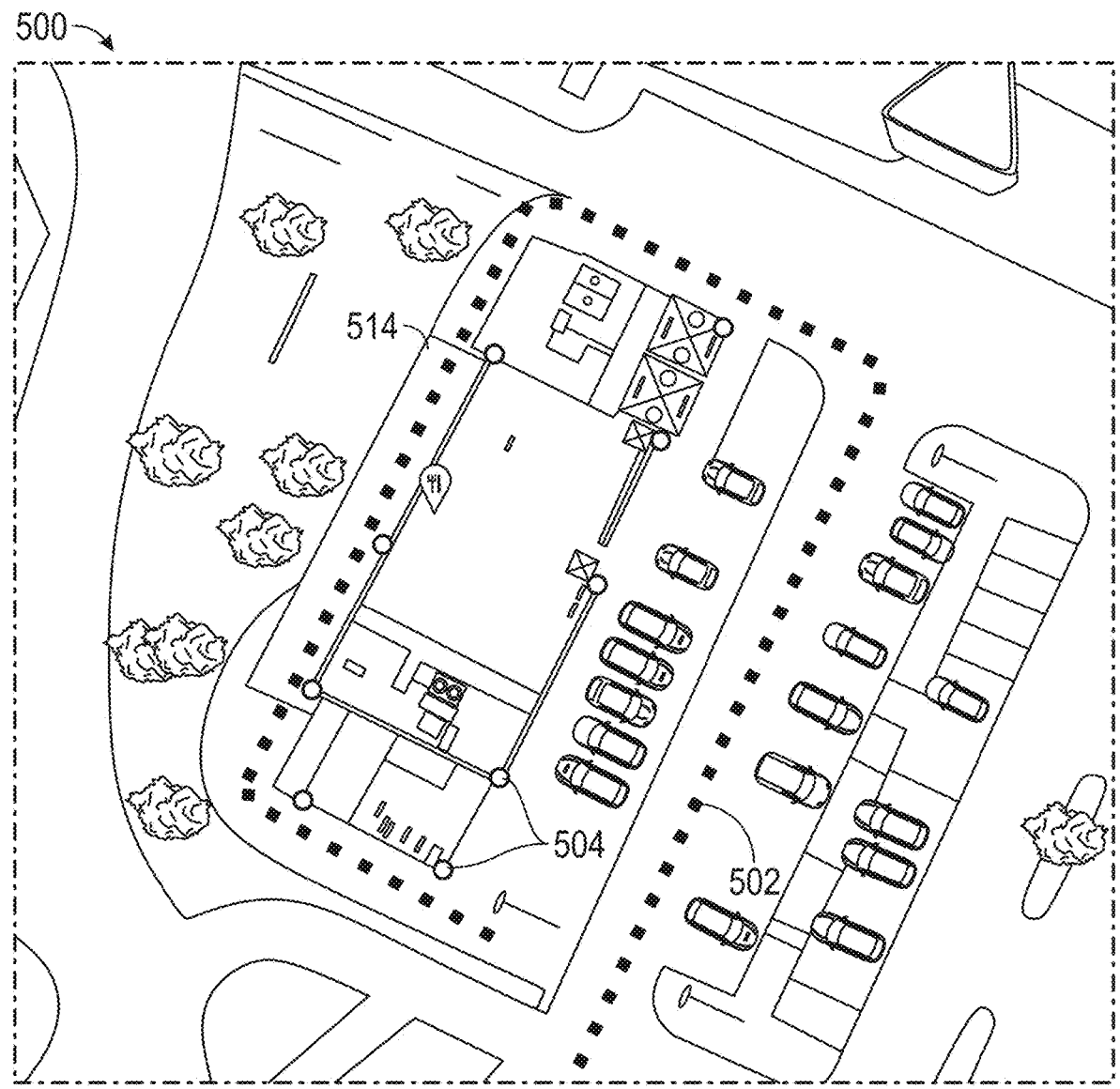
FIG. 5 is satellite data of a store with a defined drive through route and camera locations, according to some embodiments.

Referring to FIG. 5, a diagram illustrates map data 500 (e.g., satellite data) of a particular restaurant 514. The map data 500 includes a route 502 (e.g., a drive through route, a lane of travel, etc.) that extends around the restaurant 514 from an entry point to an order location, to a payment or pickup location, to an end point. In some embodiments, the route 502 is user-defined by presenting the map data 500 to the user (e.g., the owner of the restaurant 514) and allowing the user to define points for the route 502. In some embodiments, the map data 500 includes camera locations 504 that can be automatically suggested and populated on the map data 500 by the setup device 302. The camera locations 504 may be provided as suggested locations by an administrator or manufacturer of a vision system. The camera locations 504 are provided such that cameras or imaging devices, when positioned at the camera locations 504, are configured to obtain image data of an entirety of the route 502.

Figure 6:
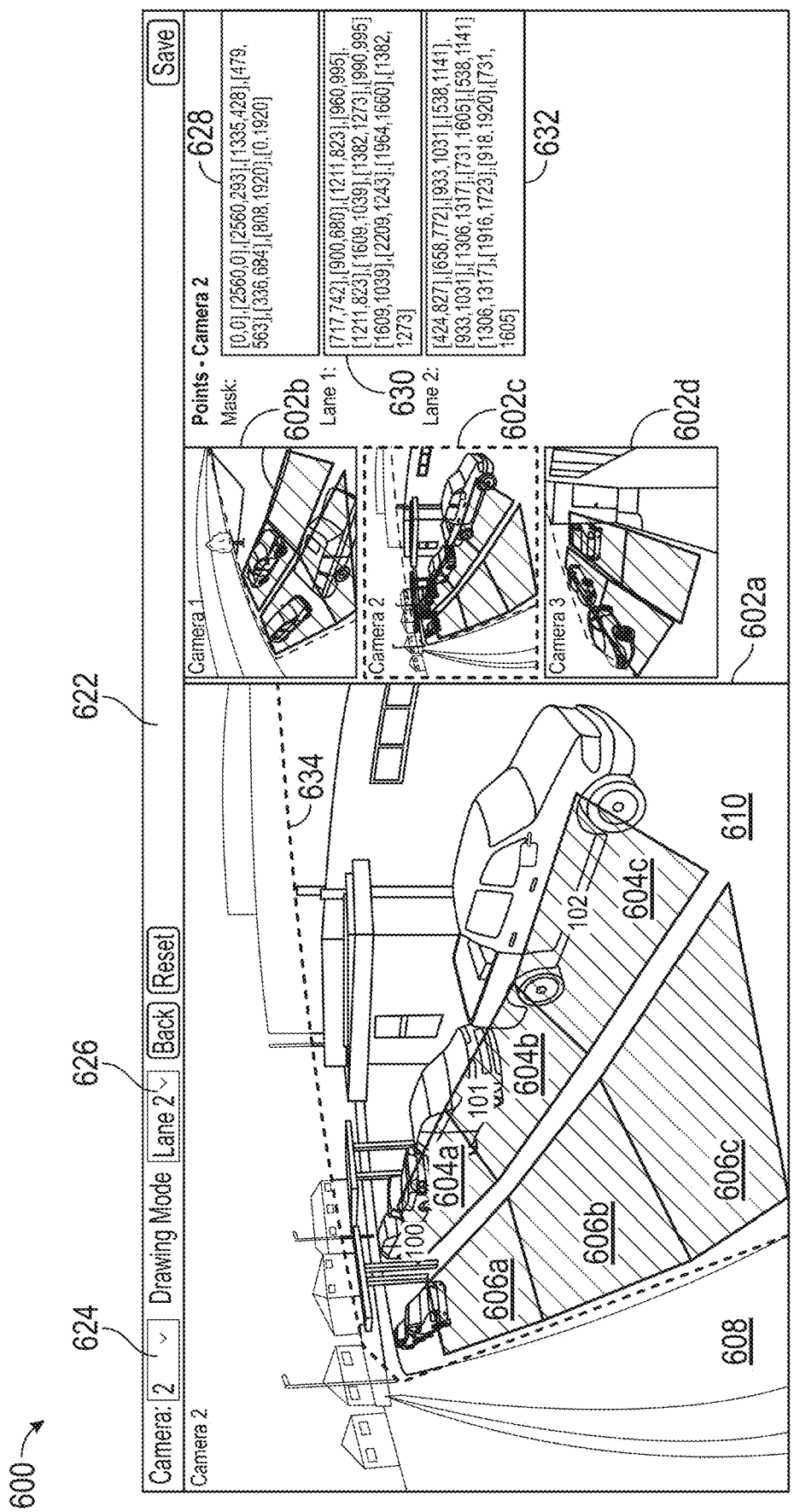
FIG. 6 is a graphical user interface (GUI) of a user interface of the setup system of FIG. 3, according to some embodiments.

Referring to FIG. 6, a graphical user interface (GUI) 600 illustrates information that may be displayed on the user interface 304 during setup, according to some embodiments. In some embodiments, the GUI 600 includes an editing window 602a (e.g., a first window). The editing window 602a presents image data 610 from a selected one of the cameras 114. For example, as shown in FIG. 6, the editing window 602a includes image data 610 associated with "Camera 2." The user may define a boundary 634 of a mask 608 in the editing window 602a. In some embodiments, the user may define the boundary 634 of the mask 608 using a mouse cursor, a pen tool, a paint brush, a stylus on a tablet, etc. The mask 608 defines portions of the image data (e.g., ranges or areas of pixel) of the associated camera 114 that should be disregarded by an image analysis technique of the controller 102. The mask 608 generally causes the controller 102 to disregard portions of the image data 610 that are surrounding or background image data of lanes of travel. In some embodiments, the mask 608 defines areas of interest and disinterest in the image data 610 obtained from the corresponding camera 114. For example, the mask 608 may focus the controller 102 to analyze portions of the image data 610 corresponding to lanes of travel of the restaurant 14.

The GUI 600 also includes a toolbar 622 including a camera selector 624 (e.g., buttons, a drop-down menu, selectable options, etc.) and a lane selector 626, according to some embodiments. In some embodiments, the lane selector 626 allows the user to select between multiple lanes to edit a series of zones 604 or zones 606 corresponding to the selected lane. In the example shown in FIG. 6, the restaurant 14 includes two lanes that are viewable by the "Camera 2." The user may select between a first lane and a second lane in order to edit zones for the first lane or the second lane. In the example shown in FIG. 6, the first lane includes a series of zones 604, shown as first zone 604a, second zone 604b, and third zone 604c. The second lane includes a similar series of zones 706, shown as first zone 704a, second zone 704b, and third zone 606c. In some embodiments, when the second lane is selected at the lane selector 626, the user may control points or corners of each of the zones 606 (e.g., adding points, moving points, removing points, etc.) in order to define the zones 606. Once the user has appropriately defined the corners of the zones 606 of the second lane, the user may select the first lane via the lane selector 626 and repeat the process for the first lane. The user may define correspondingly labeled zones (e.g., first zone, second zone, third zone, etc.) for lanes of each of the cameras 114. For example, the zone 604b of the first lane is proximate a window in the image data 610 shown in the editing window 602a (e.g., the "Camera 2" image data). The user may similarly define the second zone 604b as in front of the window for image data obtained from other cameras 114 that also include the window such that the labeling of the zones 604 and 606 is consistent across different camera 114.

Referring still to FIG. 6, the GUI 600 includes a first preview pane 602b, a second preview pane 602c, and a third preview pane 602d. The second preview pane 602c may correspond go "Camera 2." The first preview pane 602b corresponds to "Camera 1" and the third preview pane 602c corresponds to "Camera 3." In some embodiments, in response to receiving a selection of different cameras 114 via the camera selector 624, the GUI 600 provides the image data 610 of the selected camera 114 on the editing window 602a. The user may then define the mask 608 and boundary 634 of the mask for each of the cameras 114, as well as the zones 604 or 606 for the lanes, similarly as described above with reference to "Camera 2."

In some embodiments, the GUI 600 includes a first side pane 628 (e.g., an information display area) corresponding to the mask 608. The first side pane 628 displays information corresponding to points or pixels of the boundary of the mask 634. The GUI 600 includes a second side pane 630

(e.g., an information display area) corresponding to the first lane and the zones 604 of the first lane. In some embodiments, the second side pane 630 illustrates which pixels or points of the corresponding camera 114 define the zones 604 (of the first lane). In some embodiments, the GUI 600 includes a third side pane 632 that illustrates which pixels or points of the corresponding camera 114 define the zones 606 (of the second lane). In some embodiments, the information displayed in the first side pane 628, the second side pane 630, and the third side pane 632 are unique for each of the cameras 114. The information displayed in the first side pane 628, the second pane 630, and the third side pane 632 may be a part of the setup profile that is provided from the setup device 302 to the controller 102 for each camera 114 at the restaurant 14.

Figure 7:
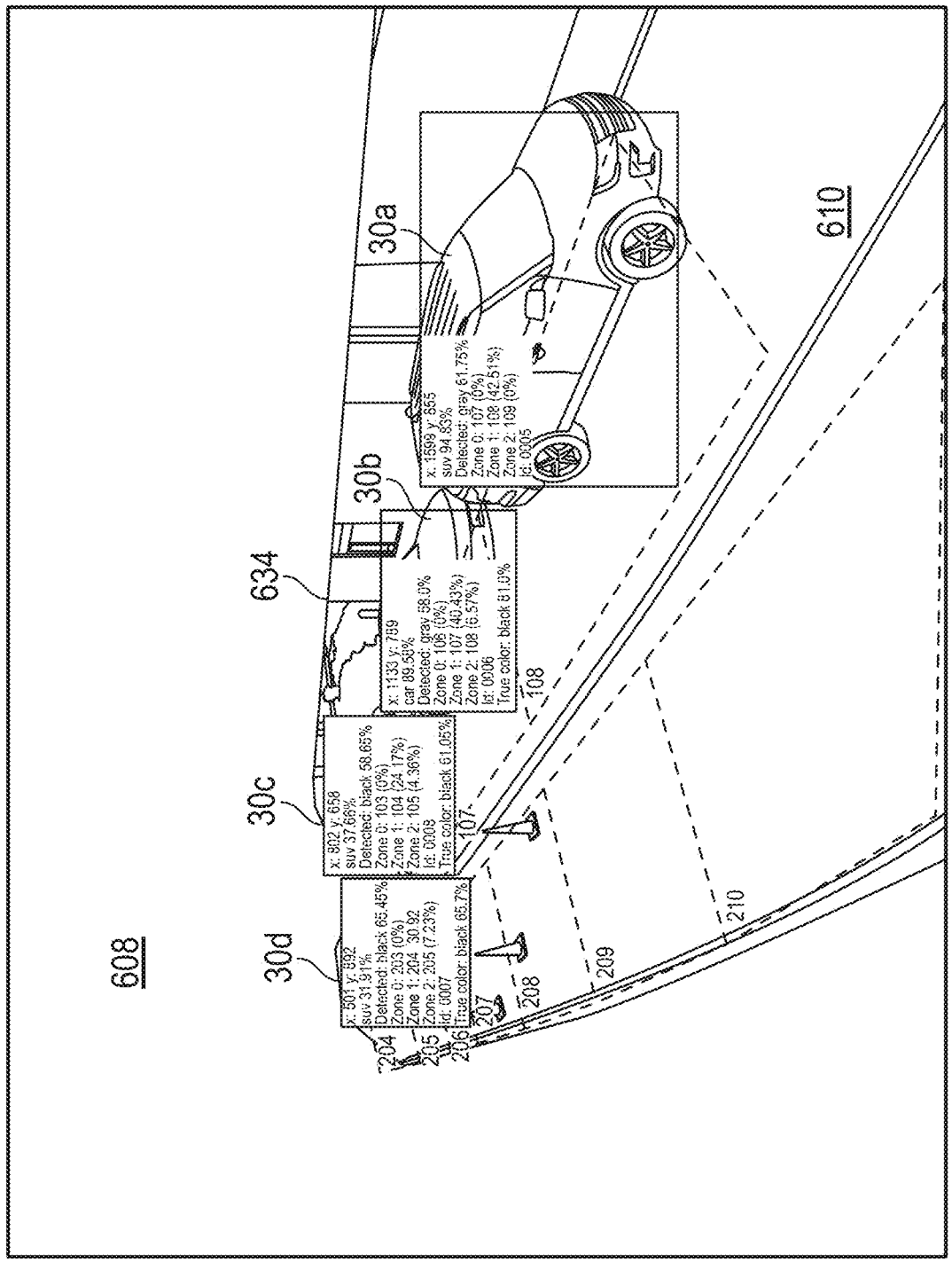
FIG. 7 is another GUI of the user interface of the setup system of FIG. 3, according to some embodiments.

Referring to FIG. 7, a diagram 700 illustrates the image data 610 of the "Camera 2" shown in FIG. 6 in an on-line implementation of the setup profile, according to some embodiments. As shown in FIG. 7, the image data 610 of the "Camera 2" includes masked out image data at mask 608 (e.g., clipped portions of the image data 610, disregarded portions of the image data 610, etc.). In some embodiments, the masked out image data, shown blocked by mask 608, are disregarded by the controller 102 during implementation of image analysis techniques in order to improve the performance of the controller 102.

Figure 8:
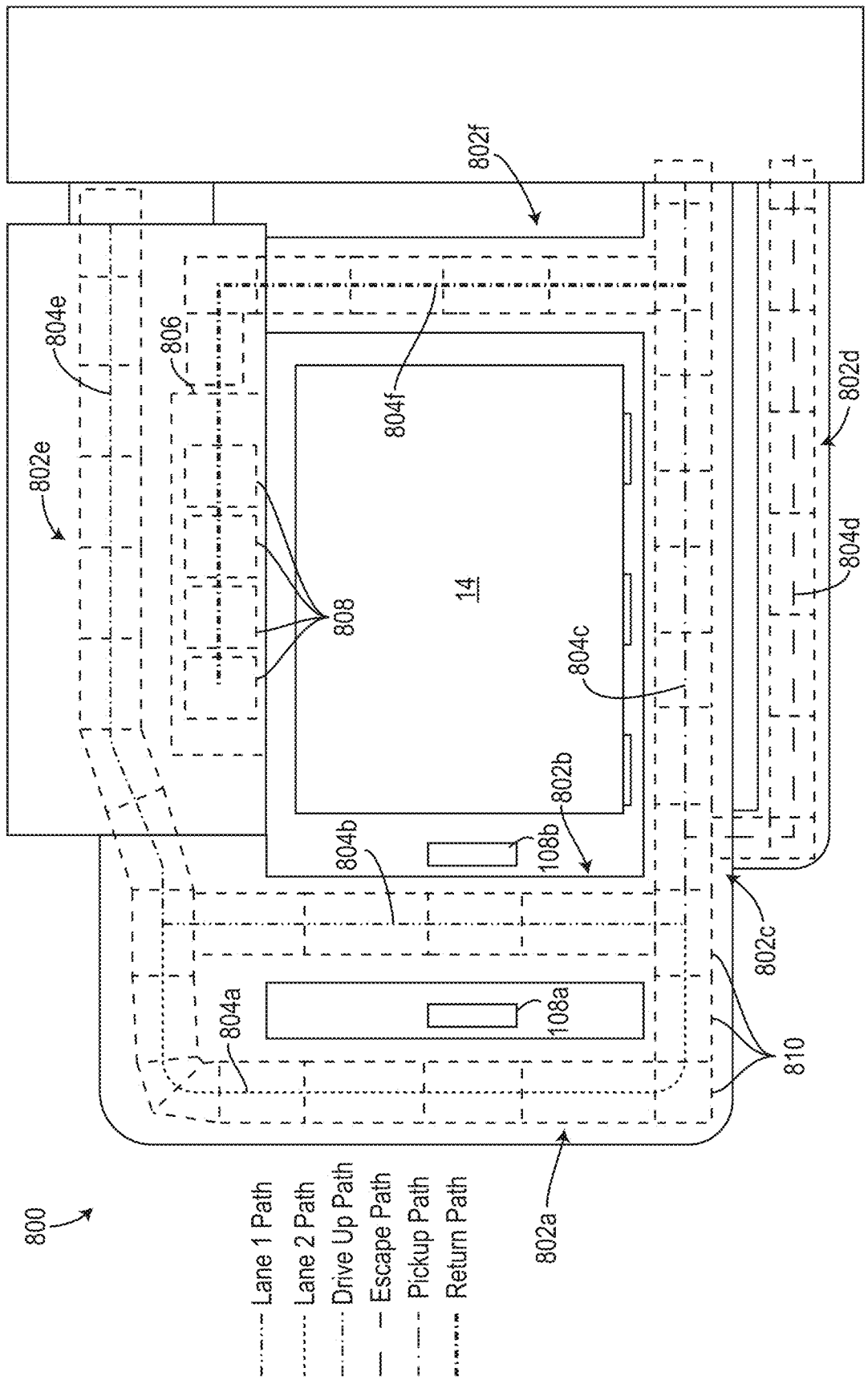
FIG. 8 is a diagram of a setup profile of a drive through system including different lanes, according to some embodiments.

Referring to FIG. 8, various lanes of travel may be defined by the user or store owner about the store 14. The lanes of travel can include, but are not limited to, a first order lane 802a, a second order lane 802b, a pickup lane 802c, an emergency or exit lane 802d (e.g., a fire lane), an entry lane 802e, and a return lane 802f. In some embodiments, the various lanes of travel include or are defined by paths 804 that extend through the lanes 802. For example, the first order lane 802a includes a first order lane path 804a, the second order lane 802b includes a second order lane path 804b, the pickup lane 802c includes a pickup path 804c, the emergency or exit lane 802d includes an exit path 804d, the entry lane 802e includes an entry path 804e, and the return lane 802f includes a return path 804f. Each of the lanes 802 may include corresponding zones 810 defined along the paths 804 having unique identifiers. In some embodiments, the paths 804 and corresponding zones 810 are defined by the user during creation of the setup profile as described in greater detail above with reference to FIGS. 3-7. The paths 804 and zones 810 may be consistently defined between different perspectives of cameras 114 such that the cameras 114 provide a comprehensive and unified tracking of vehicles 30 along the zones 810 and paths 804.

The exit lane 802d may be an escape or emergency lane to provide a point of egress from the pickup lane 802c. The exit lane 802d may be defined from a point of the pickup lane 802c to a road or exit location surrounding the store 14. In some embodiments, the return lane 802f includes the return path 804f that wraps around from the pickup lane 802c to one or more parking spots 808 at a front of the store 14. The parking spots 808 may each include corresponding zones for parking to await a carry out order. In some embodiments, the parking spots 808 are positioned at a pickup location 806 at a front of the store 14.

It should be understood that the vision system 200 that is setup for the store 14 as shown in FIG. 8 may include cameras 114 configured to obtain image data of all of the paths 804. The cameras 114 may be configured to provide the image data of each of multiple zones 810 along the paths 804 to the controller 102 during on-line implementation of the setup profile.

Online Implementation

Figure 9:
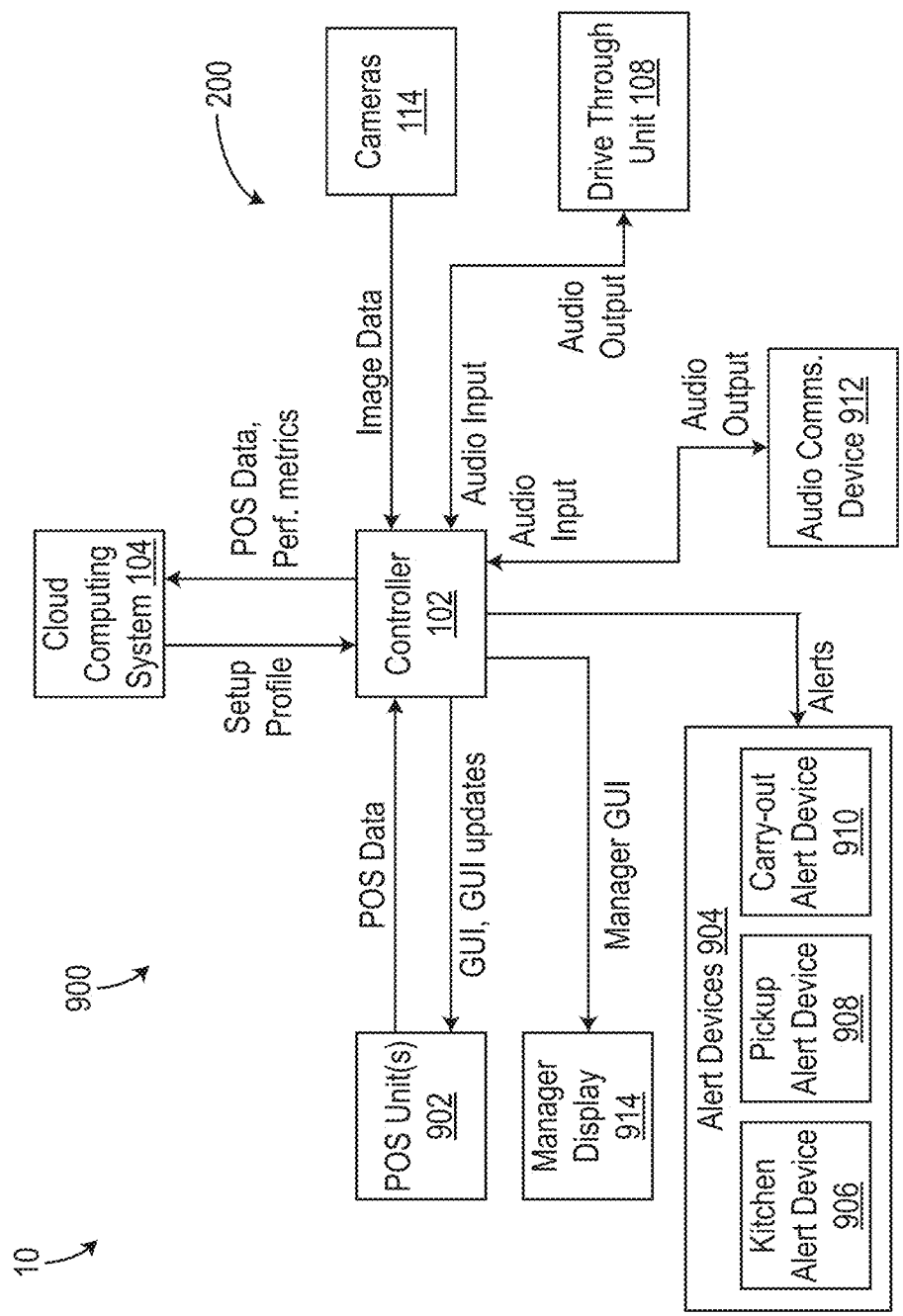
FIG. 9 is a block diagram of a point of sale system for the drive through system of FIG. 1 that integrates a vision system with point of sale units, according to some embodiments.

Referring to FIG. 9, the cloud computing system 104 may provide the setup profile to the controller 102 once the setup profile is fully generated. In some embodiments, the controller 102 and the vision system 200 are integrated into a POS system 900 of the drive through system 10. The controller 102 is configured to use the setup profile in order to control operation of one or more POS units 902. The controller 102 may also control operation of one or more alert devices 904 of the store 14 to provide feedback to employees of the store 14. The controller 102 receives image data from the cameras 114 and uses the setup profile with the image data to track vehicles 30 through the drive through system 10. In some embodiments, the controller 102 is configured to control operation of the POS units 902 based on the tracking and location of different vehicles 30 through the drive through system 10.

The POS units 902 may be positioned at any windows (e.g., windows 28) of a restaurant or store. For example, both pickup windows at which orders are fulfilled and payment windows at which customers pay for their items may include corresponding POS units 902, in addition to other display screens. In another example, pickup windows (e.g., an order fulfillment window) may include both a display screen (e.g., a kitchen display screen, a tablet, a fulfillment display screen, etc.) and a POS unit 902. The display screens and the POS units 902 may be operated by the controller 102 based on the image data from the cameras 114 in order to provide characteristics of the vehicles 30 (e.g., type and color) according to one or more modalities (e.g., textual information, visual information such as icon that represent the characteristics of the vehicles 30). The display screens and the POS units 902 may be operated based on tracking the vehicles 30 in a virtual space based on the zones that are defined when setting up the profile for the image data of each of the cameras 114. As described in greater detail above, the zones may be defined differently for the image data of each camera 114 in order to account for different perspectives, orientations, positions, fields of view, etc., of the cameras 114 which results in the image data of the zones spanning different areas of the image data (e.g., different pixel regions). The definition of the zones accounts for the different locations, sizes, etc., of the image data of the zones in the image data of the cameras 114 such that the controller 102 can consistently track vehicles 30 through the drive through system 10 from camera to camera. The definition of the zones facilitates seamless tracking of the vehicles 30 through the drive through system 10 despite different perspectives and positioning of the camera 114.

The controller 102 may obtain the image data from each of the cameras 114 in real-time. In some embodiments, when a vehicle 30 first arrives at the drive through system 10, the controller 102 may use an initial image of the vehicle 30 to determine (1) a color of the vehicle 30, and (2) a type of the vehicle 30. In some embodiments, the controller 102 is configured to implement an image analysis technique using the initial image of the vehicle 30 to determine (1) the color of the vehicle 30, and (2) the type of the vehicle 30. In some embodiments, the controller 102 includes different predetermined colors such as red, blue, orange, black, white, green, etc. In some embodiments, the controller 102 is configured to determine, using the image analysis technique and the initial image of the vehicle 30, which of the predetermined colors to which the color of the vehicle 30 corresponds. In some embodiments, the controller 102 includes different predetermined types of vehicles such as car, truck, SUV, Jeep, etc. In some embodiments, the controller 102 is configured to determine, using the image analysis technique and the initial image of the vehicle 30, which of the predetermined types of vehicle to which the type of the vehicle 30 corresponds.

In some embodiments, the controller 102 is configured to use the paths and zones along the paths in the setup file to track location of the vehicle 30 throughout a lifecycle of the vehicle 30. In some embodiments, the controller 102 is configured to track which of the zones the vehicle 30 travels along or at which the vehicle 30 is currently located. For example, the controller 102 may identify that the vehicle 30 is traveling along the first order lane path 804a by detecting the vehicle 30 at zones along the first order lane path 804a. In some embodiments, the controller 102 is configured to use the image analysis techniques and one or more locations of interest (e.g., tagged or identified zones) to determine if the vehicle 30 has arrived at a specific location. The controller 102 may use the locations of interest (e.g., the tagged or identified zones) and the detection of the vehicles 30 at the locations of interest to operate corresponding POS units 902, or the alert devices 904. For example, in response to detecting that the vehicle 30 has arrived at a first order location, the controller 102 may operate corresponding POS units 902 to notify staff (e.g., order taking staff) that the vehicle 30 is awaiting service at a particular drive through unit 108. The controller 102 may operate the POS units 902 to notify the order taking staff regarding the color and the type of the vehicle 30 that is at the particular drive through unit 108. In this way, the vision system 200 (e.g., the image data of the cameras 114, the image analysis and tracking techniques performed by the controller 102, etc.) can be integrated with the POS units 902 of the store 14. The POS units 902 may be display screens, the order taking stations 110, etc.

In some embodiments, the POS units 902 may be operated by the order taking staff. POS data resulting from the POS units 902 may be provided to the controller 102. The controller 102 may operate alert devices 904 responsive to at least one of the POS data obtained from the POS units 902, or based on results of the image analysis techniques performed using the image data.

In some embodiments, the controller 102 is configured to operate a pickup alert device 908 or a carry-out alert device 910. In some embodiments, the pickup alert device 908 is a display screen positioned proximate a window at which the vehicle 30 pulls up or arrives at in order to receive their order. The controller 102 may track the vehicle 30 to the window, and in response to the vehicle 30 arriving at the window, operate the pickup alert device 908 to display the color of the vehicle 30 and the type of the vehicle 30 that is at the window. In some embodiments, the controller 102 is also configured to operate the pickup alert device 908 to display POS data such as an order number, items in the order, a name of the customer in the vehicle 30, etc. In this way, the POS data of the customer in the vehicle 30 may be tied to the detected color and type of the vehicle 30, which may be displayed to staff as the staff fulfill the order to the customer in the vehicle 30. Advantageously, displaying POS data (e.g., order information) in combination with characteristics of the vehicle 30 to receive the order (e.g., the type and color of the vehicle 30) facilitates accurate order fulfillment and reduces a likelihood of the incorrect order or items being handed to customers.

Referring still to FIG. 9, the controller 102 is also configured to operate the carry-out alert device 910 to notify carry out staff regarding a customer awaiting carry out. In some embodiments, for example, during busy times of the day, the staff may instruct customers in the vehicles 30 to pull around to the pickup location 806. The controller 102 may receive an input from the POS units 902 that a specific customer has been asked to pull to the pickup location 806. The controller 102 is configured to track the vehicle 30 of the specific customer as the vehicle 30 travels to the pickup location 806, and identify a zone at which the vehicle 30 parks (e.g., which of the parking spots 808 that the vehicle 30 parks at). The controller 102 may operate the carry-out alert device 910 to notify the carry out staff regarding the POS data (e.g., the order data, a customer's first name, etc.), the characteristics of the customer's vehicle 30 (e.g., the color and type of the car), as well as which of the parking spots 808 that the vehicle 30 has parked at. In some embodiments, the carry-out alert device 910 is a display screen (e.g., a touch screen, a user interface, etc.). The carry-out alert device 910 may provide the POS data, the characteristics of the customer's vehicle 30, and which of the parking spots 808 the vehicle 30 is located by presenting textual information, a graphical representation of the vehicle 30 and the corresponding parking spot 808, or any combination thereof.

Referring still to FIG. 9, the controller 102 may also operate the drive through unit(s) 108 and one or more audio communications devices 912. In some embodiments, the audio communications devices are wearable headphones or wearable communications devices configured to be worn by staff or personnel of the store 14 in order to establish communications with the drive through units 108 (e.g., audio communications). The audio communications devices 912 may each include one or more speakers and one or more microphones for providing and obtaining audio (e.g., the microphones are configured to obtain audio input, and the speakers are configured to provide audio output). The drive through units 108 may similarly include speakers and microphones for providing a second end of audio communications. In some embodiments, the controller 102 is configured to implement one or more audio channels to facilitate bi-directional audio communication between the audio communications devices 912 and the drive through units 108. In some embodiments, the audio communications device 912 are operated based on the vehicle 30 detected at an order location by the controller 102 to prompt the order taker to switch to a channel to take the customer's order.

The controller 102 may also be configured to count a number of customers (e.g., a number of vehicles 30) that are in line awaiting order. In some embodiments, the number of customers that are in line at the drive through system 10 awaiting their turn to place an order is referred to as a "stack size." In some embodiments, during busy times of day, the controller 102 may identify that a number of vehicles 30 have wrapped around the store 14, into a parking lot, onto the street, etc. The controller 102 may use the image data provided by the cameras 114 of surrounding areas of the store 14 (e.g., the parking lot, an adjacent road, an entrance to the parking lot, etc.), and determine the stack size of the drive through system 10. In some embodiments, the controller 102 is configured to record a time of day and corresponding stack size. The time of day and corresponding stack size may be used by the controller 102 in order to track busy times of day and initiate preparatory actions for preparing food and/or beverage items before the busy times of day.

In some embodiments, the controller 102 is configured to operate one or more kitchen alert devices 906 responsive to the stack size. In response to detecting a stack size above a threshold using the image data provided by the cameras 114, the controller 102 may initiate cooking operations by prompting kitchen staff to prepare food and/or beverage items. The controller 102 may initiate the cooking operations or preparatory actions (e.g., a kitchen action) by operating the one or more kitchen alert devices 906. In some embodiments, the controller 102 uses a predetermined set of instructions based on the stack size to determine which preparatory actions to initiate. For example, if the controller 102 includes historical data that 90% of customers typically order a specific type of food and/or beverage item that requires a significant amount of time to prepare, the controller 102 may prompt the kitchen staff, based on the stack size, to initiate preparation of a corresponding amount of the food and/or beverage item. In this way, the controller 102 may initiate kitchen options using the image data provided by the cameras 114. In some embodiments, the controller 102 is configured to operate the POS unit(s) 902 or a manager display screen 914 to display the stack size of the drive through system 10.

Figure 10:
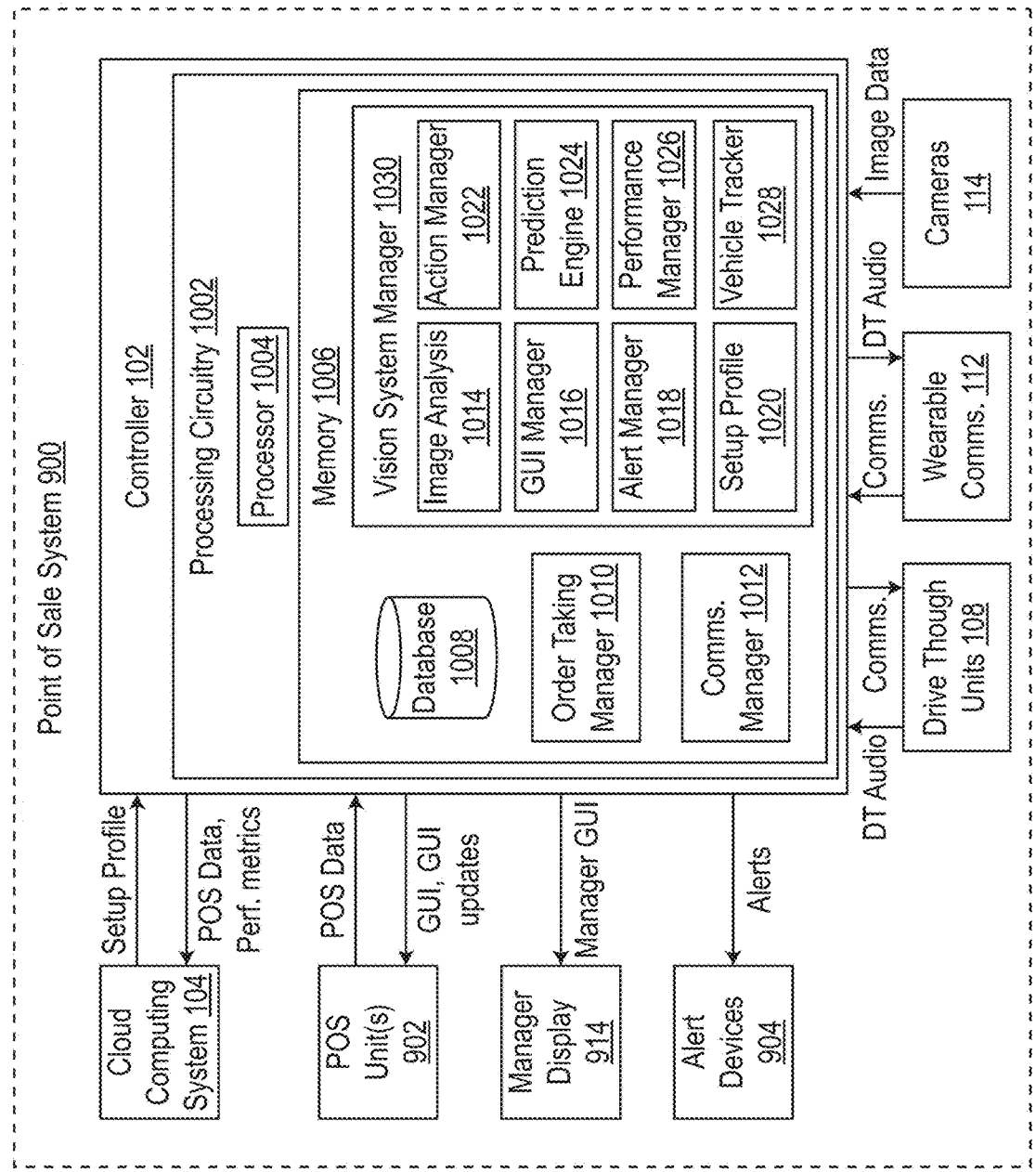
FIG. 10 is a block diagram of a controller of the point of sale system of FIG. 9, according to some embodiments.

Referring to FIG. 10, the POS system 900 is shown in greater detail. The controller 102 is shown to include includes processing circuitry 1002, a processor 1004, and memory 1006. Processing circuitry 1002 can be communicably connected to a communications interface such that processing circuitry 1002 and the various components thereof can send and receive data via the communications interface. Processor 1004 can be implemented as a general purpose processor, an application specific integrated circuit (ASIC), one or more field programmable gate arrays (FPGAs), a group of processing components, or other suitable electronic processing components.

Memory 1006 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1006 can be or include volatile memory or non-volatile memory. Memory 1006 can include database components, object code components, script components, or any other type of information structure for supporting the various activities and information structures described in the present application. According to some embodiments, memory 1006 is communicably connected to processor 1004 via processing circuitry 1002 and includes computer code for executing (e.g., by processing circuitry 1002 and/or processor 1004) one or more processes described herein.

In some embodiments, controller 102 is implemented within a single computer (e.g., one server, one housing, etc.). In various other embodiments controller 102 can be distributed across multiple servers or computers (e.g., that can exist in distributed locations). For example, controller 102 can be made up of multiple controllers or microcontrollers that individually or collectively are configured to carry out operations as described herein.

The controller 102 is configured to obtain the setup profile from the cloud computing system 104, and store the setup profile in the memory 1006, shown as setup profile 1020. The controller 102 may use the setup profile in order to implement the techniques described herein, or to configure the controller 102 to implement the techniques as described herein. In some embodiments, the controller 102 is also configured to provide POS data and performance metrics to the cloud computing system 104. The controller 102 may also receive POS data or performance metrics of other drive through systems 10 from the cloud computing system 104.

The controller 102 includes a database 1008, an order taking manager 1010, a communications manager 1012, and a vision system manager 1030, according to some embodiments. The database 1008 may be configured to store POS data, menu data, performance data, historical metrics of busy times, inventory or stock, personnel identification, etc. In some embodiments, the order taking manager 1010 is configured to retrieve menu data from the database 1008 for use in constructing a GUI of the POS units 902, or to update the GUI of the POS units 902 (e.g., when an item is out of stock, when a price of the item has changed, etc.). In some embodiments, the order taking manager 1010 is configured to implement any of the techniques as described in U.S. application Ser. No. 17/325,871, now U.S. Pat. No. 11,244,681, filed May 20, 2021, the entire disclosure of which is incorporated by reference herein.

Referring still to FIG. 10, the communications manager 1012 is configured to route traffic between the drive through units 108 and the wearable communications device 112. In particular, the communications manager 1012 may define various channels such that the wearable communications devices 112 are configured to switch between the various channels. Each of the drive through units 108 may communicate on an assigned channel that the wearable communications device 112 can switch between. In particular, the communications manager 1012 is configured to route audio traffic from the drive through units 108 (e.g., drive through audio) to the wearable communications devices 112 and vice versa (e.g., the communications provided by the wearable communications devices 112 are provided to the drive through units 108). In some embodiments, the switching of the wearable communications devices 112 is achieved by selection or input on the display screen of the POS units 902.

The vision system manager 1030 is configured to integrate the vision system 200 (e.g., the cameras 114) with the POS units 902. The vision system manager 1030 may be configured to implement an image analysis technique 1014 using the image data obtained from the cameras 114. In some embodiments, the image analysis technique 1014 is implemented using a neural network, a machine learning technique, a deep learning technique, an artificial intelligence, etc. The image analysis 1014 is configured to detect the presence of a vehicle in the image data provided by the cameras 114 as well as a color and type of the vehicle.

The vision system manager 1030 also includes a vehicle tracker 1028. The vehicle tracker 1028 is configured to use the setup profile 1020 (e.g., the zones of the setup profile 1020) and track the vehicles detected by the image analysis 1014 through the drive through system 10. In particular, the vehicle tracker 1028 may use the detection of the color and type of the vehicle 30 provided by the image analysis 1014 in combination with a map including the zones. The vehicle tracker 1028 may output notifications of the vehicle 30 traveling into zones of interest. The vehicle tracker 1028 is configured to track position, speed, change in position, etc., of the vehicles 30 in the drive through system 10.

The GUI manager 1016 is configured to use the tracking of the vehicles 30 provided by the vehicle tracker 1028 and the color and type of the vehicles 30 provided by the image analysis 1014 to generate or adjust the GUI that is provided to the POS units 902. In particular, when a vehicle arrives at one of the drive through units 108 as identified by the vehicle tracker 1028, the GUI manager 1016 may update a corresponding icon of the GUI that is displayed on the POS units 902 to visually indicate the color and type of the vehicle 30. The GUI manager 1016 may also adjust the GUI of the POS units 902 such that the POS units 902 display textual information of the color and type of the vehicle 30 that is present at the drive through units 108. The order takers (e.g., users of the POS units 902) may select corresponding drive through units 108 via the POS units 902 in order to switch their wearable communications device 112 to the drive through unit 108 at which the vehicle 30 is detected.

In some embodiments, the order takers may initiate an order taking process for the customer of the vehicle 30 (e.g., by adding items to the order). Once the order taking process is complete, the POS unit 902 may provide the POS data (e.g., order information, order number, etc.) which is provided to the database 1008 and the vehicle tracker 1028. The vehicle tracker 1028 may record an identifier of the POS data and tie the POS data with the vehicle 30. In this way, as the image analysis 1014 continues to use newly obtained image data to identify the vehicle 30 in the image data, and the vehicle tracker 1028 tracks the vehicle 30 through the drive through system, the POS data (e.g., order data, customer name, items in order, total cost, etc.) may be linked with the vehicle 30. Responsive to the vehicle tracker 1028 indicating that the vehicle 30 has arrived at a pay window or a pickup window (e.g., the first window 28*a*, the second window 28*b*, etc.), the GUI manager 1016 may operate POS units 902 to indicate that the vehicle 30 (with the linked POS data) has arrived at the pay window or the pickup window. Advantageously, the POS units 902 are integrated with the vision system 200 such that the POS units 902 can be updated responsive to tracking of vehicles 30 through the drive through system 10. Similarly, the vehicle tracker 1028 may track vehicles through the drive through system 10 while linking the POS data of the vehicle 30 with the tracking. The GUIs that are generated by the GUI manager 1016 based on results of the vision system manager 1030 using the image data may be any of the GUIs described in greater detail below with reference to FIGS. 12-15.

In some embodiments, the GUI manager 1016 is also configured to generate a manager GUI and operate the manager display 914 to provide the manager GUI. The manager GUI may be any of the GUIs described in greater detail with reference to FIGS. 16-18. In some embodiments, the manager display 914 is a separate display screen that is presented to all personnel of the store 14 on a separate display screen. In some embodiments, the manager display 914 is a store manager or administrator's display screen that is accessible remotely (e.g., via the cloud computing system 104). The manager GUI generally displays an overall map of the drive through system 10, icons of detected vehicles along the map of the drive through system 10 that visually indicate colors and types of the vehicles, and POS data for each of the vehicles 30 (e.g., an indication).

In some embodiments, the POS data includes order data that may be selected and viewed by selecting the icons of the manager GUI. In some embodiments, the manager GUI is generated by the GUI manager 1016 using results of the vehicle tracker 1028, the image analysis 1014, the POS data, and the setup profile 1020. The manager GUI may include a visualization (e.g., textual, an icon, etc.) of a stack size of vehicles 30 in the drive through system 10. The stack size indicates a number of vehicles 30 that are beyond a certain point (e.g., upstream of the drive through units 108, upstream of an entrance of the drive through system 10, etc.) or between other vehicles 30 in the drive through system 10. The manager GUI may also display various performance metrics or characteristics of the drive through system 10. The manager GUI may also display vehicles 30 at a carry-out (take-out, pick-up) location (e.g., that have been ordered by staff to pull to a parking spot) and vehicles awaiting a mobile pickup order.

The vision system manager 1030 includes a performance manager 1026 that is configured to use results of the vehicle tracker 1028 to determine one or more performance characteristics of the drive through system 10. In some embodiments, the performance manager 1026 is configured to identify, based on the results of the vehicle tracker 1028, when a vehicle arrives at an entry point of the drive through system 10. The performance manager 1026 may record a time at which each vehicle arrives at the entry point. The time at which the vehicle 30 arrives at the entry point may be linked to the particular vehicle 30. The performance manager 1026 may also record a time at which the vehicles 30 each arrive at one of the drive through units 108. The performance manager 1026 may also record a time at which the customers in the vehicles 30 begin their order (e.g., once the order taker switches to communicating via the drive through units 108). The performance manager 1026 can also record a time at which the customers in the vehicles 30 complete their order. The performance manager 1026 may also record a time at which the customers in the vehicles 30 arrive at a first window (e.g., a payment window) and a second window (e.g., a pickup window). The performance manager 1026 may also record a time at which the customers in the vehicles 30 have their orders fulfilled. In some embodiments, the performance manager 1026 is configured to use any of the recorded times to estimate various quantities of elapsed time. For example, the performance manager 1026 may estimate a total amount of time that it takes each vehicle 30 to enter the drive through system 10, place their order, pick up their order, and exit the drive through system 10. The performance manager 1026 may determine an average amount of time it takes a vehicle to arrive, order, receive their order, and exit the drive through system 10. In some embodiments, the performance manager 1026 is configured to track any of a number of vehicles that are commanded to pull over to a pickup location, a number of vehicles 30 that leave the drive through system 10 without ordering (e.g., due to the line being too long), an average amount of time that a customer waits at the drive through units 108 to begin placing an order, an average amount of time it takes a customer to place their order once initiated, number of vehicles 30 in the drive through system 10, a number of customers served so far for the day, etc.

The performance manager 1026 may be configured to provide any of the performance characteristics or metrics described herein to the cloud computing system 104. The performance manager 1026 may receive performance metrics or rankings of the store 14 from the cloud computing system 104. For example, the ranking may indicate which place the store 14 is in relative to other stores in the area or in a chain. The ranking of the store 14 may be determined based on any of the performance metrics or characteristics described herein (e.g., average time for a customer to enter the drive through system 10, place their order, receive their order, and leave the drive through system 10).

In some embodiments, the performance manager 1026 is configured to provide any of the performance characteristics or metrics of the drive through system 10 to the GUI manager 1016 for display on the POS units 902 or the manager display 914. In some embodiments, the performance manager 1026 is configured to store any of the performance metrics or characteristics of the drive through system 10 in the database 1008. The performance manager 1026 may also provide ranking of the drive through system 10 to the GUI manager 1016 for display on the POS units 902 or the manager display 914.

The vision system manager 1030 may include a prediction engine 1024, an action manager 1022, and an alert manager 1018, according to some embodiments. In some embodiments, the prediction engine 1024 is configured to use historical (e.g., seasonal historical data) of demand at the drive through 10 to predict actions that should be taken by kitchen staff or personnel of the drive through system 10. For example, the prediction engine 1024 may predict busy times, and provide the results of the predicted busy times of the store 14 to the action manager 1022. The action manager 1022 is configured to use the results of the prediction engine 1024 in order to identify actions that should be taken to prepare for busy times of the store 14, and prompt the alert manager 1018. The alert manager 1018 is configured to provide alerts to the alert devices 904 to notify staff of the store 14 regarding the identified actions. Identified actions may include preparation of certain food and/or beverage items, an amount of food and/or beverage items to be prepared, sending out line busters with handheld POS units, opening new lanes, etc.

The action manager 1022 may use outputs from the prediction engine 1024 and may also use outputs from the performance manager 1026. In some embodiments, outputs of the performance manager 1026 include the stack size, and indicate real-time or current data of the drive through system 10 as opposed to predicted data. In some embodiments, the action manager 1022 may defer to using results of the performance manager 1026 which indicate real-time performance metrics as opposed to using the outputs of the prediction engine 1024. For example, if the prediction engine 1024 predicts, based on historical data, that there is a likelihood that ten customers are present in the drive through system 10 at a current time, but the image data indicates that twenty-five customers are present in the drive through system 10 (e.g., as indicated by the outputs of the performance manager 1026), the action manager 1022 may use the results of the image data instead of the outputs of the prediction engine 1024. In some embodiments, the action manager 1022 is configured to use a machine learning technique in order to determine one or more cooking or kitchen operations that should be performed responsive to number of customers in the drive through system 10. For example, the action manager 1022 may use a known percentage of customers that will order a specific type of food and/or beverage item, and initiate preparation of a corresponding amount of the specific type of food and/or beverage item based on the number of customers in the drive through system 10.

The action manager 1022 may also determine if it is appropriate to open an additional lane based on the current number of customers. In some embodiments, the action manager 1022 is configured to observe the average amount of time for a customer to enter the drive through system 10, place their order, receive their order, and exit. In response to the average amount of time exceeding a threshold, the action manager 1022 may determine that the additional lane should be opened, and may either initiate the opening of the additional lane automatically, or may prompt a store manager to open the additional lane. Similarly, the action manager 1022 may initiate or prompt opening the additional lane in response to the total number of customers in the drive through system 10 exceeding a threshold or in response to the stack size exceeding a threshold.

The alert manager 1018 is configured to receive actions or determinations of the action manager 1022, and operate the alert devices 904 to prompt staff to perform the action(s) determined by the action manager 1022. For example, the alert devices 904 may be kitchen alert devices such that the alert manager 1018 initiates preparation of food and/or beverage items in accordance with the determinations of the action manager 1022. Similarly, the alert devices 904 may be alert devices for order takers or staff personnel to open new lanes. In some embodiments, the GUI manager 1016 is configured to operate the manager GUI to prompt the manager to initiate opening the additional lane. The manager of the store may be presented with a request to open the additional lane, and provide via the manager display 914 confirmation to open the additional lane. Responsive to receiving the confirmation from the manager, the alert manager 1018 may operate the alert devices 904 to notify order taking personnel to open the additional lane.

Figure 11:
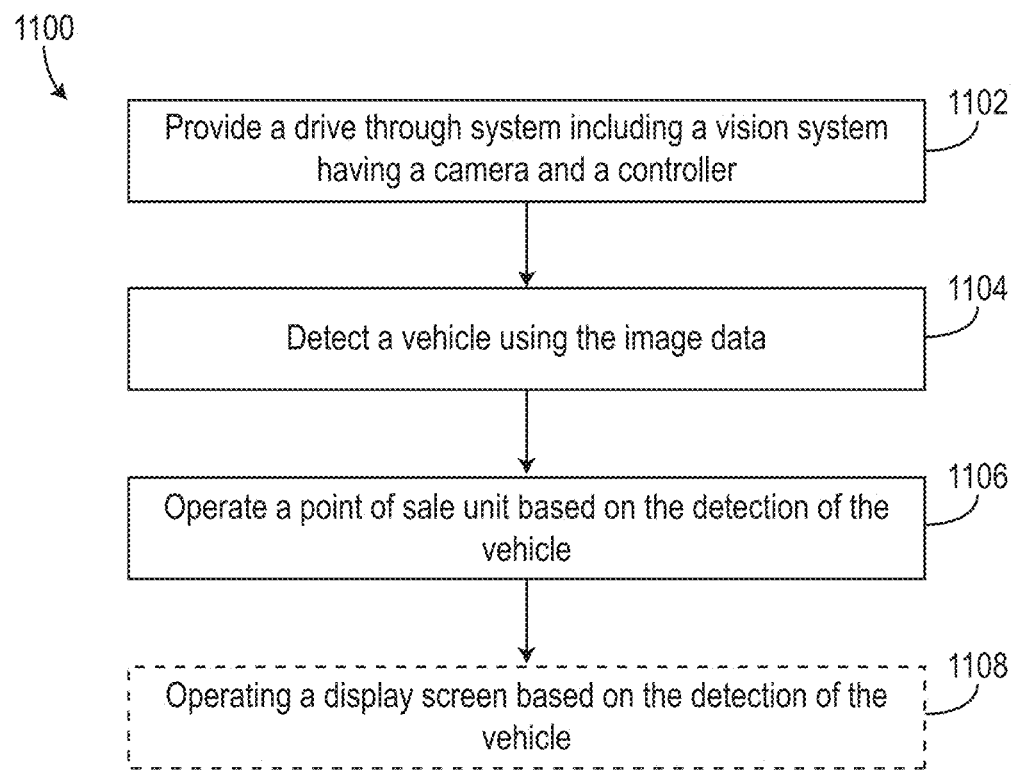
FIG. 11 is a flow diagram of a process for operating point of sale units of a point of sale system of a drive through using image data from a vision system, according to some embodiments.

Referring to FIG. 11, a flow diagram of a process 1100 of operating a drive through system includes steps 1102-1108, according to some embodiments. The process 1100 may be implemented by the controller 102 using local techniques without uploading image data to a cloud computing system. In some embodiments, the process 1100 illustrates implementation and use of the profile in process 400. In some embodiments, the process 1100 as described herein is performed as step 418 of process 400 (e.g., implementing the profile).

The process 1100 includes providing a drive through system including a vision system having a camera and a controller (step 1102), according to some embodiments. The vision system may be installed at a drive through of a store or restaurant. The vision system can include the camera configured to obtain image data of different lanes, pickup windows, order locations, exit lanes, emergency lanes, parking lots, etc. In some embodiments, the vision system includes multiple cameras that are positioned along different lanes of travel. The cameras may be positioned at locations, heights, and orientations as suggested or determined in step 406 of process 400.

The process 1100 includes detecting a vehicle using the image data (step 1104), according to some embodiments. In some embodiments, step 1104 includes obtaining the image data at the controller from the camera. Detecting the vehicle may include identifying a color (e.g., black, red, blue, purple, green, brown, white, etc.) and a type of the vehicle (e.g., compact car, sedan, SUV, truck, etc.). In some embodiments, step 1104 includes using an image analysis technique (e.g., a machine learning technique, an artificial intelligence, a neural network, etc.) in order to predict the color and type of the vehicle in the image data. Step 1104 can also be used to detect a location of the vehicle. In some embodiments, step 1104 includes detecting which of multiple zones along various routes of the drive through system at which the detected vehicle is currently located. In some embodiments, step 1104 is performed simultaneously with steps 1106 and 1108 in real-time in order to track the vehicle's location. Step 1104 may also include detecting a speed or motion of the vehicle. Step 1104 may also include detecting if the vehicle is stopped or parked. In some embodiments step 1104 is performed by the controller (e.g., controller 102).

The process 1100 includes operating a POS unit based on the detection of the vehicle (step 1106), according to some embodiments. In some embodiments, step 1106 includes operating the POS unit of an order taker in order to notify the order taker regarding the detection of the vehicle. For example, the POS unit may be operated to notify the order taker that the vehicle has arrived at an order location. In some embodiments, operating the POS unit includes prompting the order taker to initiate an order process. In some embodiments, operating the POS unit includes providing a notification of the color and type of the vehicle. In some embodiments, operating the POS unit includes providing a graphical representation of the vehicle that visually illustrates both the color and type of the vehicle. Step 1106 may include notifying an order taker to switch to an audio channel to take the customer's order. Step 1106 may be performed by the controller 102.

The process 1100 includes operating a display screen based on the detection of the vehicle (step 1108), according to some embodiments. The display screen may be a display screen positioned within a kitchen of the store or restaurant, a display screen for a store owner or manager, a display screen at a station (e.g., an order take out station), etc. The alert may include providing a graphical representation of all vehicles in the drive through system. The alert may additionally or alternatively include recommendations to open a new lane (e.g., a store manager operation), perform cooking operations (e.g., a kitchen operation), carry out an order to a customer that is parked in a pickup zone (e.g., a take out operation), etc. The alert may additionally or alternatively include providing notifications regarding the color and type of the detected vehicle at a particular location. In some embodiments, the alert includes POS or order data provided simultaneously with at least one of a snapshot of the detected vehicle or the color and type of the detected vehicle. For example, the display screen may be positioned at an order pickup window facing staff that has the responsibility of handing orders (e.g., food and/or beverage items) to customers at the order pickup window. Step 1108 may include operating the display screen to provide both (1) order data (e.g., POS data, order number, order identification, first name of customer, etc.) and (2) vehicle data (e.g., a snapshot of the vehicle, the color and type of the vehicle, etc.). Providing the order data and the vehicle data simultaneously can facilitate improved order fulfillment accuracy and reduce a likelihood that one customer's order is handed to another customer.

POS GUIs

Referring to FIGS. 12-15, the POS unit(s) 902 may be configured to display various graphical user interfaces (GUIs) provided by the controller 102. The controller 102 may operate the POS units 902 to display the GUIs using the image data provided by the cameras 114. Advantageously, the controller 102 is configured to integrate the vision system 200 (e.g., the image data and the analysis performed by the controller 102 based on the image data) with the POS units 902.

Referring to FIG. 12, a first GUI 1200 includes a lane pane 1202 (e.g., a lane window), a windows pane 1204 (e.g., a windows lane), a carry out pane 1206, and an order take out pane 1208, according to some embodiments. In some embodiments, the lane pane 1202 is configured to display data regarding each of multiple lanes. In particular, the lane pane 1202 includes an entry, box, window, icon, widget, or pane corresponding to each drive through unit 108 of different lanes. The windows pane 1204 may provide data regarding customers that are present at multiple pickup windows of the drive through system 10. The carry out pane 1206 may provide data regarding carry out orders (e.g., customers parked in parking spots 808). The order take out pane 1208 may provide data regarding various take out orders.

The lane pane 1202 may be configured to display data corresponding to each of the drive through units 108 and the corresponding vehicles 30 that are present at each of the drive through units 108 (either currently placing an order, or awaiting to place an order). In particular, the lane pane 1202 may display both the color and the type of the car that is present at the drive through units 108 as determined by the controller 102 using the image data. For example, as shown in FIG. 12, a blue SUV is currently present at the drive through unit 108 of lane 3, and a black car is present at the drive through unit 108 of lane 1. The lane pane 1202 may be updated in real-time by the controller 102 based on determinations by the controller 102 using the image data. For example, when the controller 102 determines, using the image data, that a blue SUV has arrived at the drive through unit 108 of lane 3, the controller 102 may adjust the GUI 1200 of the POS units 902 in order to notify the order takers that a blue SUV has arrived at the drive through unit 108 of lane 3. In some embodiments, the lane pane 1202 includes multiple selectable icons that display the color and type of the vehicles 30 that are present at the drive through units 108 of each lane. In some embodiments, GUI 1200 is configured to display vehicle information relating to the characteristic of the vehicle and order information for an order received from an occupant of a drive through to provide compiled order information. The vehicle information and order information may be processed at a single one of the POS units 902 or by multiple POS units 902. Further, controller 102 is configured to update a display of the compiled order information during a service journey of the vehicle at the drive through. The service journey corresponds to the total course from entry to exit at the drive through.

Figure 13:
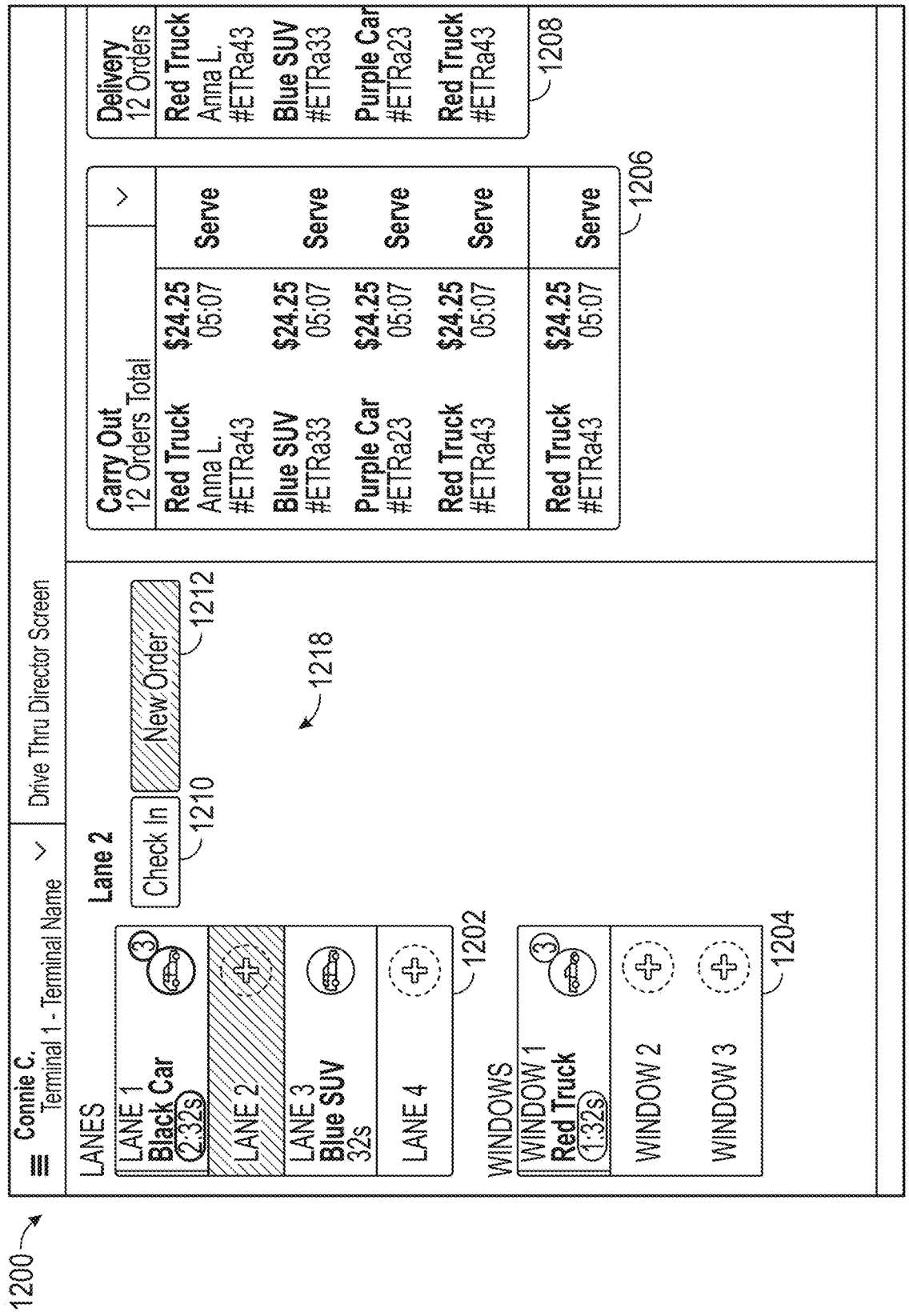
FIG. 13 is another GUI of a point of sale unit that is updated using image data of the vision system, according to some embodiments.
Figure 14:
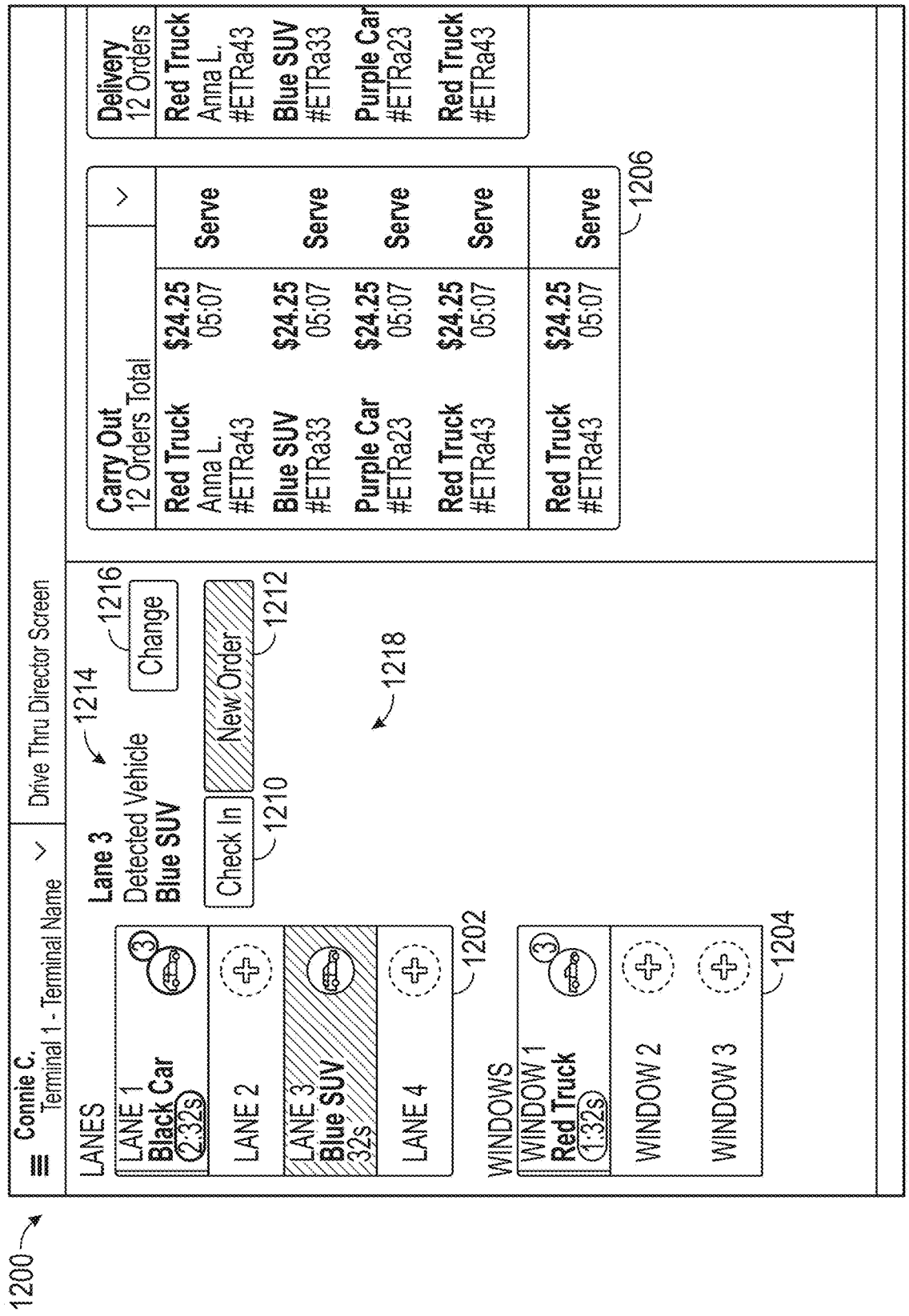
FIG. 14 is another GUI of a point of sale unit that is updated using image data of the vision system, according to some embodiments.

Referring to FIGS. 13-14, the GUI 1200 may be configured to open a new window or widget 1218 responsive to selection of one of the icons of the windows pane 1202. In some embodiments, the widget 1218 includes a check in button 1210 (e.g., icon) and a new order button 1212. For example, the order taker may select the check in button 1210 in order to initiate checking in a customer that has placed an online or mobile order and has arrived at the drive through system 10 for pickup. The order taker may select the new order button 1212 in order to initiate a POS and add items to the customer's order. In some embodiments, the widget 1218 includes vehicle information 1214, and an option 1216 to change the vehicle information 1214. In some embodiments, the vehicle information 1214 is populated by the controller 102 using the detected characteristics of the vehicle 30 (e.g., the color and type of the vehicle). Once the POS has been completed and the order has been placed, the POS data (e.g., the order data) may be tied to the corresponding vehicle information 1214 throughout the rest of the vehicle 30's lifecycle through the drive through system 10.

The GUI 1200 may similarly be provided to fulfillment staff via the pickup alert device 908 (e.g., a display screen, a touch screen, etc.). However, the GUI 1200 as provided to the fulfillment staff may exclude the options for adding items to the customer's order. The GUI 1200 may present both the type and color of the vehicle 30 that is currently present at the corresponding window (e.g., the red truck at window 1) along with order information that is tagged to the characteristics of the vehicle 30 (e.g., the type and color).

Figure 15:
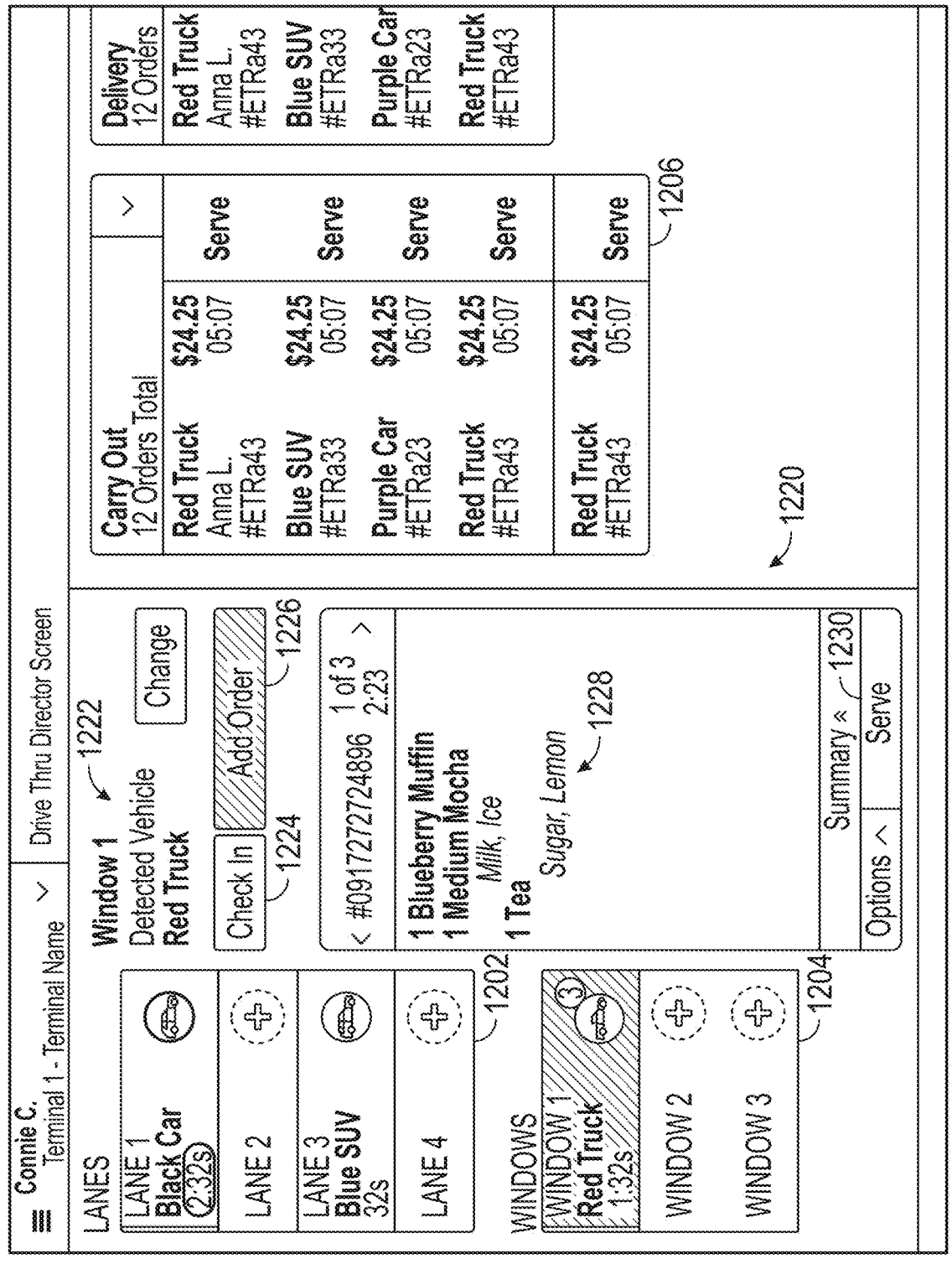
FIG. 15 is another GUI of a point of sale unit that is updated using image data of the vision system, according to some embodiments.

Referring to FIG. 15, the windows pane 1204 may include multiple selectable icons corresponding to multiple pickup windows of the store 14. The selectable icons (e.g., widgets, boxes, buttons, etc.) may include vehicle information, similar to the lane pane 1202 indicating both the color and type of vehicle 30 that is currently present at the windows of the store 14. The vehicle information of the windows pane 1204 may be populated or updated by the controller 102 based on the determinations obtained by the controller 102 using the image data. When the vehicle 30 arrives at the window (e.g., "red truck" shown at "Window 1" in FIG. 15), the staff at the corresponding window (e.g., Window 1) may select the corresponding icon. Responsive to selection of the corresponding icon, the GUI 1200 displays an order pane 1220. The order pane 1220 can include vehicle information 1222 illustrating the color and type of the vehicle 30 that is present at the window. The order pane 1220 can also include a check in button 1224 and an add order button 1226, similar to as shown in FIGS. 13-14. The order pane 1220 can also include order information 1228 and a serve button 1230. In this way, the GUI 1200 is configured to display the order information 1228 in combination with the vehicle information 1222. Advantageously, providing both the order information 1228 in combination with the vehicle information 1222 facilitates reduced likelihood of incorrect order fulfillment.

Referring again to FIGS. 12-15, the lane pane 1202 and the windows pane 1204 may provide textual information of the vehicle data (e.g., the color and type of vehicle) as well as graphical information of the vehicle data. For example, FIG. 12 illustrates an icon or graphical illustration of a black car, a blue SUV, and a red truck.

Tracking GUI

Figure 16:
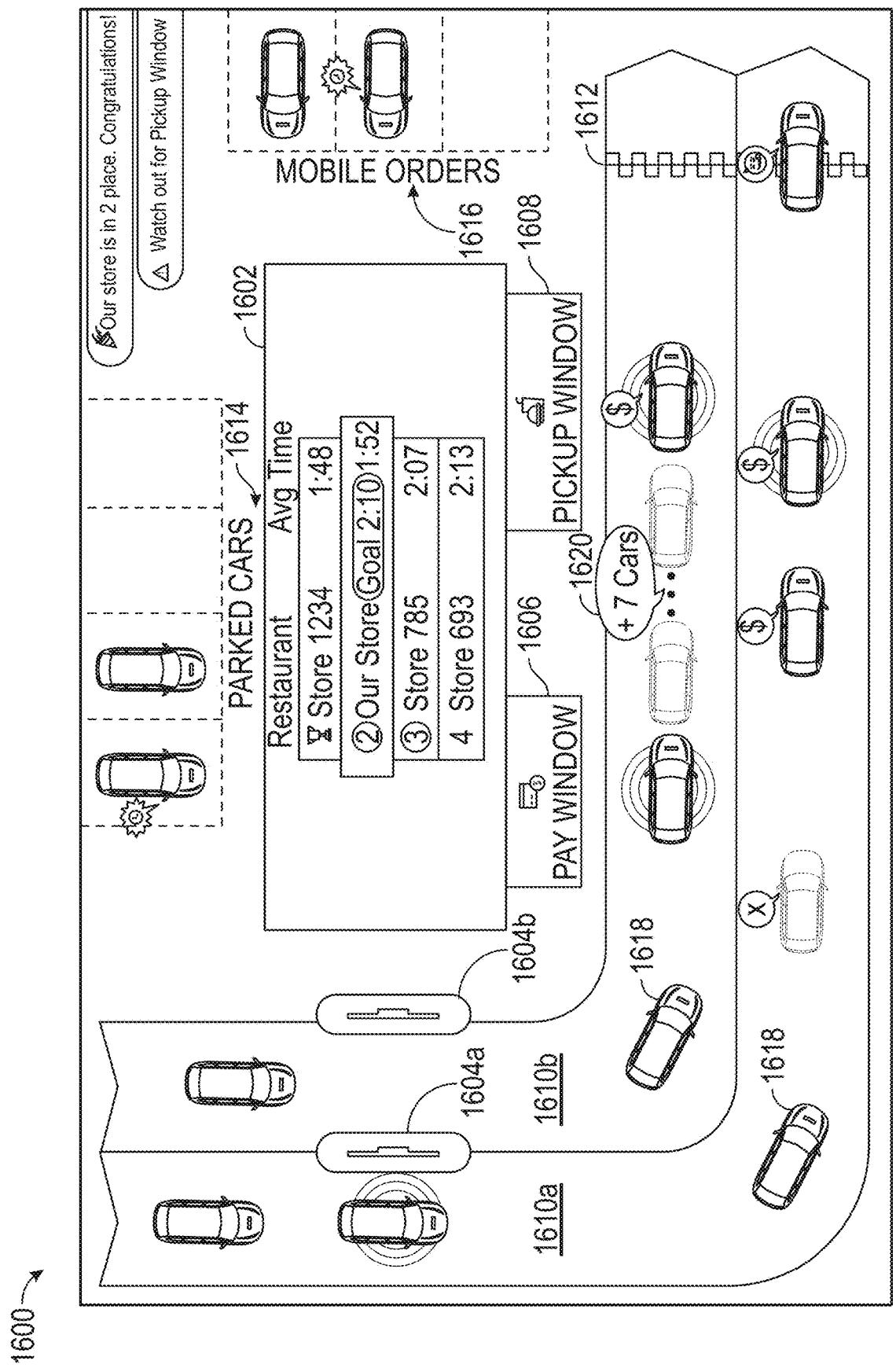
FIG. 16 is a GUI illustrating tracking of vehicles in a drive through system, according to some embodiments.
Figure 17:
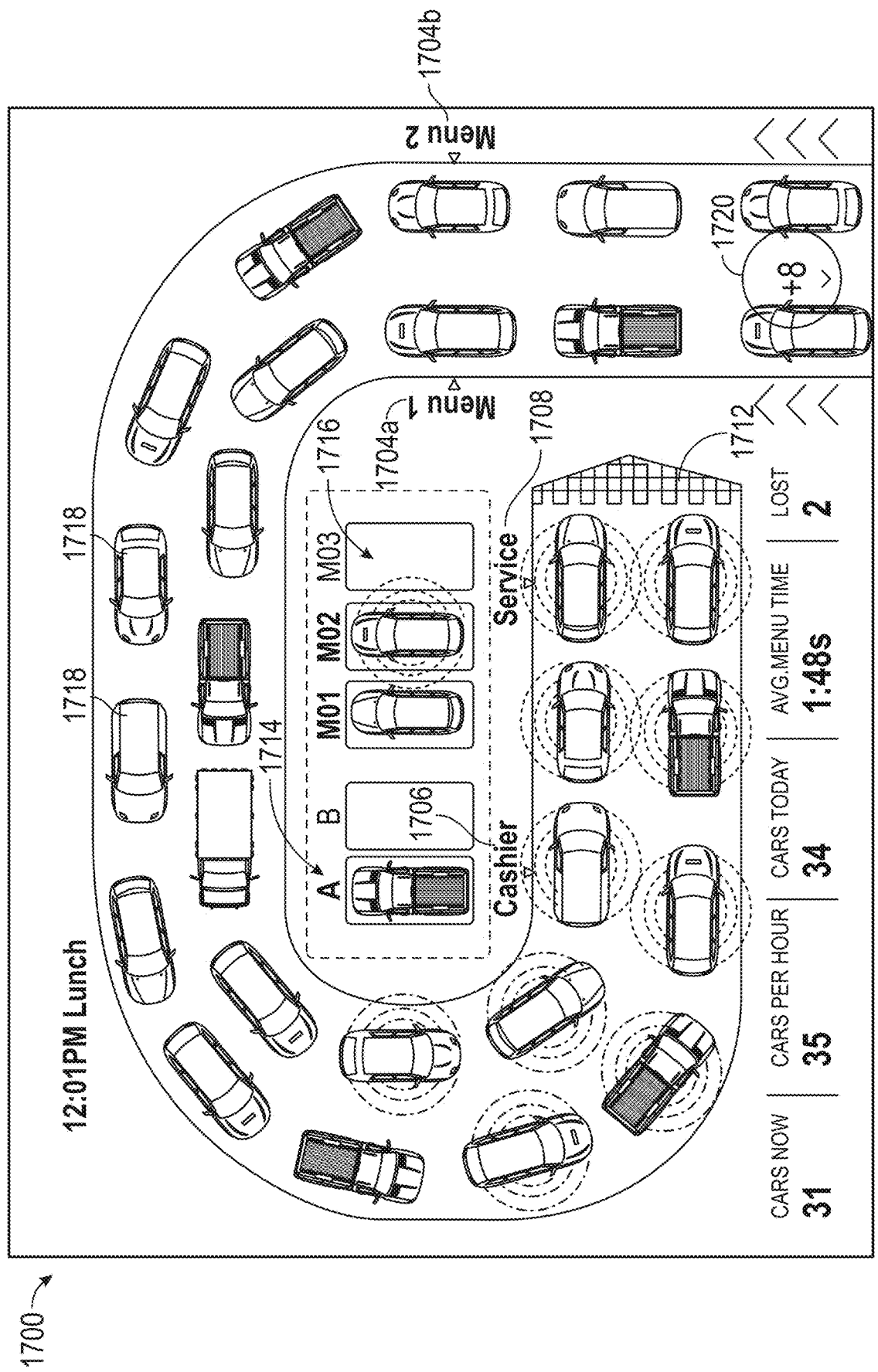
FIG. 17 is another GUI illustrating tracking of vehicles in a drive through system including a stack size, according to some embodiments.
Figure 18:
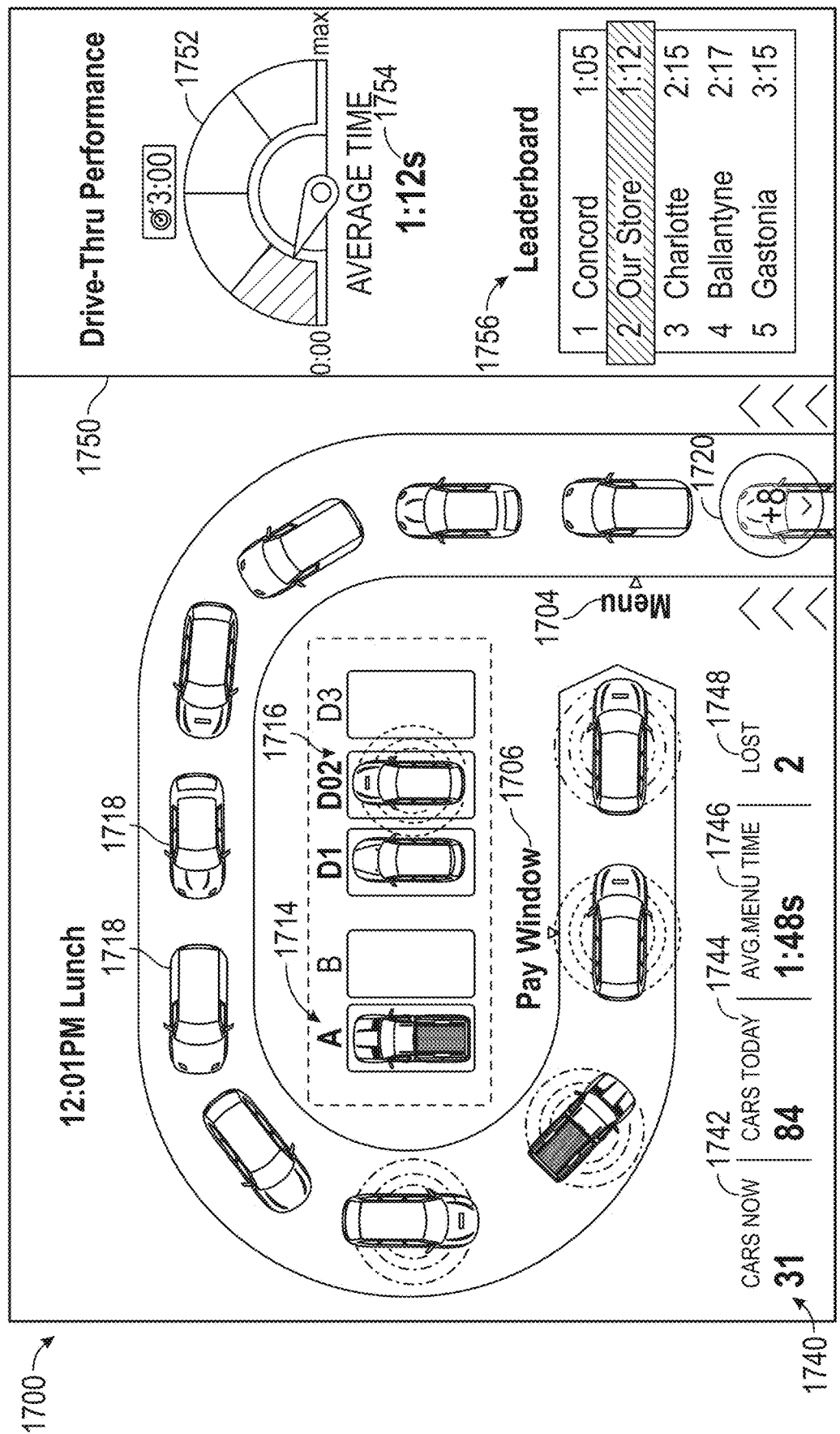
FIG. 18 is another GUI illustrating tracking of vehicles in a drive through system including a leaderboard, according to some embodiments.

Referring to FIGS. 16-18, the controller 102 may operate a display screen (e.g., the manager display 914) to include a GUI that illustrates live positions of all vehicles at the drive through system 10. The GUI may be an overall or universal GUI that is determined by the controller 102 based on the image data of the cameras 114.

Referring particularly to FIG. 16, the controller 102 may generate and operate the manager display 914 to provide a GUI 1600. The GUI 1600 may include a graphical representation of the store 14, shown as store icon 1602. The GUI 1600 may also include graphical representations of vehicles 30 in the drive through system 10, shown as vehicle icons 1618. In some embodiments, the vehicle icons 1618 are selected in order to visually indicate both the color and type of the vehicle as detected by the controller 102. The vehicle icons 1618 are located and adjusted in their location in real-time corresponding to live detection of the vehicles 30 in the drive through system 10.

The GUI 1600 may include menu icons 1604, corresponding to the drive through units 108. In particular, the GUI 1600 may include menu icon 1604a and menu icon 1604b corresponding to two different drive through units 108. The GUI 1600 illustrates which vehicle is currently located at the drive through units 108. The GUI 1600 may also include a pay window icon 1606 and a pickup window icon 1608. The GUI 1600 may visually indicate which of the vehicles 30 are at the pay window 1606 and the pickup window 1608. The GUI 1600 can also include a finish line 1612 that visually indicates which customers are leaving the drive through system 10 after a successful order. In some embodiments, the GUI 1600 also visually illustrates vehicles 30 that have been requested to pull to a pickup location, shown as pickup spots 1614. The GUI 1600 may place vehicle icons 1618 corresponding to vehicles 30 that are currently detected at the pickup spots 1614. In some embodiments, the GUI 1600 also visually illustrates vehicles 30 that are awaiting mobile order pickup, shown as mobile order pickup spots 1616.

Referring still to FIG. 16, the GUI 1600 may also include stack size indicators, shown as stack size icon 1620. The stack size icon 1620 visually illustrates a number of customers that are present between two points, or beyond a certain point. As shown in FIG. 16, the stack size icon 1620 illustrates that seven vehicles are present between the pay window and the pickup window, visually illustrated by pay window icon 1606 and pickup window icon 1608.

Referring to FIG. 17, the controller 102 may generate and operate the manager display 914 to provide a GUI 1700. The GUI 1700 may be similar to the GUI 1600. The GUI 1700 may include vehicle icons 1718, menu icons 1704, a finish line 1712, a pay window icon 1606, and a pickup window icon 1708. Similarly to GUI 1600, the GUI 1700 can include pickup spots 1714 and mobile order pickup sports 1716. The GUI 1700 also includes a stack size 1720 that indicates a number of customers that are beyond a certain point (e.g., vehicles 30 that are in line for the drive through system 10 upstream of the point at which the stack size 1720 is displayed).

Referring to FIG. 18, the GUI 1700 is shown in a simplified view, illustrating only one lane of traffic of the drive through system 10. The GUI 1700 may also present a drive through performance tab 1740 illustrating various performance characteristics of the drive through system 10. In particular, the drive through performance dab 1740 may include a car count 1742 (e.g., a number of vehicles that are currently in the drive through system 10), a total car count 1744 (e.g., a total number of vehicles or customers that have been tracked through the drive through system 10 for the day so far), an average menu time 1746 (e.g., an average amount of time that a customer is at the drive through unit 108), and a number of lost customers 1748 (e.g., a number of customers that leave the drive through system 10 due to long lines). The GUI 1700 may also include a performance dashboard 1750 (e.g., a window, a pane, an area, a report, etc.) that includes a performance icon 1752 indicating overall performance of the drive through system 10. In particular, the performance dashboard 1750 may indicate an average amount of time 1754 for a customer to enter, order, pay, receive their order, and exit the drive through system 10. In some embodiments, the performance dashboard 1750 includes a leaderboard 1756 that indicates a ranking of the drive through system 10 of the store 14 that is illustrated by the GUI 1700, relative to other drive through locations. The ranking of the leaderboard 1756 may be determined based on the average amount of time 1754.

Point of Sale and Kitchen GUIs

Figure 20:
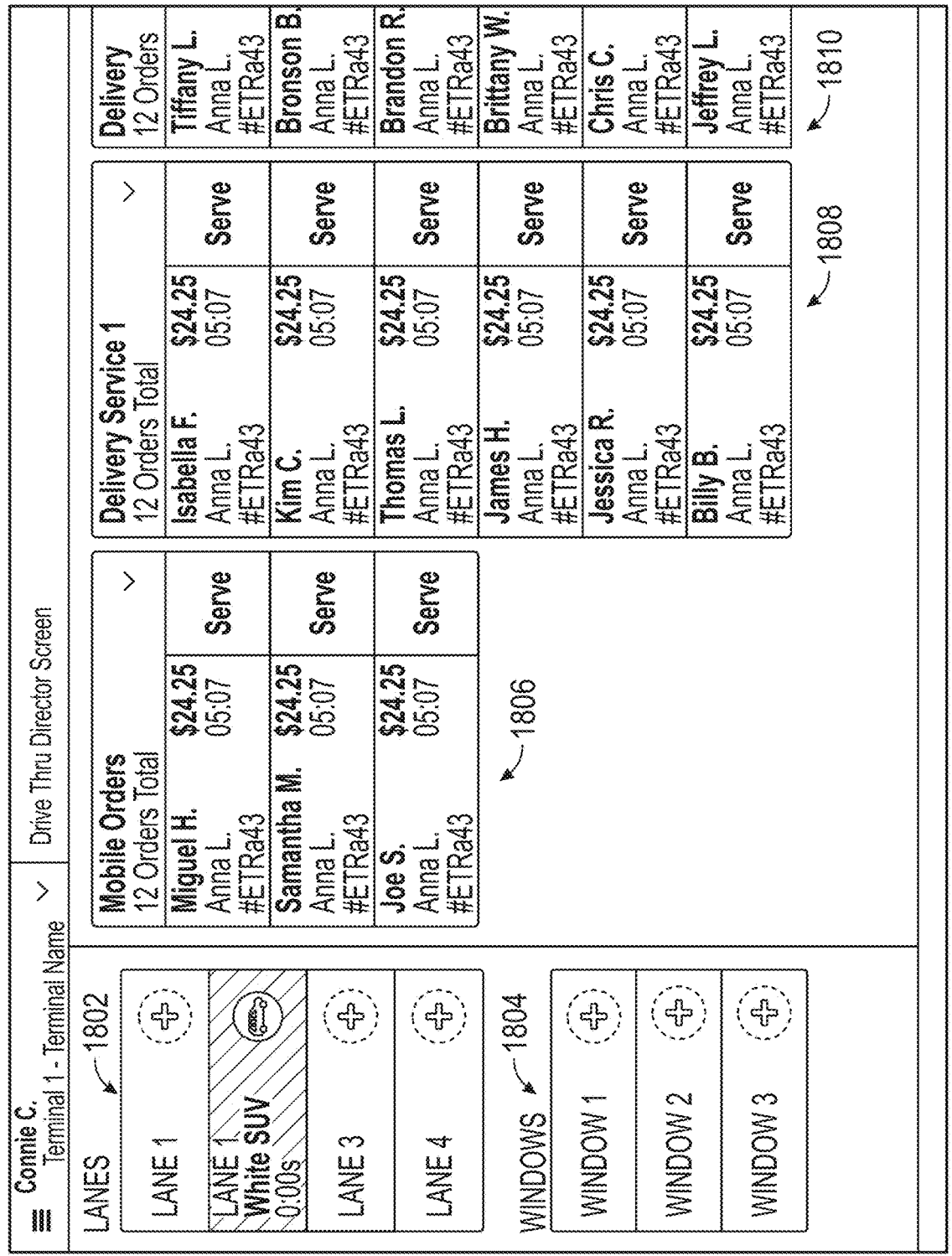
Figure 21:
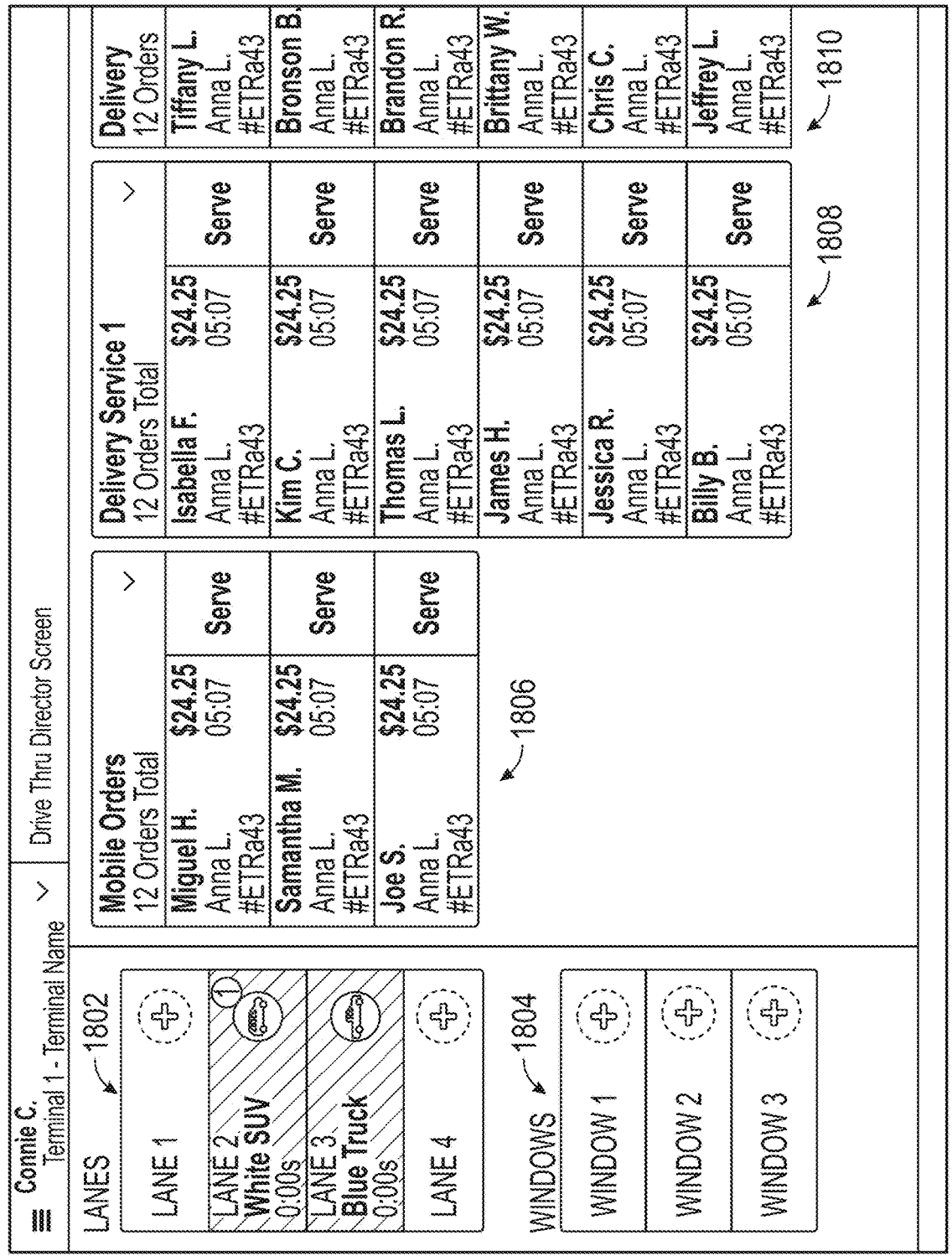

Referring to FIGS. 19-31, the controller 102 may operate any of the POS units (e.g., POS units 902) to display the GUIs 1800 shown in FIGS. 19-31 at least partially using the image data obtained from the cameras 114. In particular, the GUIs can display a screen for a director of a drive-through system to view, for example, a total number of mobile orders, and identify the source of particular mobile orders, e.g., from different services. For each mobile order, a user, a processor, a unique order identifier, a time of ordering, and a total amount can be displayed. The GUIs can also display, simultaneously with the order information, a lane drop-down menu and a window drop-down menu, allowing for selection of a particular lane and/or window of interest to a user to be selected to display additional information. As shown in FIGS. 19-31, the POS units can be operated to provide GUIs in real-time that are updated based on identified visual characteristics of the vehicles 30 in the drive through system 10 and updated as the vehicles 30 are tracked through the drive through system 10. For example, as shown in FIG. 21 a blue truck arrives at lane 3, an order is placed, and the GUI is updated when the blue truck pulls around to the second window as shown in FIG. 31. Accordingly, the GUI can display, for example, a detected vehicle, a check-in button indicating the customer in the detected vehicle has checked in, and a corresponding order. In addition, mobile order information can also be displayed.

Figure 19:
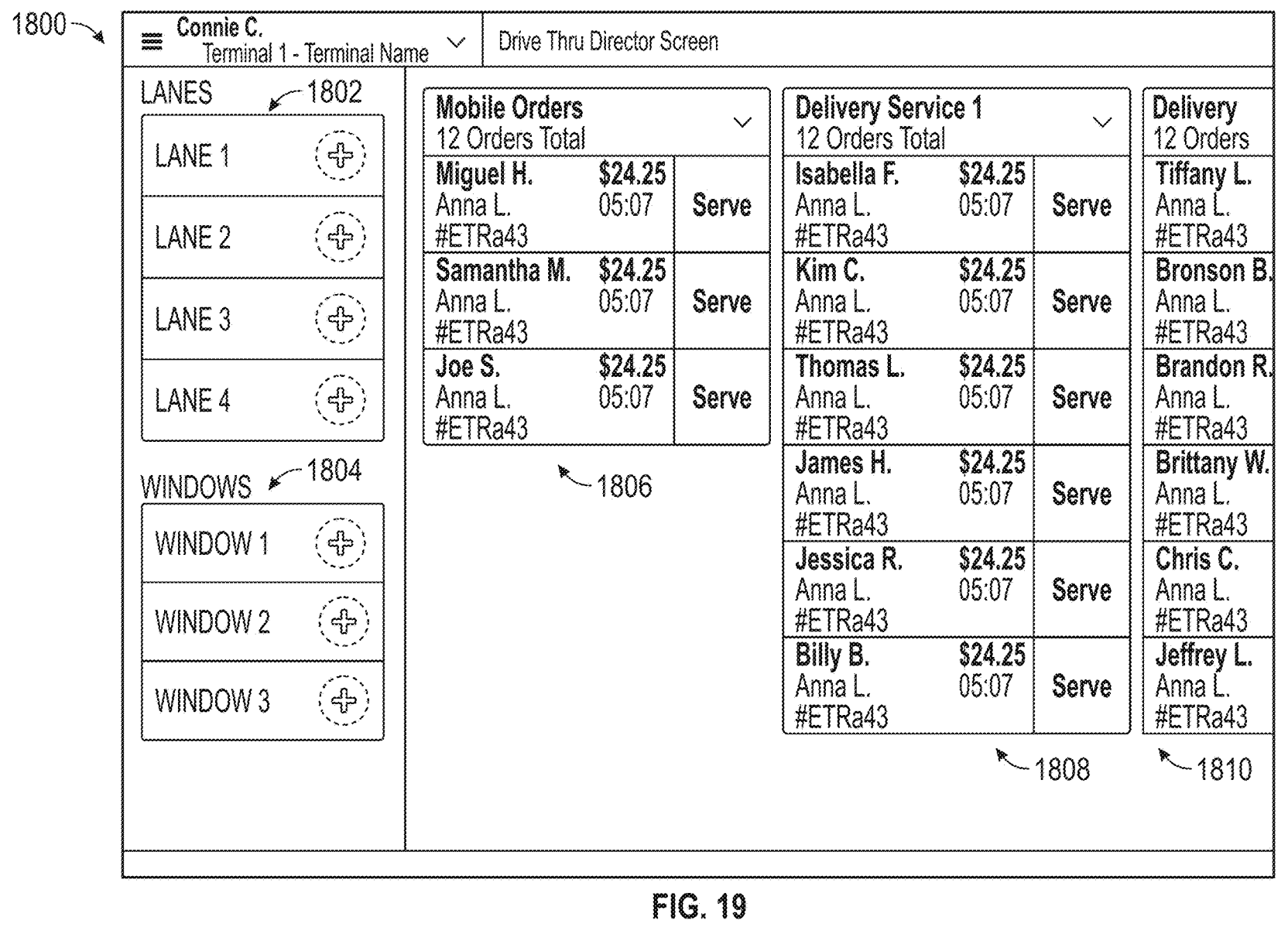
Figure 22:
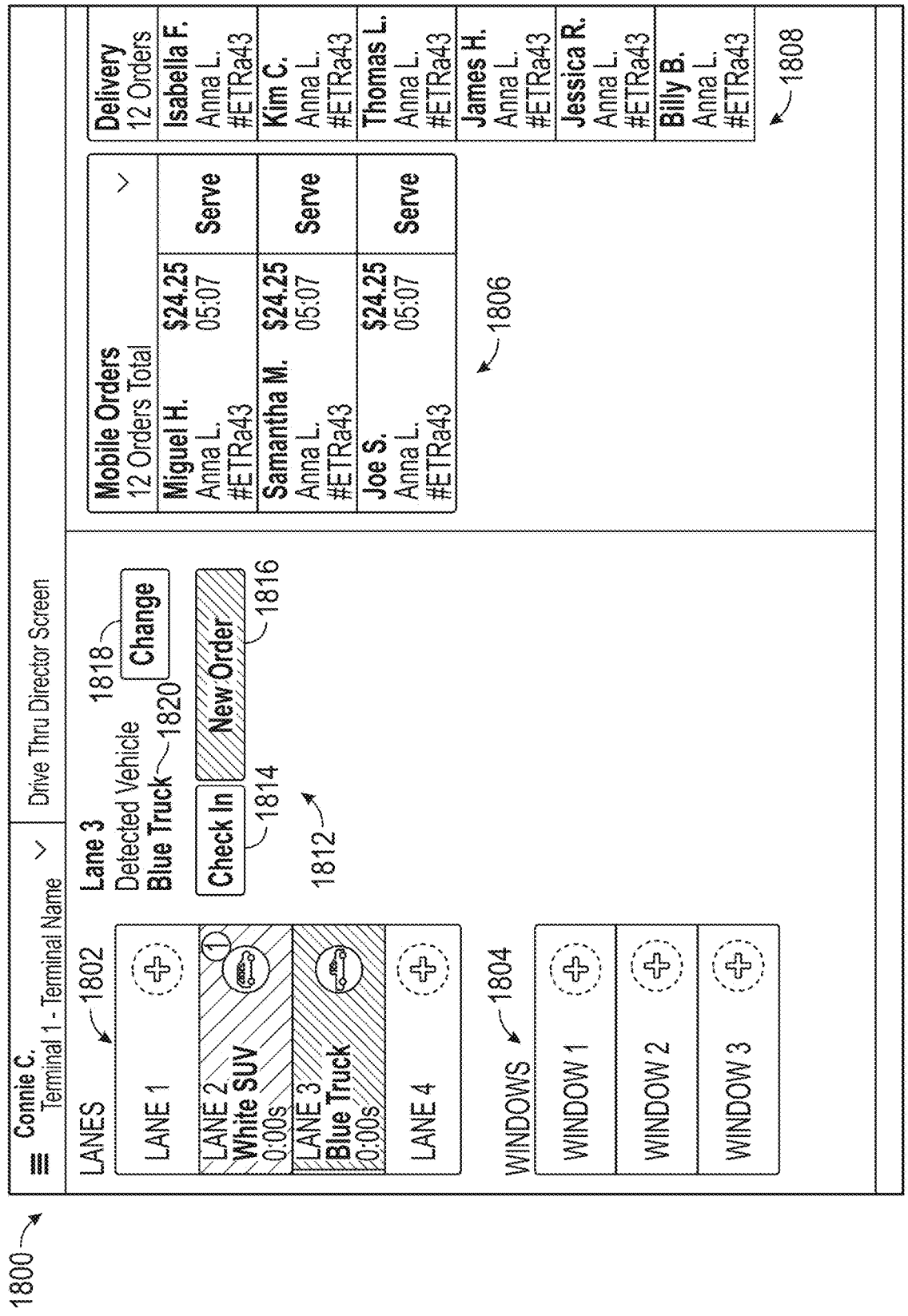

Referring particularly to FIG. 19, the GUI 1800 includes a lanes pane 1802, a windows pane 1804, a mobile orders pane 1806, and one or more delivery service panes, shown as delivery service pane 1808 and delivery service pane 1810 (e.g., third party delivery services). When a vehicle arrives at the drive through unit 108 at the second lane (e.g., a white SUV), the GUI 1800 is updated in real-time as shown in FIG. 20. In some embodiments, all of the POS units 902 that display the GUI 1800 are updated in real-time responsive to detection of vehicles in the drive through 10. As shown in FIG. 21, another vehicle, a blue truck, has arrived at the third lane. An icon of the vehicle may indicate in real-time whether another order taker has switched to communicating (e.g., via audio communications) with the vehicle and is taking the customer's order. As shown in FIG. 22, when the user of the POS unit 902 on which the GUI 1800 is displayed selects the blue truck icon at the third lane, the GUI 1800 presents various options 1812. The options 1812 include a button 1818 to change a characteristic of the detected vehicle (e.g., if the vehicle that is detected by the vision system 200 has a different characteristic than what is identified by the vision system 200). For example, if the vehicle detected is not a blue truck and is instead a green SUV, the user may select the button 1818 to correct the characteristics detected by the vision system 200.

Referring still to FIG. 22, the options 1812 also include a check-in button 1814, and a new order button 1816. The user may select the check-in button 1814 and select an appropriate mobile order from the mobile order pane 1806 or one of the delivery panes 1808 and 1810 if the customer in the blue truck is picking up an order that has already been placed (e.g., by a mobile application or for delivery). If the customer in the blue truck is a new customer that has not yet placed an order, the user may select the new order button 1816.

Figure 23:
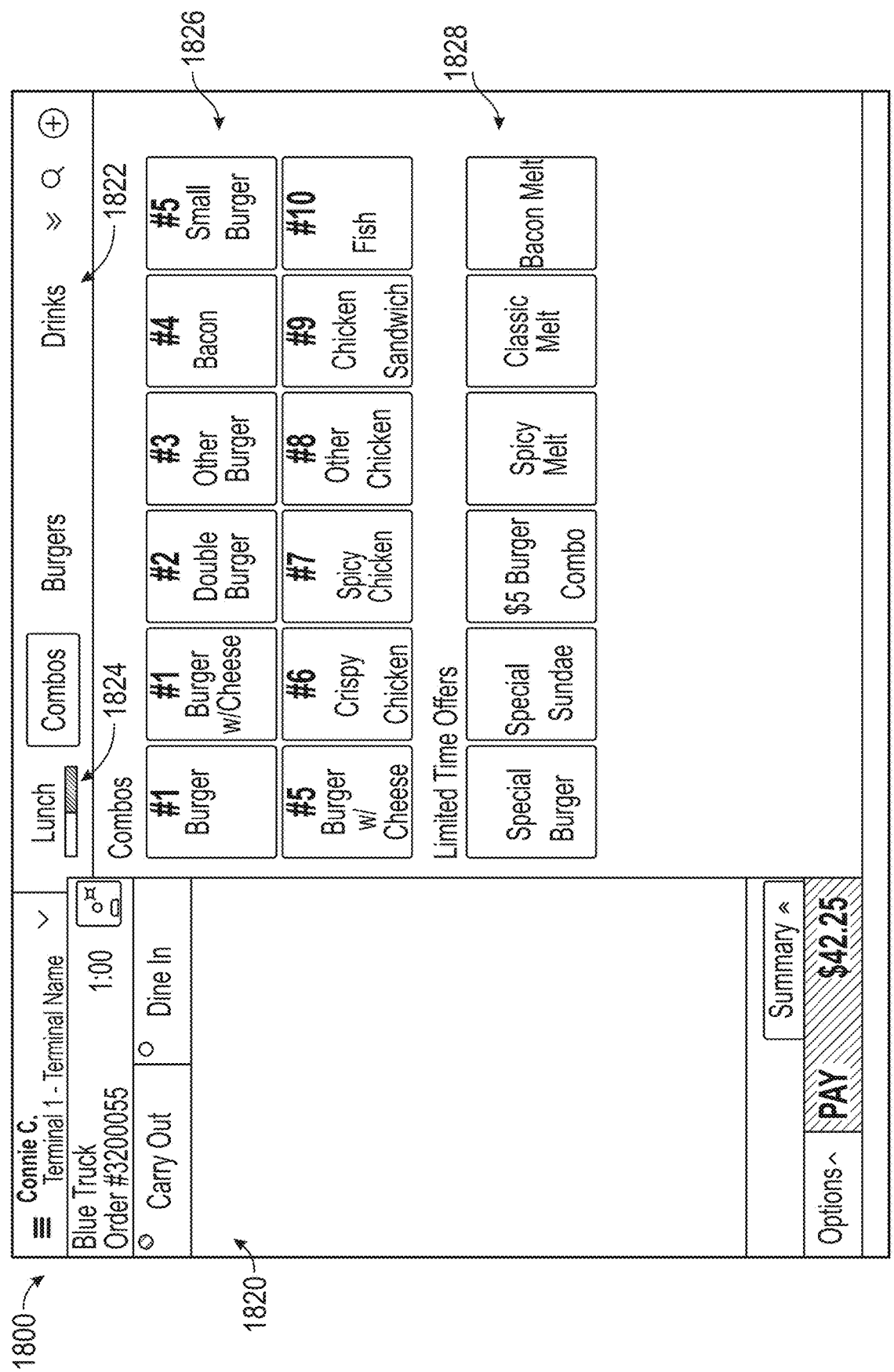

Responsive to selecting the new order button 1816, the user (e.g., the order taker) is presented with a menu, shown in FIG. 23. The order taker may select items from the menu in order to add to the customer's order. As shown in FIG. 23, the order menu may include a selectable switch 1824 (e.g., a toggle button) to select between breakfast, lunch, and dinner menus. The order menu may also include a ribbon of item options 1822 including burgers, drinks, sides, meals, combos, etc. Selection of the different items options 1822 causes the menu to display different menu items that can be added to the customer's order. As shown in FIG. 23, the combos menu option is selected, and the menu displays combo items 1826 and limited time offers 1828. The order taker may select these items and add them to the customer's order as instructed by the customer. The order taker may also select between a carry out option and a dine in option for the new order.

Figure 24:
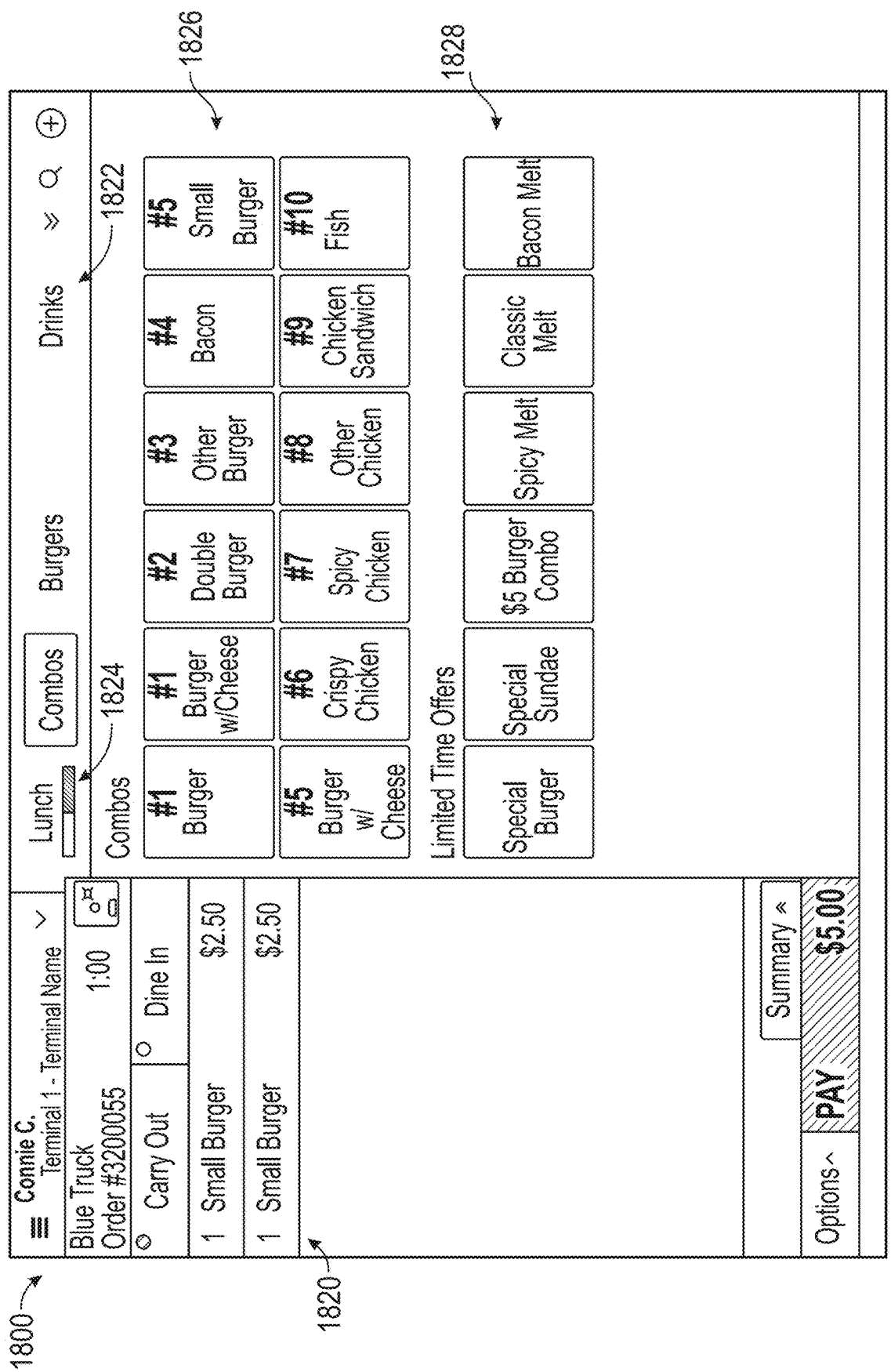

Referring to FIG. 24, responsive to selecting items to add to the customer's order, the menu displays a current order 1820 including items that has been added to the order, and a cost associated with each item. The current order 1820 may mirror or reflect an order that is displayed to the customer via the drive through unit 108 in real-time. Once the customer's order is completed, the order taker may select a pay or complete order button.

Figure 25:
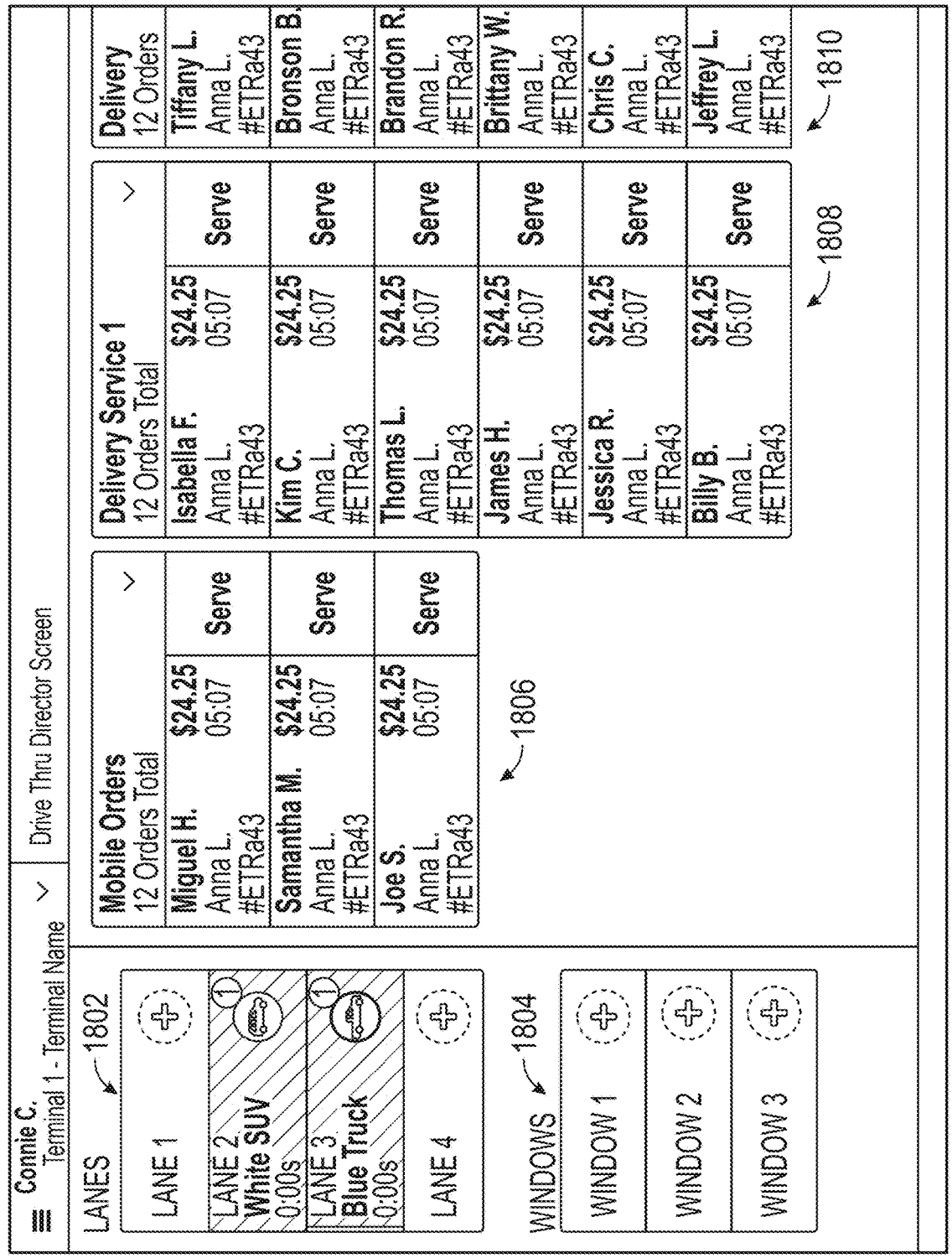
Figure 26:
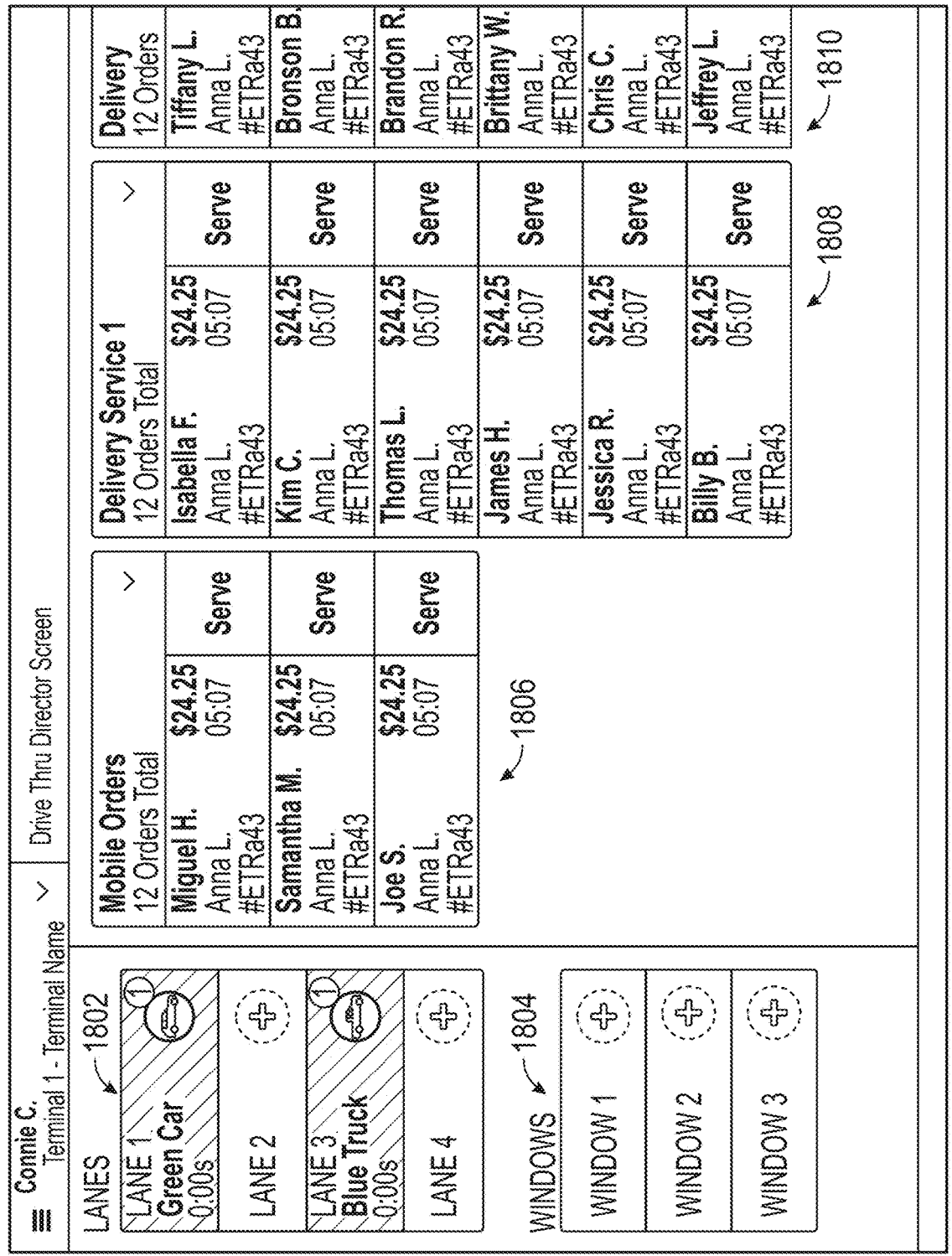
Figure 27:
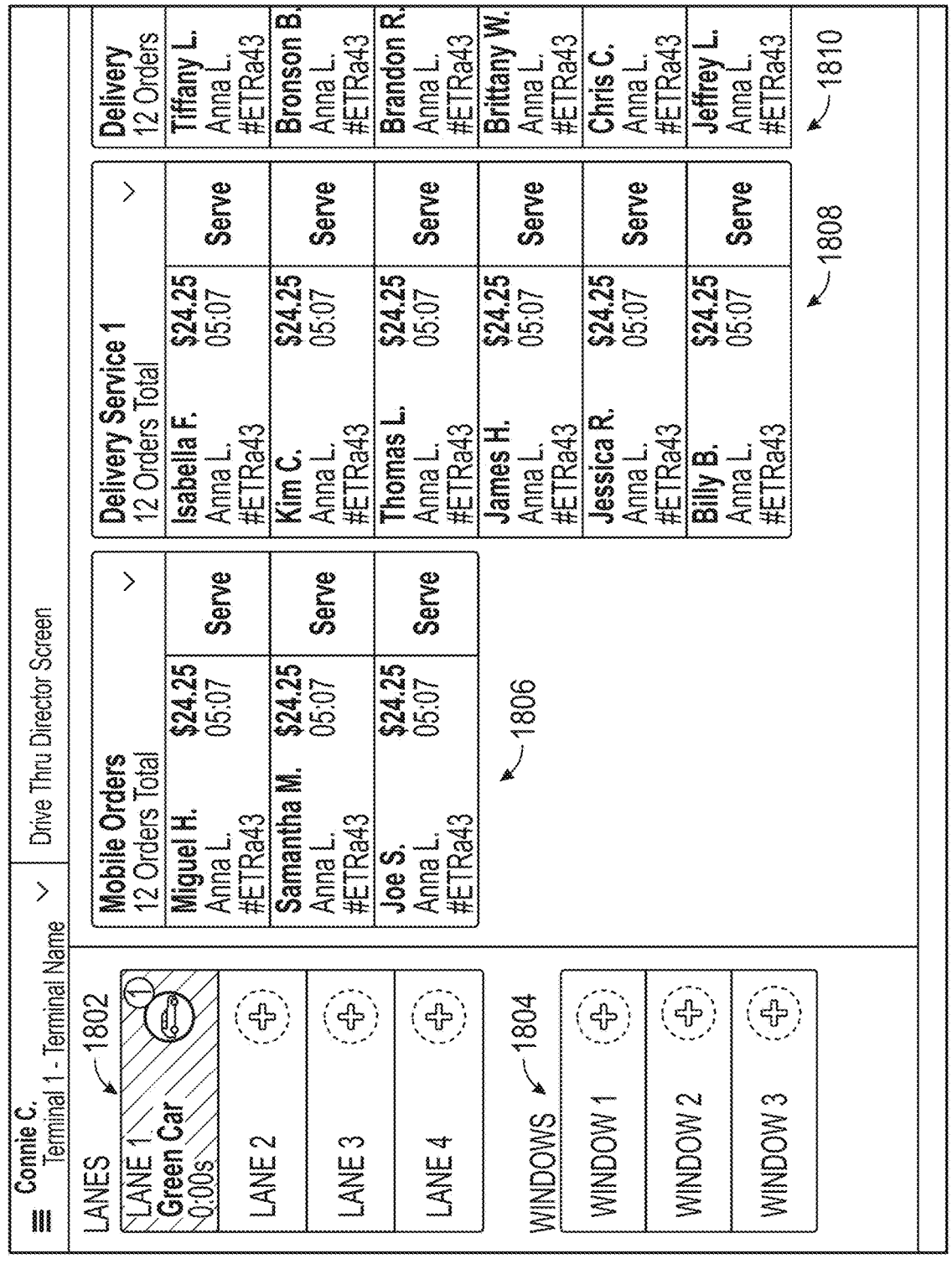
Figure 30:
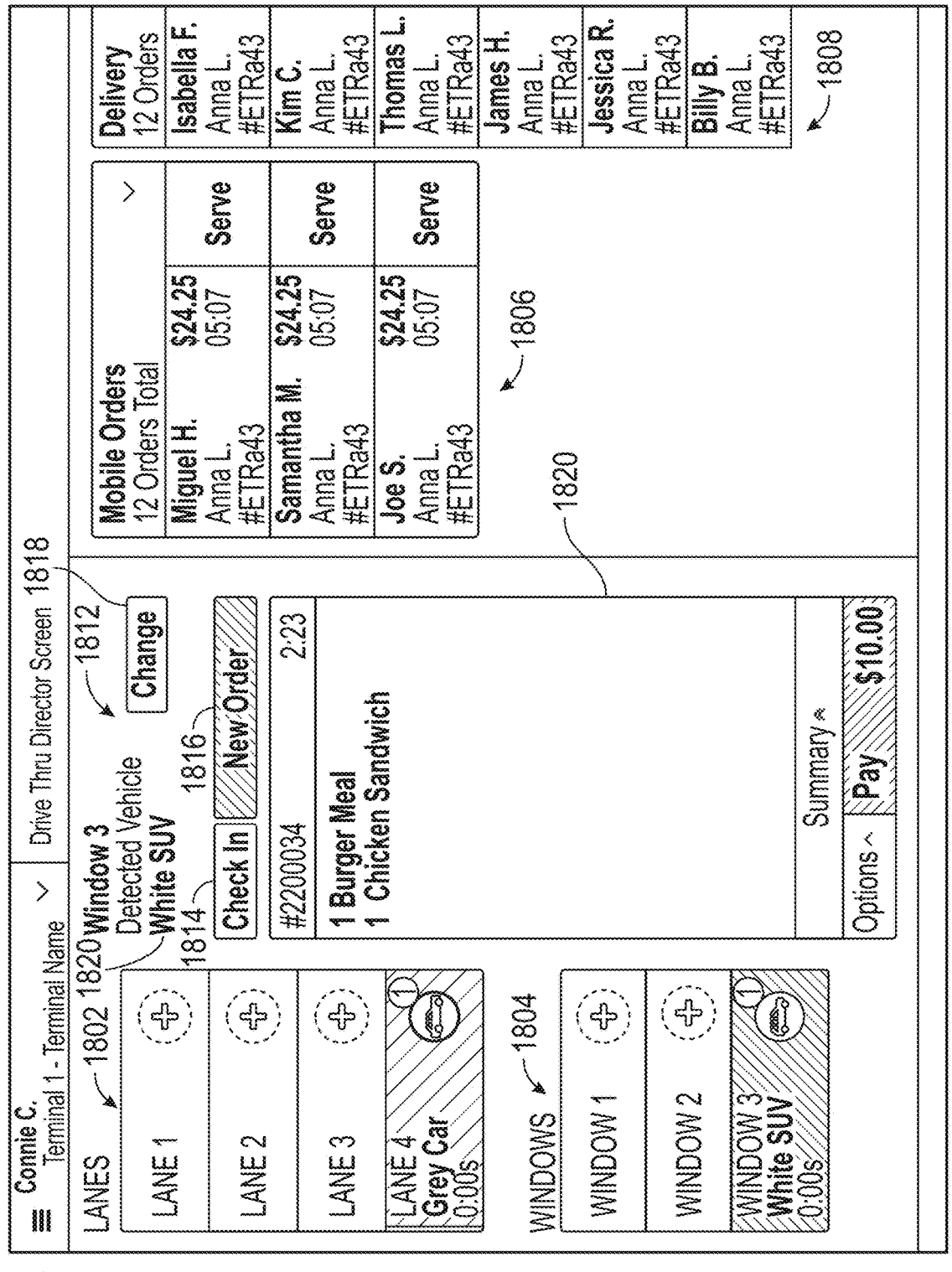

Referring to FIG. 25, once the customer's order has been completed, the associated icon for the blue truck includes an indicator bar (e.g., a green indicator bar) to show that the customer has completed an order. The indicator may be provided on all the POS units 902 that display the GUI 1800 so that other order takers are informed that the customer in the blue truck has already placed their order and does not require further assistance at that lane. At this point, the order taker may, for example, select the icon for the green car as shown in FIGS. 26 and 27 or the white SUV as shown in FIG. 25 to start the next order.

Figure 29:
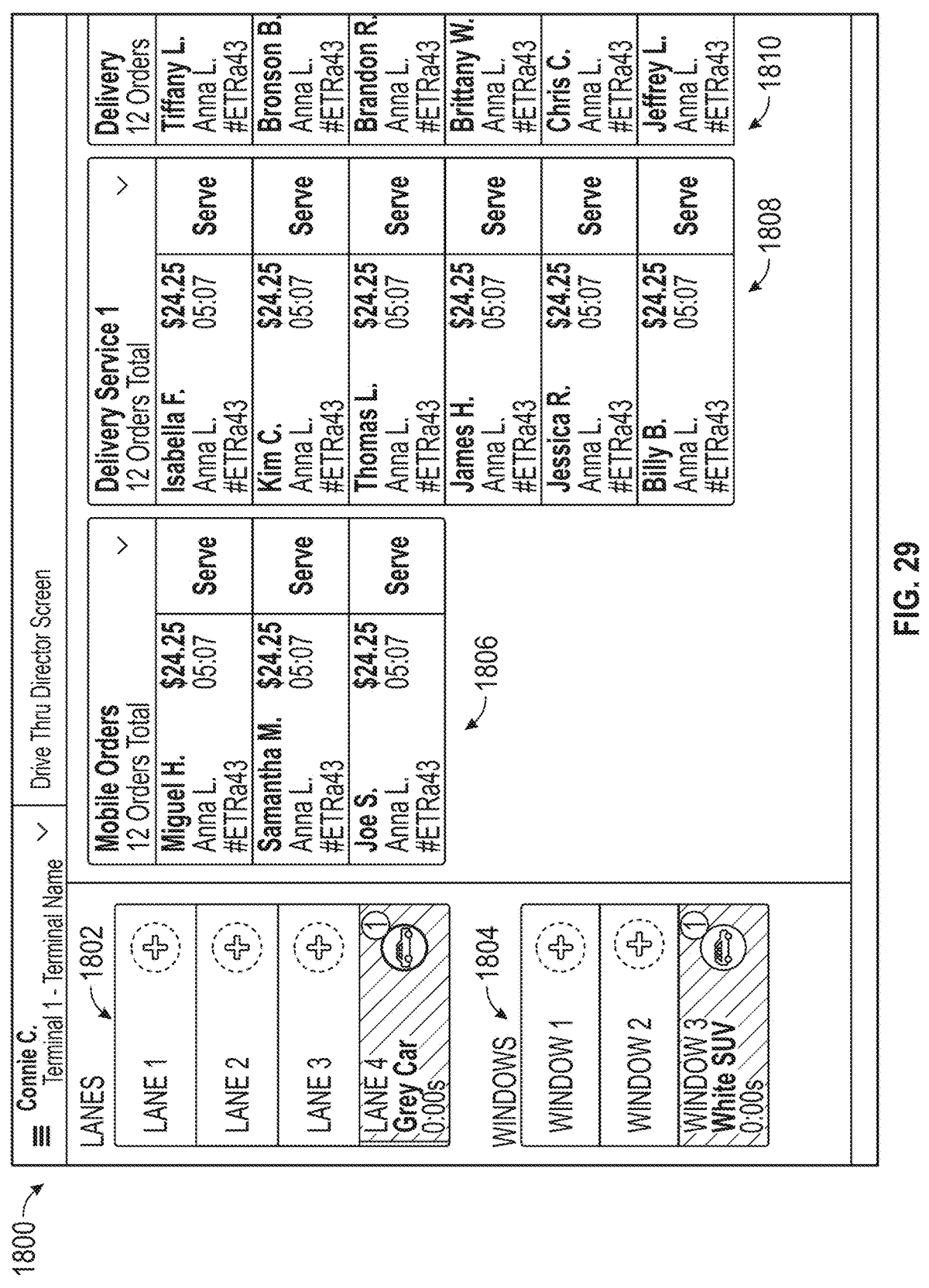

Referring to FIGS. 28 and 29, the white SUV which was previously in lane 2 (shown in FIG. 5) has now pulled around to the third window, shown in the windows pane 1804 in order to place an order at the window in order to pay. As shown in FIG. 31, the blue truck has pulled up to the second window in order to pay and pickup their order. The flow of traffic from the drive through units 108 to the pickup windows is updated in real-time across all the POS units 902 based on tracking of the vehicles by the vision system 200. When a vehicle (e.g., the white SUV) pulls up to the third window, the windows pane 1804 indicates the presence of the white SUV by providing a textual representation (e.g., "White SUV") and a graphical representation (e.g., an icon showing a white SUV). Responsive to selection of the pane or icon corresponding to the white SUV, the GUI 1800 presents the options 1812 to the user. The GUI 1800 also presents an order pane 1820 which indicates an order number, a total amount of time the vehicle has been in the drive through 10, and a required payment amount.

Responsive to the blue truck arriving at the second window, shown in FIG. 31, the GUI 1800 updates in real-time to show the user which window the blue truck is currently at. The user may select the blue truck icon to view the order information of the customer in the blue truck, similarly to FIG. 30 for the white SUV. In some embodiments, the GUI 1800 shown in FIGS. 25-31 illustrate a director screen for a manager or director of the restaurant to oversee drive through activity and details. In some embodiments, the GUI 1800 shown in FIGS. 19-24 illustrate a screen that is presented to an order taker or cashier of the drive through 10.

Referring to FIG. 32, a kitchen GUI 1900 illustrates various orders that may be presented to kitchen staff (e.g., an employee of the drive through 10 preparing orders). The operation of the kitchen GUI 1900 is coordinated with order placement at the POS units 902 that implement the GUI 1800 described in detail above with reference to FIGS. 19-31. The controller 102 may configured to operate the kitchen display screen (e.g., a display device, the kitchen alert devices 906, a tablet, etc.) to display the kitchen GUI shown in FIG. 32. As shown in FIGS. 32, the kitchen display screen is operated in real-time to include newly placed orders and associated visual characteristics of the vehicles 30 for the orders. The kitchen GUI 1900 can be updated in real-time based on operations at the POS units (e.g., updated to include items that are added to the order). The kitchen screen GUIs indicate both the visual characteristics of the vehicles 30 (e.g., "blue truck") as well as order information that the customers in the vehicles 30 have placed. When an order is fulfilled or the items have been prepared, the controller 102 may operate the kitchen display screen(s) to remove corresponding widgets, panes, or windows (e.g., as shown in FIGS. 37 and 38 where the grey car order window is removed).

As shown in FIG. 32, the kitchen GUI 1900 includes various widgets 1902-1908 that are populated in real-time responsive to order placement. Each of the widgets 1902-1908 corresponds to a different order and lists the various items in the order. For example, the widget 1902 illustrates a burger meal and a chicken sandwich, as well as a lane that the vehicle is in (e.g., the white SUV), an identification of the vehicle (e.g., "white SUV"), an order number, whether the vehicle is in the drive through or not, and whether the order has been paid for or not. Likewise, the widget 1904 is populated for the blue truck responsive to order placement at the POS unit 902, the widget 1906 is populated for the green car, and the widget 1908 is populated for the grey car. In some embodiments, the widgets 1902-1908 are updated in real-time based on feedback from the vision system 200. For example, when the white SUV arrives at the third window (FIG. 28), the widget 1902 may be updated to read "WINDOW 2" instead of "LANE 2."

Referring to FIGS. 12-15, 16-18, and 19-32, the controller 102 may be configured to operate the POS units 902, the kitchen alert devices 906 (e.g., kitchen display screens), and other display screens (e.g., the manager display 914) to provide various GUIs in a coordinated manner based on the image data and tracking performed based on the image data. As shown in FIGS. 16-18, the manager display 914 may be operated provide a tracking GUI that illustrates visual indications of the locations of vehicles 30 in the drive through system 10. As the vehicles 30 travel through the drive through system 10 (that is, as they transit through the drive through on their service journey), the tracking GUI may be updated in real-time to reflect current location and amount elapsed time since the vehicles 30 have entered the drive through system 10 (e.g., indicated by the status ring with increasing shaded region surrounding the icons of the vehicles 30). When the vehicles 30 arrive at the drive through or order units 108, the controller 102 may update the GUIs of the POS units 902 (shown in FIGS. 12-15 and 19-31) to indicate that the vehicles 30 have arrived at the drive through units 108 as well as visual characteristics of the vehicles 30. As the customers in the vehicles 30 place their orders and the order takers enter order information via the POS units 902, the kitchen GUI 1900 (shown in FIG. 32) may be operated by the controller 102 to indicate the items added to the order and corresponding visual characteristics of the vehicle 30 of the customer (e.g., type and color of vehicle). When the vehicles 30 arrive at pickup windows, the POS GUI (GUI 1800) may be updated to notify order takers or order fulfillment personnel regarding the vehicle 30 at the windows as well as the visual characteristics of the vehicle 30 at the window.

It should be understood that any of the GUIs described herein with reference to FIGS. 19-32 may be implemented by the controller 102 and provided on a variety of display screens throughout the drive through 10 in a coordinated manner. The GUIs described herein with reference to FIGS. 19-32 may be the result of detecting and tracking vehicles 30 through the drive through system 10 in order to provide real-time feedback or prompts to kitchen staff, order taking staff, fulfillment staff, restaurant managers, analysis systems, etc.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically and/or electrically.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration.

In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein. References to "a" or "the" processor should be understood to encompass a plurality of processors individually or collectively configured to carry out operations as described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the arrangement of the system as shown in the various exemplary embodiments is illustrative only. All such modifications are intended to be included within the scope of the present disclosure. Other substitutions, modifications, changes, and omissions may be made in the design and arrangement of the exemplary embodiments without departing from the scope of the present disclosure.

What is claimed is:

1. A drive through system comprising:
   a point of sale unit configured to be operated to implement a point of sale;
   a plurality of cameras configured to obtain image data of a lane of the drive through system; and
   processing circuitry configured to:
      determine, using the image data, a characteristic of a vehicle at the lane waiting to place an order;
      operate a display screen of the point of sale unit to provide a textual or visual description of the characteristic of the vehicle waiting to place the order to prompt an order taker to communicate with a customer in the vehicle and obtain order data for the customer;
      execute a point of sale transaction at the point of sale unit; and
      responsive to detection of one or more of a plurality of vehicles using the image data, perform at least one of (i) initiate an alert via the point of sale unit for staff of the drive through system, (ii) initiate an action to open an additional lane, or (iii) initiate a kitchen action to prepare one or more food or beverage items.

2. The drive through system of claim 1, wherein the characteristic of the vehicle comprises a type of the vehicle selected from a plurality of predetermined types of vehicles using the image data, and a color of the vehicle.

3. The drive through system of claim 2, wherein the plurality of predetermined types of vehicles comprise at least a car, a truck, and a sport utility vehicle.

4. The drive through system of claim 1, wherein the processing circuitry is further configured to:
   determine, using the image data from the plurality of cameras and a plurality of predetermined zones, a location of the vehicle along a path of the lane, the plurality of predetermined zones defined for the image data of each of the plurality of cameras to account for different orientations and positions of the plurality of cameras to produce image data of the plurality of predetermined zones at different portions of the image data of each of the plurality of cameras; and
   responsive to the vehicle arriving at an order placement location of the plurality of predetermined zones, operate the point of sale unit to provide the textual or visual description of the characteristic of the vehicle.

5. The drive through system of claim 1, wherein the textual or visual description of the characteristic of the vehicle comprises a graphical representation of the vehicle.

6. The drive through system of claim 1, wherein the drive through system further comprises at least one of a point of sale unit or a screen visible to staff at a pickup window of the drive through system, the processing circuitry configured to operate at least one of the point of sale unit or the screen at the pickup window to provide order data associated with the vehicle and the characteristic of the vehicle responsive to the vehicle arriving at the pickup window.

7. The drive through system of claim 1, wherein the processing circuitry is configured to:
   track the plurality of vehicles through the lane of the drive through system using the image data obtained from the plurality of cameras; and
   operate, based on the image data, a carry-out alert device to notify carry-out staff regarding (i) the characteristic of a vehicle tracked to a carry-out location, (ii) an identification of a carry-out location where the vehicle is positioned among a plurality of carry-out locations, and (iii) order data for the vehicle at the carry-out location.

8. A method of controlling a drive through system, the method comprising:
   determining, using image data of a lane of the drive through system obtained from a camera, a characteristic of a vehicle at the lane waiting to place an order;
   operating a display screen of a point of sale unit to provide a textual or visual description of the characteristic of the vehicle waiting to place the order to prompt an order taker to communicate with a customer in the vehicle and obtain order data for the customer;

executing a point of sale transaction at the point of sale unit; and responsive to detection of one or more of a plurality of vehicles using the image data, performing at least one of (i) initiating an alert via the point of sale unit for staff of the drive through system, (ii) initiating an action to open an additional lane, or (iii) initiating a kitchen action to prepare one or more food or beverage items.

9. The method of claim 8, wherein the characteristic of the vehicle comprises a type of the vehicle selected from a plurality of predetermined types of vehicles using the image data, and a color of the vehicle.

10. The method of claim 9, wherein the plurality of predetermined types of vehicles comprise at least a car, a truck, and a sport utility vehicle.

11. The method of claim 8, further comprising:

determining, using the image data from a plurality of cameras and a plurality of predetermined zones, a location of the vehicle along a path of the lane, the plurality of predetermined zones defined for the image data of each of the plurality of cameras to account for different orientations and positions of the plurality of cameras to produce image data of the plurality of predetermined zones at different portions of the image data of each of the plurality of cameras; and responsive to the vehicle arriving at an order placement location of the plurality of predetermined zones, operating the point of sale unit to provide the textual or visual description of the characteristic of the vehicle.

12. The method of claim 8, wherein the textual or visual description of the characteristic of the vehicle comprises a graphical representation of the vehicle.

13. The method of claim 8, further comprising operating at least one of a point of sale unit or a screen at a pickup window to provide order data associated with the vehicle and the characteristic of the vehicle responsive to the vehicle arriving at the pickup window, the screen visible to staff at the pickup window of the drive through system.

14. The method of claim 8, further comprising:

tracking the plurality of vehicles through the lane of the drive through system using image data obtained from a plurality of cameras; and operating, based on the image data, a carry-out alert device to notify carry-out staff regarding (i) the characteristic of a vehicle tracked to a carry-out location, (ii) an identification of a carry-out location where the vehicle is positioned among a plurality of carry-out locations, and (iii) order data for the vehicle at the carry-out location.

15. A non-transitory computer readable medium configured to store instructions that, when executed by at least one processor, cause the at least one processor to perform operations comprising:

determining, using image data of a lane of a drive through system obtained from a camera, a characteristic of a vehicle at the lane waiting to place an order;

operating a display screen of a point of sale unit to provide a textual or visual description of the characteristic of the vehicle waiting to place the order to prompt an order taker to communicate with a customer in the vehicle and obtain order data for the customer;

executing a point of sale transaction at the point of sale unit; and responsive to detection of one or more of a plurality of vehicles using the image data, performing at least one of (i) initiating an alert via the point of sale unit for staff of the drive through system, (ii) initiating an action to open an additional lane, or (iii) initiating a kitchen action to prepare one or more food or beverage items.

16. The non-transitory computer readable medium of claim 15, wherein the characteristic of the vehicle comprises a type of the vehicle selected from a plurality of predetermined types of vehicles using the image data, and a color of the vehicle, wherein the plurality of predetermined types of vehicles comprise at least a car, a truck, and a sport utility vehicle.

17. The non-transitory computer readable medium of claim 15, the operations further comprising:

determining, using the image data from a plurality of cameras and a plurality of predetermined zones, a location of the vehicle along a path of the lane, the plurality of predetermined zones defined for the image data of each of the plurality of cameras to account for different orientations and positions of the plurality of cameras to produce image data of the plurality of predetermined zones at different portions of the image data of each of the plurality of cameras; and responsive to the vehicle arriving at an order placement location of the plurality of predetermined zones, operating the point of sale unit to provide the textual or visual description of the characteristic of the vehicle.

18. The non-transitory computer readable medium of claim 15, wherein the textual or visual description of the characteristic of the vehicle comprises a graphical representation of the vehicle.

19. The non-transitory computer readable medium of claim 15, the operations further comprising operating at least one of a point of sale unit or a screen at a pickup window to provide order data associated with the vehicle and the characteristic of the vehicle responsive to the vehicle arriving at the pickup window, the screen visible to staff at the pickup window of the drive through system.

20. The non-transitory computer readable medium of claim 15, the operations further comprising:

tracking the plurality of vehicles through the lane of the drive through system using image data obtained from a plurality of cameras; and operating, based on the image data, a carry-out alert device to notify carry-out staff regarding (i) the characteristic of a vehicle tracked to a carry-out location, (ii) an identification of a carry-out location where the vehicle is positioned among a plurality of carry-out locations, and (iii) order data for the vehicle at the carry-out location.

\* \* \* \* \*